United States Patent
Sakai et al.

(10) Patent No.: US 8,111,596 B2
(45) Date of Patent: Feb. 7, 2012

(54) PHASE ERROR DETECTION APPARATUS

(75) Inventors: Mitsuru Sakai, Osaka (JP); Yoshihiro Kanda, Osaka (JP); Takashige Hiratsuka, Ehime (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 11/916,401

(22) PCT Filed: May 30, 2006

(86) PCT No.: PCT/JP2006/310818
§ 371 (c)(1),
(2), (4) Date: Feb. 11, 2008

(87) PCT Pub. No.: WO2006/129683
PCT Pub. Date: Dec. 7, 2006

(65) Prior Publication Data
US 2009/0185468 A1    Jul. 23, 2009

(30) Foreign Application Priority Data
Jun. 1, 2005    (JP) ................. 2005-160962

(51) Int. Cl.
*G11B 7/09*    (2006.01)
(52) U.S. Cl. ............. 369/44.29; 369/53.23; 369/44.35; 369/44.41; 369/53.24; 369/53.35
(58) Field of Classification Search ............. 369/53.35, 369/53.42, 53.44, 53.12, 53.11, 53.16, 53.22, 369/53.23, 53.24, 53.27, 53.28, 30.13, 275.1, 369/44.11–44.42
See application file for complete search history.

(56) References Cited

U.S. PATENT DOCUMENTS

| 5,642,340 | A  | * | 6/1997 | Nomura | .................. 369/44.25 |
| 6,266,305 | B1 | * | 7/2001 | Buchler | .................. 369/44.32 |
| 6,339,567 | B1 | * | 1/2002 | Shimamoto et al. | ....... 369/44.35 |
| 7,170,833 | B2 | * | 1/2007 | Buchler et al. | ............. 369/44.34 |
| 2004/0220781 | A1 | | 11/2004 | Hiratsuka et al. | |

FOREIGN PATENT DOCUMENTS

JP    10-208262    8/1998
JP    2004-311006    11/2004

OTHER PUBLICATIONS

International Search Report issued Sep. 5, 2006 in the International Application No. PCT/JP2006/310818.
Written Opinion of the ISA issued Aug. 28, 2006 in the International Application No. PCT/JP2006/310818.

* cited by examiner

*Primary Examiner* — Wayne Young
*Assistant Examiner* — Dionne Pendleton
(74) *Attorney, Agent, or Firm* — Wenderoth, Lind & Ponack, L.L.P.

(57) ABSTRACT

A phase error detection apparatus capable of performing offset correction of a tracking error signal accurately even when there is a defect or a non-recorded position on an optical disc. There are provided a phase difference detection circuit (107) which receives two sequences of digital signals, performs phase comparison using a distance between zerocross points of the two sequences of digital signals, and outputs a phase comparison result PCR and a phase comparison completion signal PCC, and an offset control circuit (11) which outputs an offset correction amount for each phase comparison completion signal PCC from the phase difference detection circuit (107), and the offset correction amount Δα is added to the phase comparison result PCR to avoid offset correction in a position where phase comparison is not carried out.

13 Claims, 31 Drawing Sheets

PHASE ERROR DETECTION APPARATUS

TECHNICAL FIELD

The present invention relates to a phase error detecting apparatus for detecting a tracking error signal of a light spot that is obtained by irradiating an optical recording medium with light.

BACKGROUND ART

In recent years, a technique called a phase difference method has been used as a method for obtaining a tracking control signal from an optical disc on which data are recorded in concavo-convex pits, as represented by a CD (Compact Disc) and a DVD (Digital Versatile Disc).

Patent Document 1 (Japanese Published Patent Application No. 2004-311006) discloses an example of the phase difference method.

Hereinafter, a phase error detection apparatus 3010 disclosed in Patent Document 1 will be described with reference to FIG. 30.

FIG. 30 is a block diagram illustrating the construction of the conventional phase error detection apparatus 3010.

As shown in FIG. 30, the conventional phase error detection apparatus 3010 comprises a photodetector 101 which has light-receiving elements 101a to 101d for receiving reflected light from a light spot, and outputs light currents according to the amounts of light received by the respective light-receiving elements 101a to told, first to fourth current-to-voltage converters 102a to 102d for converting the light current outputs from the photodetector 101 into voltage signals, a signal generator for generating two signal sequences whose phases mutually change according to a tracking error of the light spot, from the voltage signals obtained by the first to fourth current-to-voltage converters 102a to 102d, i.e., first and second adders 103a and 103b, analog-to-digital converters (ADC) 104a and 104b, first and second interpolation filters 105a and 105b for subjecting the inputted digital signals to interpolation, first and second zerocross point detection circuits 106a and 106b for detecting zerocross points of the first and second digital signal sequences that are interpolated by the first and second interpolation filters 105a and 105b, a phase difference detection circuit 107 for detecting a phase difference between the zerocross point of the first digital signal sequence and the zerocross point of the second digital signal sequence, and outputting the phase comparison result as a pulse corresponding to one clock, and a low-pass filter (LPF) 108 for performing band limitation on the phase comparison signal outputted from the phase difference detection circuit 107 to obtain a tracking error signal.

In this apparatus, the photodetector 101 is provided with the light-receiving elements 101a, 101b, 101c, and 101d which are separated along a tangent direction and a vertical direction of data tracks that are recorded as data pit lines on the recording medium, and each of the first and second adders 103a and 103b adds the output signals from the light-receiving elements that are positioned diagonally among the signals generated according to the amounts of lights received by the respective light-receiving elements which are outputted from the photodetector 101, thereby generating two sequences of digital signals. Further, the zerocross point is a point where a center level of an inputted digital signal intersects with a center level of a digital signal that is calculated from an average or the like of the inputted digital signal.

Next, the operation of the conventional phase error detection apparatus 3010 will be described.

Initially, the photodetector 101 receives reflected light from a light spot that is obtained by irradiating tracks on an optical recording medium (not shown) with light, and outputs light currents according to the amounts of the received light.

The light currents corresponding to the respective light-receiving elements, which are outputted from the photodetector 101, are converted into voltage signals by the first to fourth current-to-voltage converters 102a, 102b, 102c, and 102d, and the first adder 103a adds the outputs of the first and third current-to-voltage converters 102a and 102c while the second adder 103b adds the outputs of the second and fourth current-to-voltage converters 102b and 102d.

Then, the signals outputted from the first and second adders 103a and 103b are subjected to discretization (sampling) for the respective signal sequences by the first and second ADC 104a and 104b, and converted into first and second digital signal sequences.

Thereafter, the digital signals outputted from the first and second ADC 104a and 104b are input to the interpolation filters 105a and 105b wherein interpolated data between sampling data of the digital signals are obtained, and thereafter, zerocross points at rising edges or falling edges of the interpolated two data sequences are detected by the zerocross point detection circuit 106a and 106b. As a method for interpolation, Nyquist interpolation may be adopted. Further, as a method for detecting zerocross points at rising edges or falling edges of the two data sequences, there is a method of obtaining a sign change point (+→− or −→+) in the interpolated data sequence.

In the phase difference detection circuit 107, using the information of the zerocross points outputted from the zerocross point detection circuits 106a and 106b, a distance between the zerocross points in the waveforms of the first and second signal sequences is obtained, and a phase comparison result is outputted as a pulse corresponding to one clock on the basis of the distance between the zerocross points, and finally, band limitation is performed by the LPF 108, thereby generating a tracking error signal in a band that is needed for tracking servo control.

Next, the construction and operation of the phase difference detection circuit 107 in the conventional phase error detection apparatus 3010 will be described in more detail with reference to FIGS. 31 and 32.

FIG. 31 is a block diagram illustrating the construction of the conventional phase difference detection circuit 107.

In FIG. 31, the phase difference detection circuit 107 comprises a phase difference calculation unit 111, a pulse generation unit 112, and a data switching unit 113.

The phase difference calculation unit 111 calculates a distance between the zerocross points of the two sequences of digital signals on the basis of the zerocross information obtained by the zerocross point detection circuits 106a and 106b, and sequentially outputs the distance as a phase comparison result to the data switching unit 113.

The pulse generation unit 112 generates a pulse signal corresponding to one sampling clock in a position where zerocross occurs in each data sequence used for phase comparison, and outputs, among the generated pulse signals corresponding to the respective data sequences, a pulse signal that appears later at a point where phase comparison is performed, as a phase comparison completion signal PCC.

The data switching unit 113 outputs the phase comparison result outputted from the phase difference calculation unit 111, as a pulse corresponding to one sampling clock, at a timing of the phase comparison completion signal outputted from the pulse generation unit 112.

FIG. 32 is a diagram for explaining the operation of the phase difference detection circuit 107, and illustrates, from above, (a) a first signal sequence (phase comparison input A) outputted from the first zerocross point detection circuit 106a, (b) a second signal sequence (phase comparison input B) outputted from the second zerocross point detection circuit 106b, (c) a phase comparison completion signal PCC outputted from the pulse generation unit 112, and (d) a phase comparison result outputted from the phase difference detection circuit 107.

The two sequences of signals outputted from the first and second zerocross point detection circuits 106a and 106b, which are shown as the phase comparison inputs A (a) and B (b) in FIG. 32, are input to the phase difference calculation unit 111 and the pulse generation unit 112 of the phase difference detection circuit 107. In the phase difference calculation unit 111, phase differences $\Delta 1$, $\Delta 2$, and $\Delta 3$ are successively calculated on the basis of the zerocross data detected by the zerocross point detection circuits 106a and 106b.

On the other hand, in the pulse generation unit 112, a pulse signal corresponding to one sampling clock is generated in a position where zerocross occurs in each of the respective data sequences to be used for phase comparison. Among the generated pulse signals corresponding to the respective data sequences, a pulse signal that appears later in the point where phase comparison is performed is outputted as a phase comparison completion signal PCC (refer to the phase comparison completion signal PCC shown in FIG. 32(c)).

Thereafter, in the data switching unit 113, on the basis of the phase comparison completion signal PCC outputted from the pulse generation unit 112, the phase comparison result PCR outputted from the phase difference calculation unit 111 is outputted at a pulse corresponding to one sampling clock (refer to the phase comparison result PCR shown in FIG. 32(d)).

FIG. 33 shows tracking error signals detected by the conventional phase error detection apparatus 3010 during CAV playback, wherein FIG. 33(a) shows a tracking error signal at the inner circumference side of the disc, and FIG. 33(b) shows a tracking error signal at the outer circumference side of the disc.

As shown in FIG. 33, an output amplitude for each pulse in the phase difference detection circuit 107 is larger at the disc inner circumference side (33(a)) having a larger number of sampling points within the same phase interval than at the disc outer circumference side (33(b)) having a smaller number of sampling points within the same phase interval. However, as shown in FIG. 32, since outputting of the phase comparison result PCR shown in FIG. 32(d) is performed by only one clock of the phase comparison completion signal PCC shown in FIG. 32(c), the time required for outputting the phase comparison result PCR is shorter at the disc inner circumference side (33(a)) having a larger number of sampling points within the same phase interval than at the disc outer circumference side (33(b)) having a smaller number of sampling points within the same phase interval.

Therefore, when the phase comparison result PCR outputted from the phase difference detection circuit 107 is subjected to band limitation by the LPF 108 to generate a tracking error signal TRE, it is possible to obtain a tracking error signal having the same amplitude at the disc inner side and the disc outer side (amplitude A and amplitude B in FIG. 33), thereby resolving linear velocity dependence of the tracking error signal during CAV playback.

As described above, in the conventional phase error detection apparatus 3010, since a tracking error can be detected by digital signal processing, it can cope with an increase in speed of an optical recording/playback device as well as an increase in density of recorded values, which cannot be achieved in tracking error detection by analog signal processing, and moreover, the constitution relating to analog signal processing can be significantly reduced, thereby realizing a small-size and low-cost optical recording/playback apparatus.

DISCLOSURE OF THE INVENTION

Problems to be Solved by the Invention

In the conventional tracking error signal detection using the phase difference method, however, there occurs a phase difference due to an optical factor that depends on pit depth, or a difference in circuit propagation delays of the respective signal sequences, resulting in a DC offset that occurs in the tracking error signal.

As a means for correcting the DC offset in the tracking error signal, there has conventionally been used a method of adding an offset correction amount to the generated tracking error signal to correct the DC offset in the tracking error signal.

In the conventional DC offset correction method, however, since an offset correction amount is undesirably added to the tracking error signal even when there is no input signal and no phase difference is detected at such as a defect position or a non-recorded position, an offset voltage is undesirably outputted when there is no signal, resulting in unstable tracking servo.

The present invention is made to solve the above-mentioned problems and has for its object to provide a phase error detection apparatus which can correct a DC offset of a tracking error signal in tracking error signal detection using the phase difference method.

Measures to Solve the Problems

In order to solve the above-mentioned problems, according to claim 1 of the present invention, there is provided a phase error detection apparatus comprising: a signal generation circuit for sampling two signal sequences whose phases mutually change, thereby generating digital signals; a zerocross point detection circuit for detecting a zerocross point where the digital signal of each sequence crosses a center level of the digital signal, from an output signal of the signal generation circuit; a phase difference detection circuit for performing phase comparison between the two sequences of digital signals by using a distance between the zerocross points of the two digital signals, and outputting a phase comparison result obtained between the respective zerocross points, as a pulse corresponding to one sampling clock, and further, outputting a phase comparison completion signal indicating that the phase comparison has completed; an offset control circuit for outputting an offset correction amount according to the phase comparison completion signal from the phase difference detection circuit; an addition circuit for adding a phase comparison result output signal from the phase difference detection circuit and the output signal from the offset control circuit; a low-pass filter for performing band limitation on a signal outputted from the addition circuit to obtain a phase error signal; and an offset correction circuit for detecting an offset amount of the phase error signal from the output of the low-pass filter, adjusting the offset correction amount on the basis of the detected offset amount, and outputting the offset correction amount to the offset control circuit.

According to an embodiment of the present invention, the phase error detection apparatus defined in claim 1 further includes a photodetector which receives reflected light from a light spot that is obtained by irradiating an optical disc with light, and outputs a signal according to an amount of the received light; the signal generation circuit generates two sequences of digital signals whose phases mutually change according to a tracking error of the light spot, from an output signal of the photodetector; and the phase error signal is a tracking error signal.

According to another embodiment of the present invention, a phase error detection apparatus defined in a different embodiment further includes a defect/non-recording detection unit for detecting a defect such as scratch or stain on the optical disc or a non-recorded state from the output signal of the photodetector, and performing control so that the output of the offset control circuit becomes 0 during a period when a defect or a non-recorded state is detected.

According to another embodiment of the present invention, there is provided a phase error detection apparatus comprising: a signal generation circuit for sampling two signal sequences whose phases mutually change, thereby generating digital signals; a zerocross point detection circuit for detecting a zerocross point where the digital signal of each sequence crosses a center level of the digital signal, from an output signal of the signal generation circuit; a phase difference detection circuit for performing phase comparison between the two sequences of digital signals by using a distance between the zerocross points of the two digital signals, and outputting a phase comparison result obtained between the respective zerocross points, as a pulse corresponding to one sampling clock, and further, outputting a phase comparison completion signal indicating that the phase comparison has completed; a reference interval generation circuit for outputting a reference signal for each predetermined interval; an effective phase difference detection circuit for outputting a control signal indicating whether a phase comparison completion signal from the phase difference detection circuit is detected or not within the interval of the reference signal from the reference interval generation circuit; an offset control circuit for outputting an offset correction amount when a phase comparison completion signal has been detected, and outputting 0 when no phase comparison completion signal is detected, according to the control signal from the effective phase difference detection circuit; an addition circuit for adding the output of the offset control circuit to a phase comparison result output signal from the phase difference detection circuit; a low-pass filter for performing band limitation on a signal outputted from the addition circuit to obtain a phase error signal; and an offset correction circuit for detecting an offset amount of the phase error signal from the output of the low-pass filter, adjusting the offset correction amount on the basis of the detected offset amount, and outputting the offset correction amount to the offset control circuit.

According to an embodiment of the present invention, there is provided a phase error detection apparatus comprising: a signal generation circuit for sampling two signal sequences whose phases mutually change, thereby generating digital signals; a zerocross point detection circuit for detecting a zerocross point where the digital signal of each sequence crosses a center level of the digital signal, from an output signal of the signal generation circuit; a phase difference detection circuit for performing phase comparison between the two sequences of digital signals by using a distance between the zerocross points of the two digital signals, and outputting a phase comparison result obtained between the respective zerocross points, as a pulse corresponding to one sampling clock, and further, outputting a phase comparison completion signal indicating that the phase comparison has completed; a reference interval generation circuit for outputting a reference signal for each predetermined interval; an effective phase difference detection circuit for outputting a control signal indicating whether a phase comparison completion signal from the phase difference detection circuit is detected or not within the interval of the reference signal from the reference interval generation circuit; an offset control circuit for outputting an offset correction amount when a phase comparison completion signal is detected, and outputting 0 when no phase comparison completion signal is detected, according to the control signal from the effective phase difference detection circuit; a low-pass filter for performing band limitation on a phase comparison result output signal from the phase difference detection circuit; an addition circuit for adding an output of the offset control circuit to an output of the low-pass filter to obtain a phase error signal; and an offset correction circuit for detecting an offset amount of the phase error signal from the output of the low-pass filter, adjusting the offset correction amount on the basis of the detected offset amount, and outputting the offset correction amount to the offset control circuit.

According to another embodiment of the present invention, the phase error detection apparatus defined in a different embodiment further includes a photodetector which receives reflected light from a light spot that is obtained by irradiating an optical disc with light, and outputs a signal according to an amount of the received light; the signal generation circuit generates two sequences of digital signals whose phases mutually change according to a tracking error of the light spot, from an output signal of the photodetector; and the phase error signal is a tracking error signal.

According to another embodiment of the present invention, there is provided a phase error detection apparatus comprising: a photodetector comprising a light-receiving element which is divided into four parts along a tangent direction and a vertical direction of data tracks recorded as data pit lines on an optical disc; a zerocross point detection circuit for detecting a zerocross point where the digital signal of each sequence crosses a center level of the digital signal, from four sequences of digital signals that are generated according to the amounts of light received by the respective light-receiving elements and are outputted from the photodetector; a first phase difference detection circuit for performing phase comparison of digital signals by using a distance between the zerocross points of the two sequences of digital signals that are obtained from the light-receiving elements positioned forward in an advancing direction of the data tracks, among the zerocross points of the four sequences of digital signals, and outputting a phase comparison result obtained between the respective zerocross points, as a pulse corresponding to one sampling clock, and further outputting a phase comparison completion signal indicating that phase comparison has been completed; a reference interval generation circuit for outputting a reference signal for each predetermined interval; a first effective phase difference detection circuit for outputting a control signal indicating whether a phase comparison completion signal from the first phase difference detection circuit is detected as an effective phase difference or not within the interval of the reference signal from the reference interval generation circuit; a second phase difference detection circuit for performing phase comparison of digital signals by using a distance between the zerocross points of the two sequences of digital signals that are obtained from the light-receiving elements positioned backward in the advancing direction of the data tracks, among the zerocross points of the four sequences of digital signals, and outputting a phase comparison result obtained between the respective zerocross points, as a pulse corresponding to one sampling clock, and further outputting a phase comparison completion signal indicating that phase comparison has been completed; a second effective phase difference detection circuit for outputting a control signal indicating whether a phase comparison completion signal from the second phase difference detection circuit is detected or not within the interval of the reference signal from the reference interval generation circuit; an offset control circuit for outputting an offset correction amount only when both the first and second effective phase difference detection circuits detect the phase comparison completion signal, according to the control signals from the first and second effective phase difference detection circuits, and outputting 0 when either or both of the effective phase difference detection circuits detect no phase comparison completion signal; a first addition circuit for adding a phase comparison result output from the first phase difference detection circuit and a phase comparison result output from the second phase difference detection circuit; a second addition circuit for adding an output from the first addition circuit and an output from the offset control circuit; a low-pass filter for performing band limitation on a signal outputted from the second addition circuit to obtain a tracking error signal; and an offset correction circuit for detecting an offset amount of a phase error signal from an output of the low-pass filter, adjusting the offset correction amount on the basis of the detected offset amount, and outputting the offset correction amount to the offset control circuit.

According to another embodiment of the present invention, the phase error detection apparatus defined in a different embodiment further includes a linear velocity detection unit for detecting a linear velocity of the optical disc, and a set period adjustment unit for changing the output signal interval of the reference interval generation circuit according to an output of the linear velocity detection unit.

According to another embodiment of the present invention, in the phase error detection apparatus defined in a different embodiment, the linear velocity detection unit includes a PLL unit for outputting a clock that is synchronized with a reproduction signal of the optical disc, and a counter for counting the number of inputs of clocks outputted from the PLL unit within a predetermined period to measure a linear velocity.

According to another embodiment of the present invention, the phase error detection apparatus defined in a different embodiment further includes a PLL unit for outputting a clock that is synchronized with a reproduction signal from the optical disc, and the reference interval generation circuit has a counter that operates with the output clock from the PLL unit, and outputs the reference signal every time the counter counts a predetermined value.

According to another embodiment of the present invention, in the phase error detection apparatus defined in a different embodiment, the PLL unit further outputs a control signal indicating whether the output clock is synchronized with the reproduction signal or not, and the counter receives the control signal from the PLL unit, and operates with the output clock from the PLL unit only when the output clock from the PLL unit is synchronized with the reproduction signal, while it operates with a fixed clock in other cases.

According to another embodiment of the present invention, in the phase error detection apparatus defined in a different embodiment, the reference interval generation circuit has a first set value that determines a count value for outputting a reference signal when the counter operates with the output clock from the PLL unit, and a second set value that determines a count value for outputting a reference signal when the counter operates with the fixed clock; and the phase error detection apparatus further includes a set value control unit which receives the control signal from the PLL unit, and controls, when the PLL unit is synchronized with the reproduction signal, the second count set value so that the output interval of the reference signal from the reference interval generation circuit becomes equal between when the counter operates with the output clock from the PLL unit and when it operates with the fixed clock.

According to another embodiment of the present invention, the phase error detection apparatus defined in a different embodiment further includes a count circuit for counting the number of the phase comparison completion signals outputted from the phase difference detection circuit within the interval of the reference signal from the reference interval generation circuit; an averaging circuit for averaging the outputs from the count circuit; and a set value control unit for adjusting the interval for outputting the reference signal from the reference interval generation circuit so that the output value of the averaging circuit becomes a predetermined value.

According to another embodiment of the present invention, the phase error detection apparatus defined in a different embodiment further includes a defect/non-recording detection unit for detecting a defect such as scratch or stain on the optical disc or a non-recorded state, from the output signal of the photodetector, and holding the input/output signals of the averaging circuit during a period when a defect or a non-recorded state is detected.

According to another embodiment of the present invention, the phase error detection apparatus defined in a different embodiment further includes pulse width detection circuits provided for the respective signal sequences, each circuit measuring a distance between the zerocross points of the respective signal sequences, from the output of the zerocross point detection circuit; and an ineffective phase comparison cancel unit for, when the zerocross interval detected by the pulse width detection circuit is smaller than a predetermined value, nullifying the phase comparison completion signal at the corresponding zerocross point, and stopping the output to the effective phase difference detection circuit.

According to another embodiment of the present invention, the phase error detection apparatus defined in a different embodiment further includes amplitude detection circuits provided for the respective signal sequences, each circuit detecting an absolute value of a difference from a center level of sample data between the zerocross points, as a signal amplitude value, from the output of the zerocross point detection circuit; and when the signal amplitude value detected by the amplitude detection circuit is smaller than a predetermined value, the ineffective phase difference cancel unit nullifies the phase comparison completion signal at the corresponding zerocross point, and stops the output to the effective phase difference detection circuit.

According to another embodiment of the present invention, the phase error detection apparatus defined in a different embodiment further includes a defect/non-recording detection unit for detecting a defect such as scratch or stain on the optical disc or a non-recorded state, from the output signal of the photodetector, and performing control so that the output of the offset control circuit becomes 0 during a period when a defect or a non-recorded state is detected.

According to another embodiment of the present invention, there is provided a phase error detection apparatus comprising: a signal generation circuit for sampling two signal sequences whose phases mutually change, thereby generating digital signals; a zerocross point detection circuit for detecting a zerocross point where the digital signal of each sequence crosses a center level of the digital signal, from an output signal of the signal generation circuit; a phase difference detection circuit for performing phase comparison between the two sequences of digital signals by using a distance between the zerocross points of the two digital signals, and outputting a phase comparison result obtained between the respective zerocross points, as a pulse corresponding to one sampling clock, and further, outputting a phase comparison completion signal indicating that the phase comparison has completed; a reference interval generation circuit for outputting a reference signal for each predetermined interval; a monitoring period generation circuit for outputting a signal during a predetermined period of time, for each output of the reference signal from the reference interval generation circuit; an effective phase difference detection circuit for outputting a control signal indicating whether a phase comparison completion signal from the phase difference detection circuit is detected within a period when the signal is outputted from the monitoring period generation circuit; an offset control circuit for pulse-outputting an offset correction amount when a phase comparison completion signal is detected, and outputting 0 when no phase comparison completion signal is detected, for each output of the reference signal from the reference interval generation circuit; an addition circuit for adding an output of the offset control circuit to a phase comparison result output signal from the phase difference detection circuit; a low-pass filter for performing band limitation on a signal outputted from the adder to obtain a phase error signal; and an offset correction circuit for detecting an offset amount of the phase error signal from the output of the low-pass filter, adjusting the offset correction amount on the basis of the detected offset amount, and outputting the offset correction amount to the offset control circuit.

According to another embodiment of the present invention, the phase error detection apparatus defined in a different embodiment further includes a photodetector which receives reflected light from a light spot that is obtained by irradiating an optical disc with light, and outputs a signal according to an amount of the received light; the signal generation circuit generates two sequences of digital signals whose phases mutually change according to a tracking error of the light spot, from an output signal of the photodetector; and the phase error signal is a tracking error signal.

According to another embodiment of the present invention, a phase error detection apparatus comprising: a photodetector comprising a light-receiving element which is divided into four parts along a tangent direction and a vertical direction of data tracks recorded as data pit lines on an optical disc; a zerocross point detection circuit for detecting a zerocross point where the digital signal of each sequence crosses a center level of the digital signal, from four sequences of digital signals that are generated according to the amounts of light received by the respective light-receiving elements and are outputted from the photodetector; a first phase difference detection circuit for performing phase comparison of digital signals by using a distance between the zerocross points of the two sequences of digital signals that are obtained from the light-receiving elements positioned forward in an advancing direction of the data tracks, among the zerocross points of the four sequences of digital signals, and outputting a phase comparison result obtained between the respective zerocross points, as a pulse corresponding to one sampling clock, and further outputting a phase comparison completion signal indicating that phase comparison has been completed; a reference interval generation circuit for outputting a reference signal for each predetermined interval; a monitoring period generation circuit for outputting a signal for a predetermined period, for each reference signal from the reference interval generation circuit; a first effective phase difference detection circuit for outputting a control signal indicating whether a phase comparison completion signal from the first phase difference detection circuit is detected or not, within a period when the monitoring period generation circuit outputs the signal; a second phase difference detection circuit for performing phase comparison of digital signals by using a distance between the zerocross points of the two sequences of digital signals that are obtained from the light-receiving elements positioned backward in the advancing direction of the data tracks, among the zerocross points of the four sequences of digital signals, and outputting a phase comparison result obtained between the respective zerocross points, as a pulse corresponding to one sampling clock, and further outputting a phase comparison completion signal indicating that phase comparison has been completed; a second effective phase difference detection circuit for outputting a control signal indicating whether a phase comparison completion signal from the second phase difference detection circuit is detected or not, within the period when the monitoring period generation circuit outputs the signal; an offset control circuit for pulse-outputting an offset correction amount only when both the first and second effective phase difference detection circuits detect the phase comparison completion signal, for each output signal from the reference interval generation circuit, according to the control signals from the first and second effective phase difference detection circuits, and outputting 0 when either or both of the effective phase difference detection circuits detect no phase comparison completion signal; a first addition circuit for adding a phase comparison result output from the first phase difference detection circuit and a phase comparison result output from the second phase difference detection circuit; a second addition circuit for adding an output from the first addition circuit and an output from the offset control circuit; a low-pass filter for performing band limitation on a signal outputted from the second addition circuit to obtain a tracking error signal; and an offset correction circuit for detecting an offset amount of a phase error signal from an output of the low-pass filter, adjusting the offset correction amount on the basis of the detected offset amount, and outputting the offset correction amount to the offset control circuit.

According to another embodiment of the present invention, in the phase error detection apparatus defined in a different embodiment, the monitoring period generation circuit repeats outputting of the signal for a predetermined period of time, for each output of the reference signal from the reference interval generation circuit; and the effective phase difference detection circuit repeatedly monitors the phase comparison completion signal during the signal output period from the monitoring period generation circuit outputs the signal, and outputs a control signal indicating whether a ratio between the number of the output signal periods from the monitoring period generation circuit when the phase comparison completion signal is detected and the number of the periods when no phase comparison completion signal is detected is larger than a predetermined value or not, within the output signal interval from the reference interval generation circuit.

According to another embodiment of the present invention, the phase error detection apparatus defined in a different embodiment further includes a linear velocity detection unit for detecting a linear velocity of the optical disc; and a set period adjustment unit for changing the output signal period of the monitoring period generation circuit according to the output of the linear velocity detection unit.

According to another embodiment of the present invention, in the phase error detection apparatus defined in a different embodiment the linear velocity detection unit includes a PLL unit for outputting a clock that is synchronized with a reproduction signal from the optical disc, and a counter for counting the number of inputs of output clocks from the PLL unit within a predetermined period to measure a linear velocity.

According to another embodiment of the present invention, the phase error detection apparatus defined in a different embodiment further includes a PLL unit for outputting a clock that is synchronized with a reproduction signal from the optical disc, and the monitoring period generation circuit has a counter that operates with the output clock from the PLL unit, and outputs the signal every time the counter counts a predetermined value.

According to another embodiment of the present invention, in the phase error detection apparatus defined in a different embodiment, the PLL unit further outputs a control signal indicating whether the output clock is synchronized with the reproduction signal or not, and the counter receives the control signal from the PLL unit, and operates with the output clock from the PLL unit only when the output clock from the PLL unit is synchronized with the reproduction signal, while it operates with a fixed clock in other cases.

According to another embodiment of the present invention, in the phase error detection apparatus defined in a different embodiment, the monitoring period generation circuit has a first set value that determines a count value for outputting a signal when the counter operates with the output clock from the PLL unit, and a second set value that determines a count value for outputting a signal when the counter operates with the fixed clock; and the phase error detection apparatus further includes a set value control unit which receives the control signal from the PLL unit, and controls, when the PLL unit is synchronized with the reproduction signal, the second count set value so that the period of the output signal from the monitoring period generation circuit becomes equal between when the counter operates with the output clock from the PLL unit and when it operates with the fixed clock.

According to another embodiment of the present invention, the phase error detection apparatus defined in a different embodiment further includes a count circuit for counting the number of the phase comparison completion signals outputted from the phase difference detection circuit, within the period of the signal output from the monitoring period generation circuit; an averaging circuit for averaging the outputs from the count circuit; and a set value control unit for adjusting the output signal period of the monitoring period generation circuit so that the output value of the averaging circuit becomes a predetermined value.

According to another embodiment of the present invention, the phase error detection apparatus defined in a different embodiment further includes a defect/non-recording detection unit for detecting a defect such as scratch or stain on the optical disc or a non-recorded state, from the output signal of the photodetector, and holding the input/output signals of the averaging circuit during a period when a defect or a non-recorded state is detected.

According to another embodiment of the present invention, the phase error detection apparatus defined in a different embodiment further includes pulse width detection circuits provided for the respective signal sequences, each circuit measuring a distance between the zerocross points of the respective signal sequences, from the output of the zerocross point detection circuit; and an ineffective phase comparison cancel unit for, when the zerocross interval detected by the pulse width detection circuit is smaller than a predetermined value, nullifying the phase comparison completion signal at the corresponding zerocross point, and stopping the output to the effective phase difference detection circuit.

According to another embodiment of the present invention, the phase error detection apparatus defined in a different embodiment further includes amplitude detection circuits provided for the respective signal sequences, each circuit detecting an absolute value of a difference from a center level of sample data between the zerocross points, as a signal amplitude value, from the output of the zerocross point detection circuit; and when the signal amplitude value detected by the amplitude detection circuit is smaller than a predetermined value, the ineffective phase difference cancel unit nullifies the phase comparison completion signal at the corresponding zerocross point, and stops the output to the effective phase difference detection circuit.

According to another embodiment of the present invention, the phase error detection apparatus defined in a different embodiment further includes a defect/non-recording detection unit for detecting a defect such as scratch or stain on the optical disc or a non-recorded state, from the output signal of the photodetector, and performing control so that the output of the offset control circuit becomes 0 during a period when a defect or a non-recorded state is detected.

Effects of the Invention

Since the present invention is constituted as described above, the following effects can be achieved.

According to the phase error detection apparatus relating to embodiments of the invention, an offset amount of a pulse output is added every time phase comparison is performed, by the offset control circuit that outputs an offset correction amount according to a phase comparison completion signal outputted from the phase comparator. Therefore, offset correction of a phase error signal can be performed only when phase comparison is performed.

Further, according to another embodiment, the phase error detection apparatus disclosed in a different embodiment is provided with a defect/non-recording detection unit which detects a defect such as scratch or stain on the optical disc or a non-recorded state, and performs control so that the value outputted from the offset control circuit becomes 0 during a period when a defect or a non-recorded state is detected. Therefore, it is possible to resolve offset addition due to malfunction of the phase difference detection circuit, which is caused by noise or the like in a defect position or a non-recorded position, thereby obtaining a stable tracking error signal.

Further, the phase error detection apparatus relating to embodiments of the invention is provided with the effective phase difference detection circuit which outputs a control signal indicating whether a phase comparison completion signal from the phase difference detection circuit is detected or not within an interval of a reference signal that is outputted at a set interval from the reference interval generation circuit, and the offset control circuit which outputs an offset correction amount when a phase comparison completion signal is detected, and does not output an offset correction amount when no phase comparison completion signal is detected, according to the control signal from the effective phase difference detection circuit. Therefore, offset correction for the phase error signal can be performed only when phase comparison is performed, without performing offset correction in a position where no phase comparison is performed.

Further, the phase error detection apparatus relating to an embodiment is provided with the two series of phase error detection circuits that are correlated with each other, and the effective phase difference detection circuits corresponding to the respective phase difference detection circuits, and an offset correction amount is outputted from the offset control circuit only when phase comparison completion signals are detected in the both effective phase difference detection circuits. Therefore, it is possible to reduce output of an offset correction amount corresponding to malfunction of the phase difference detection circuit due to noise or the like, thereby realizing more accurate offset correction for the tracking error signal.

Further, according to another embodiment, the phase error detection apparatus defined in a different embodiment is provided with a function of adjusting the output interval of the reference signal from the reference interval generation circuit according to a linear velocity. Therefore, even when performing CAV playback having different linear velocities at the inner and outer circumferences of the disc, the average number of phase comparisons within the interval of the reference signal from the reference interval generation circuit does not vary at the inner and outer circumferences of the disc, and thereby detection sensitivity of the phase comparison completion signal in the effective phase difference detection circuit can be always made constant.

Further, according to another embodiment, the phase error detection apparatus defined in a different embodiment is provided with the PLL unit which outputs a clock synchronized with a reproduction signal of the optical disc, and the reference interval generation circuit is constituted by a counter that operates with the output clock from the PLL unit, and outputs a reference signal for each predetermined count value. Therefore, even when performing CAV playback having different linear velocities at the inner and outer circumferences of the disc, the interval of the output signal from the reference interval generation circuit automatically varies according to the linear velocities at the inner and outer circumferences of the disc, and the average number of phase comparisons within the output signal interval of the reference interval generation circuit does not vary, whereby detection sensitivity of the phase comparison completion signal in the effective phase difference detection circuit can be always made constant.

Further, according to another embodiment, the phase error detection apparatus defined in a different embodiment is provided with a function of switching the operation clock of the counter of the reference interval generation circuit between a PLL clock and a fixed clock according to a control signal indicating whether the PLL unit outputs a clock synchronized with the reproduction signal or not. Therefore, the counter is operated with the fixed clock when the PLL unit does not output a clock synchronized with the reproduction signal, whereby the reference interval generation circuit can be operated with stability even when the PLL unit does not output a clock synchronized with the reproduction signal.

Further, according to another embodiment, in the phase error detection apparatus defined in a different embodiment, there are provided different set values for determining an output signal interval of the reference interval generation circuit, for the case where the counter is operated with the PLL clock and the case where it is operated with the fixed clock, and the apparatus is provided with a function of adjusting the set value during the operation with the fixed clock so that the interval of the output signal from the reference interval generation circuit becomes the same regardless of the clock with which the counter is operated, according to the relationship between the frequency of the PLL clock and the frequency of the fixed clock, when the PLL outputs a clock synchronized with the reproduction signal. Therefore, even when the PLL is suddenly out of synchronization due to disturbance, the output pulse interval of the reference interval generation circuit does not vary, whereby detection sensitivity of the phase comparison completion signal in the effective phase difference detection circuit can be kept constant.

Further, according to another embodiment, the phase error detection apparatus defined in a different embodiment is provided with a function of counting the number of the phase comparison completion signals outputted from the phase difference detection circuit during the interval of the reference signal from the reference interval generation circuit, averaging the count values through the averaging circuit, and controlling the interval of the output signal from the reference interval generation circuit so that the output value of the averaging circuit becomes a predetermined value. Therefore, even when performing CAV playback having different linear velocities at the inner and outer circumferences of the disc, the average number of phase comparisons during the output signal interval of the reference interval generation circuit does not vary between the inner and outer circumferences, whereby detection sensitivity of the phase comparison completion signal in the effective phase difference detection circuit can always be kept constant.

Further, according to another embodiment, the phase error detection apparatus defined in a different embodiment is provided with a function of detecting a defect such as scratch or stain on the optical disc or a non-recorded state, and holding the input/output signals of the averaging circuit during a period when a defect or a non-recorded state is detected. Therefore, detection sensitivity of the effective phase difference detection circuit can be kept with stability by preventing reduction in the output of the averaging circuit in the state where there is no input signal and no phase comparison completion signal is outputted, such as in a defect position or a non-recorded position.

According to another embodiment, the phase error detection apparatus defined in a different embodiment further includes the pulse width detection circuits provided for the respective signal sequences, each circuit measuring a distance between the zerocross points of the respective signal sequences, from the output of the zerocross point detection circuit, and the ineffective phase comparison cancel unit for, when the zerocross interval is smaller than a predetermined value, nullifying the phase comparison completion signal at the corresponding zerocross point so as not to be input to the effective phase difference detection circuit. Therefore, it is possible to reduce addition of an offset correction amount due to malfunction of the phase difference detection circuit which is caused by noise or the like.

Further, according to another embodiment, the phase error detection apparatus defined in a different embodiment further includes amplitude detection circuits provided for the respective signal sequences, each circuit detecting an absolute value of a difference from a center level of sample data between the zerocross points, as a signal amplitude value, from the output of the zerocross point detection circuit, and even when the detected signal amplitude value is smaller than a predetermined value, the ineffective phase difference cancel unit nullifies the phase comparison completion signal at the corresponding zerocross point. Therefore, it is possible to reduce, more accurately, addition of an offset correction amount corresponding to malfunction of the phase difference detection circuit due to noise or the like.

Further, according to another embodiment, the phase error detection apparatus defined in a different embodiment further includes a function of detecting a defect such as scratch or stain on the optical disc or a non-recorded state, and performing control so that the output of the offset control circuit becomes 0 during a period when a defect or a non-recorded state is detected. Therefore, it is possible to resolve offset addition caused by malfunction of the phase difference detection circuit due to noise or the like in the state where there is no reproduction signal, such as in a defect position or a non-recorded position, thereby obtaining a stable tracking error signal.

Further, the phase error detection apparatus according to other embodiments is provided with the reference interval generation circuit for outputting a reference signal for each predetermined interval, the monitoring period generation circuit for outputting a signal during a predetermined period of time, for each output of the reference signal from the reference interval generation circuit, the effective phase difference detection circuit for outputting a control signal indicating whether a phase comparison completion signal from the phase difference detection circuit is detected within a period when the signal is outputted from the monitoring period generation circuit, and the offset control circuit for pulse-outputting an offset correction amount when a phase comparison completion signal is detected in the phase difference detection circuit, while outputting 0 when no phase comparison completion signal is detected, for each output signal from the reference interval generation circuit. Therefore, it is possible to perform offset correction for the phase error signal only when phase comparison is performed, without performing offset correction in a position where no phase comparison is performed.

Further, the phase error detection apparatus according to another embodiment is provided with the two series of phase error detection circuits that are correlated with each other, and the effective phase difference detection circuits corresponding to the respective phase difference detection circuits, and an offset correction amount is pulse-outputted from the offset control circuit only when phase comparison completion signals are detected in the both effective phase difference detection circuits. Therefore, it is possible to reduce output of an offset correction amount caused by malfunction of the phase difference detection circuit due to noise or the like, thereby realizing more accurate offset correction for the tracking error signal.

Further, according to another embodiment, in the phase error difference detection apparatus defined in a different embodiment, the monitoring period generation circuit repeatedly outputs the signal during a predetermined period of time, and the effective phase difference detection circuit monitors the phase comparison completion signal from the phase difference detection circuit during the signal output period from the monitoring period generation circuit, and outputs a control signal indicating whether a ratio between the number of the periods during which the phase comparison completion signal is detected within the output signal interval of the reference interval generation circuit and the number of the periods during which no phase comparison completion signal is detected is larger than a predetermined value or not. Therefore, it is possible to reduce offset addition corresponding to malfunction of the phase difference detection circuit due to noise or the like.

Further, according to another embodiment, the phase error detection apparatus defined in a different embodiment further includes a function of adjusting the output signal period of the monitoring period generation circuit according to a linear velocity. Therefore, even when performing CAV playback having different linear velocities at the inner and outer circumference of the disc, the average number of phase comparisons during the period of the output signal from the monitoring period generation circuit does not vary between the inner and outer circumferences of the disc, whereby detection sensitivity in the effective phase difference detection circuit can always be kept constant.

Further, according to another embodiment, the phase error detection apparatus defined in a different embodiment is provided with the PLL unit for outputting a clock that is synchronized with a reproduction signal from the optical disc, and the monitoring period generation circuit is constituted by a counter operating with the output clock from the PLL unit, and outputs the signal during a period corresponding to a predetermined number of counts. Therefore, even when performing CAV playback having different linear velocities at the inner and outer circumferences of the disc, the interval of the output signal from the reference interval generation circuit automatically changes according to the linear velocities, and the average number of phase comparisons during the signal output period of the monitoring period generation circuit does not vary, whereby detection sensitivity of the phase comparison completion signal in the effective phase difference detection circuit can always be kept constant.

Further, according to another embodiment, the phase error detection apparatus defined in a different embodiment is provided with a function of switching the operation clock of the counter that determines the signal output period of the monitoring period generation circuit, between a PLL clock and a fixed clock according to a control signal indicating whether the PLL unit outputs a clock synchronized with the reproduction signal or not, and the counter is operated with the fixed clock when the PLL unit does not output a clock synchronized with the reproduction signal. Therefore, the monitoring period generation circuit can be stably operated even when the PLL unit does not output a clock synchronized with the reproduction signal.

According to another embodiment of the present invention, in the phase error detection apparatus defined in a different embodiment, there are provided different set values of the signal output period from the monitoring period generation circuit, for the case where the counter operates with the PLL clock and the case where it operates with the fixed clock, and the apparatus is provided with a function of controlling the set value during the operation with the fixed clock so that the output signal period of the monitoring period generation circuit becomes the same regardless of the clock, according to the relationship between the frequency of the PLL clock and the frequency of the fixed clock, when the PLL unit outputs a clock synchronized with the reproduction signal. Therefore, even when the PLL is suddenly out of synchronization due to disturbance, the output signal period of the monitoring period generation circuit does not vary, and thereby detection sensitivity of the phase comparison completion signal in the effective phase difference detection circuit can be kept constant.

Further, according to another embodiment, the phase error detection apparatus defined in a different embodiment is provided with a function of counting the number of the phase comparison completion signals outputted from the phase difference detection circuit during the signal output period from the monitoring period generation circuit, averaging the count values through the averaging circuit, and adjusting the signal output period of the monitoring period generation circuit so that the output value of the averaging circuit becomes a predetermined value. Therefore, even when performing CAV playback having different linear velocities at the inner and outer circumferences of the disc, the average number of phase comparisons during the output signal period of the monitoring period generation circuit does not vary between the inner and outer circumferences, whereby detection sensitivity of the phase comparison completion signal in the effective phase difference detection circuit can always be kept constant.

Further, according to another embodiment, the phase error detection apparatus defined in a different embodiment is provided with a function of detecting a defect such as scratch or stain on the optical disc or a non-recorded state, and holding the input/output values of the averaging circuit during a period when a defect or a non-recorded state is detected. Therefore, it is possible to prevent a reduction in the output of the averaging circuit in the state where no signal exists, whereby detection sensitivity of the phase comparison completion signal in the effective phase difference detection circuit can be kept stably.

Further, according to another embodiment, the phase error detection apparatus defined in a different embodiment further includes pulse width detection circuits provided for the respective signal sequences, each circuit measuring an interval between the zerocross points of the respective signal sequences, from the output of the zerocross point detection circuit, and an ineffective phase comparison cancel unit for, when the zerocross interval is smaller than a predetermined value, nullifying the phase comparison completion signal at the corresponding zerocross point so as not to output the phase comparison completion signal. Therefore, it is possible to reduce addition of the offset correction amount, which is caused by malfunction of the phase difference detection circuit due to noise or the like.

Further, according to another embodiment, the phase error detection apparatus defined in a different embodiment further includes amplitude detection circuits provided for the respective signal sequences, each circuit receiving a zerocross point detection signal of each signal sequence outputted from the zerocross point detection circuit, and detecting an absolute value of a difference between the center level and the sample data between the zerocross points of the respective signal sequences, as a signal amplitude value, and the phase comparison completion signal at the corresponding zerocross point is nullified by the ineffective phase comparison cancel unit even when the detected signal amplitude value is smaller than a predetermined value. Therefore, it is possible to more accurately reduce addition of the offset correction amount corresponding to malfunction of the phase difference detection circuit due to noise or the like.

Further, according to another embodiment, the phase error detection apparatus defined in a different embodiment is provided with a function of detecting a defect such as scratch or stain on the optical disc or a non-recorded state, and performing control so that the offset correction amount outputted from the offset control circuit becomes 0 during a period when a defect or a non-recorded state is detected. Therefore, it is possible to resolve offset addition which is caused by malfunction of the phase difference detection circuit due to noise or the like at a defect position or a non-recorded position.

Figure 1:
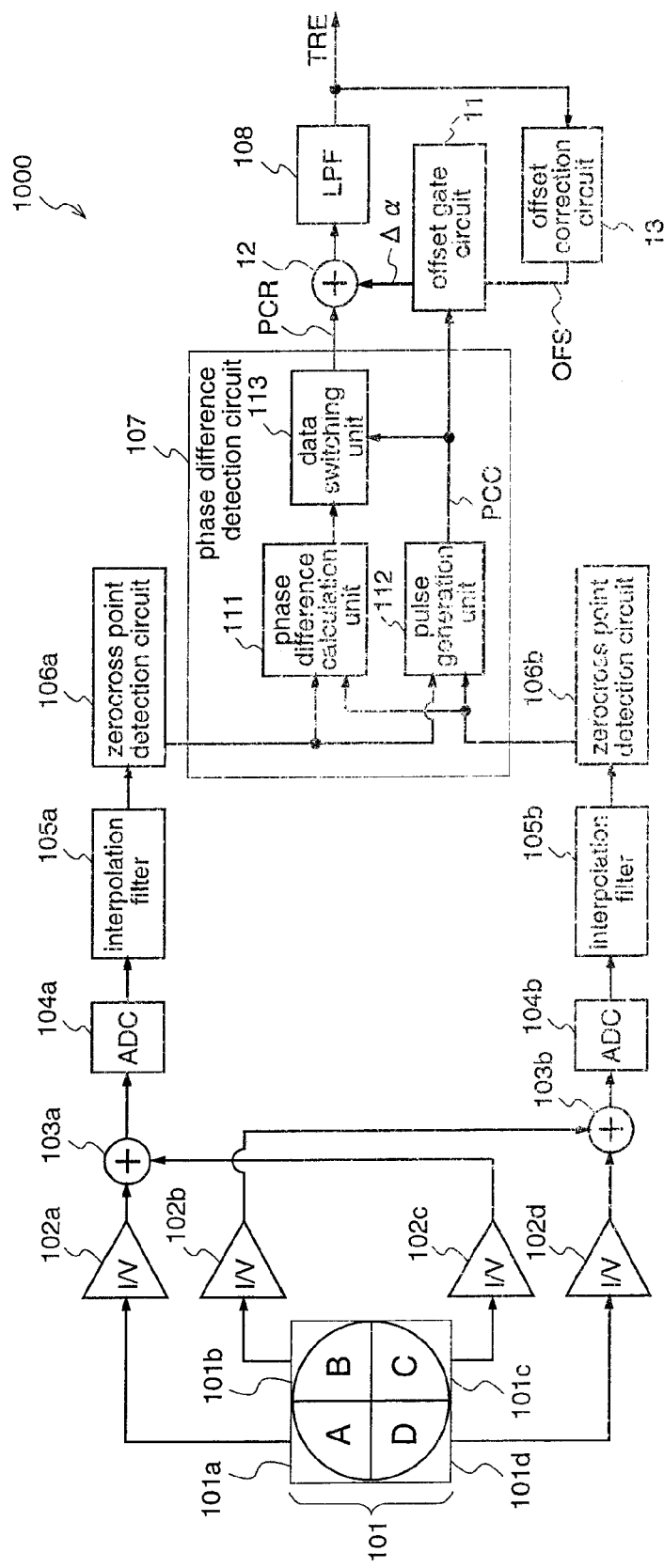
FIG. 1 is a block diagram illustrating the construction of a phase error detection apparatus 1000 according to a first embodiment of the present invention.

DESCRIPTION OF REFERENCE NUMERALS 11,21,32,84,91 . . . offset control circuit
13 . . . offset correction circuit
22,41,51,61,81 . . . reference interval generation circuit
23,83,242 . . . effective phase difference detection circuit
82,201,211,221,241 . . . monitoring period generation circuit
101a,101b,101c,101d . . . photodetector
102a,102b,102c,102d . . . current-to-voltage converter
103a,103b . . . adder
104a,104b,104c,104d . . . analog-to-digital converter
105a,105b,105c,105d . . . interpolation filter
106a,106b,106c,106d . . . zerocross point detection circuit
107 . . . phase difference detection circuit
108 . . . low-pass filter (LPF)

BEST MODE TO EXECUTE THE INVENTION

Embodiment 1

Hereinafter, a phase error detection apparatus according to a first embodiment of the present invention will be described.

FIG. 1 is a block diagram illustrating the phase error detection apparatus 1000 according to the first embodiment.

With reference to FIG. 1, the phase error detection apparatus 1000 according to the first embodiment is provided with a photodetector 101 which has light-receiving elements for receiving reflected light from a light spot, and outputs light currents according to the amounts of light received by the respective light-receiving elements, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, an offset control circuit 11, a third adder 12, and an offset correction circuit 13. The phase difference detection circuit 107 comprises a phase difference calculation unit 111, a pulse generation unit 112, and a data switching unit 113.

Figure 30:
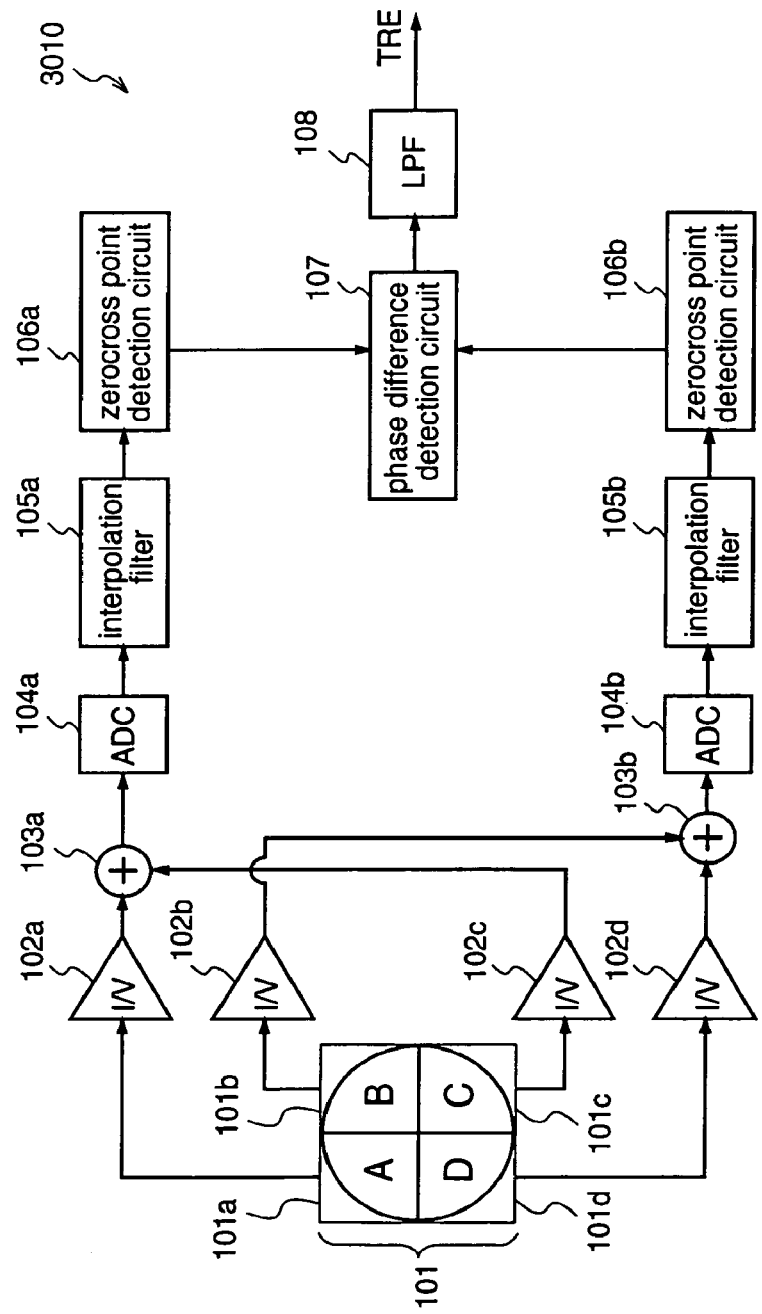
FIG. 30 is a block diagram illustrating the construction of the conventional phase error detection apparatus 3010.
Figure 31:
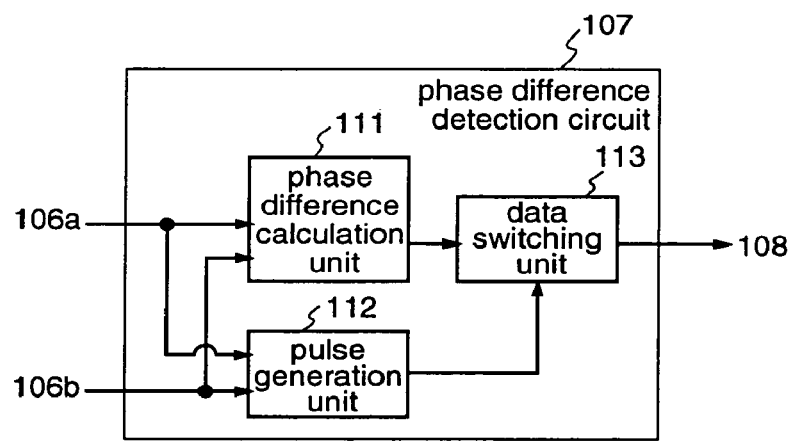
FIG. 31 is a block diagram illustrating the constructions of the phase difference detection circuits 23, 83, and 242 in the conventional phase error detection apparatus 3010.
Figure 32:
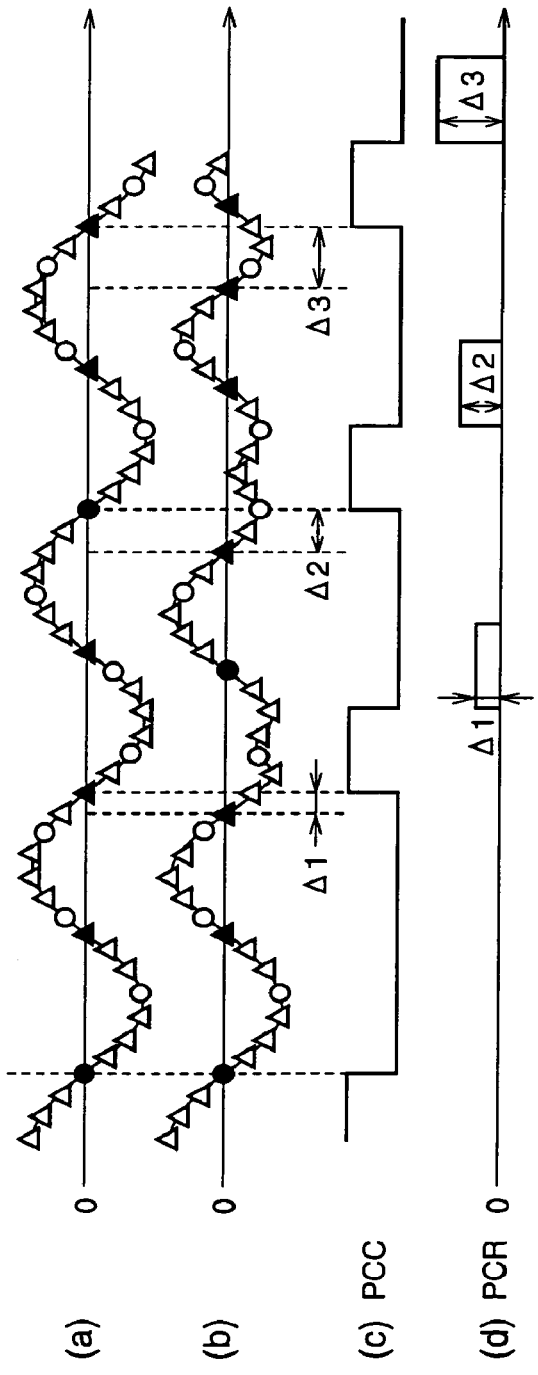
FIG. 32 is a diagram for explaining the operation of the phase difference detection circuit 107 in the conventional phase error detection apparatus.
Figure 33:
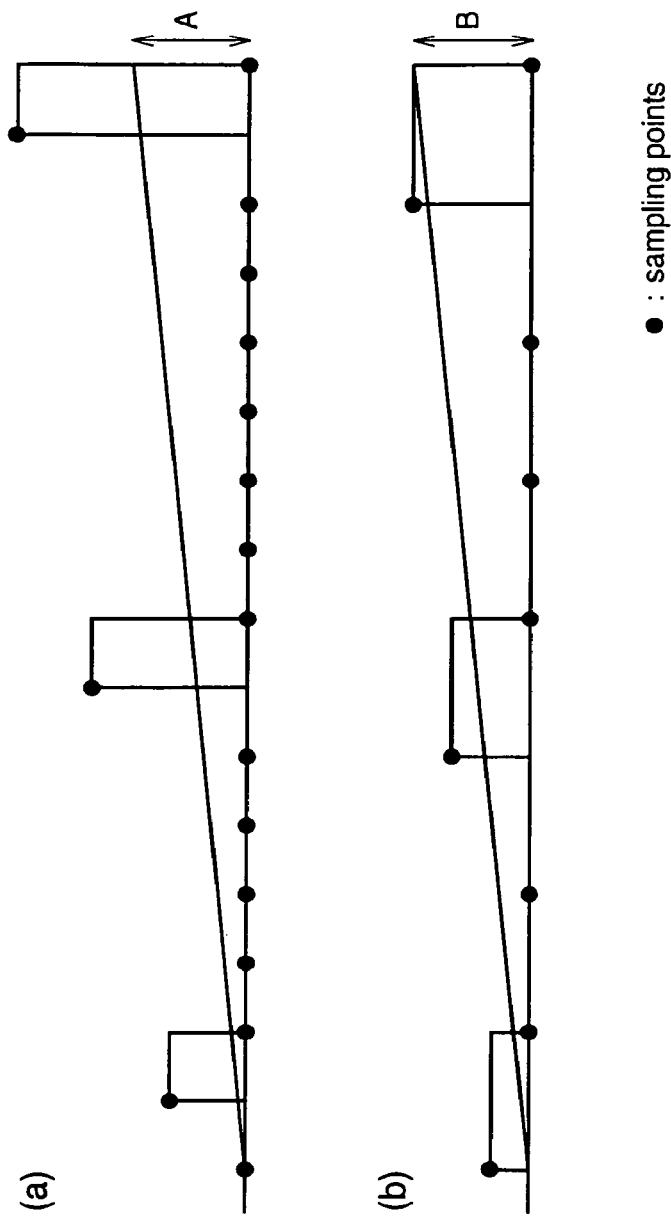
FIG. 33 is a diagram for explaining the operations of the phase difference detection circuits 23, 83, and 242 in the conventional phase error detection apparatus 3010, illustrating a tracking error signal TRE outputted from the conventional phase error detection apparatus during CAV playback.

The constituents of the phase error detection apparatus 1000 according to the first embodiment other than the offset control circuit 11, the third adder 12, and the offset correction circuit 13 are identical to those of the conventional phase error detection apparatus 3010 which has been explained with reference to FIGS. 30 and 31.

The offset control circuit 11 pulse-outputs an offset correction amount Δα outputted from the offset correction circuit 13, at a timing when the data switching unit 113 outputs a phase comparison result PCR, using a phase comparison completion signal PCC outputted from the pulse generation unit 112 as a control signal, and then the third adder 12 adds the offset correction amount Δα to the output signal PCR from the data switching unit 113.

The offset correction circuit 13 detects an offset amount OFS of a tracking error signal TRE from the output of the LPF 108, and outputs a value adjusted as an offset correction amount Δα to the offset control circuit 11. As an offset amount (OFS) detection method, for example, there is adopted a method of comparing peak values on the + side and the − side in the tracking error signal.

Next, the operation of the offset control circuit 11 according to the first embodiment will be described.

Figure 2:
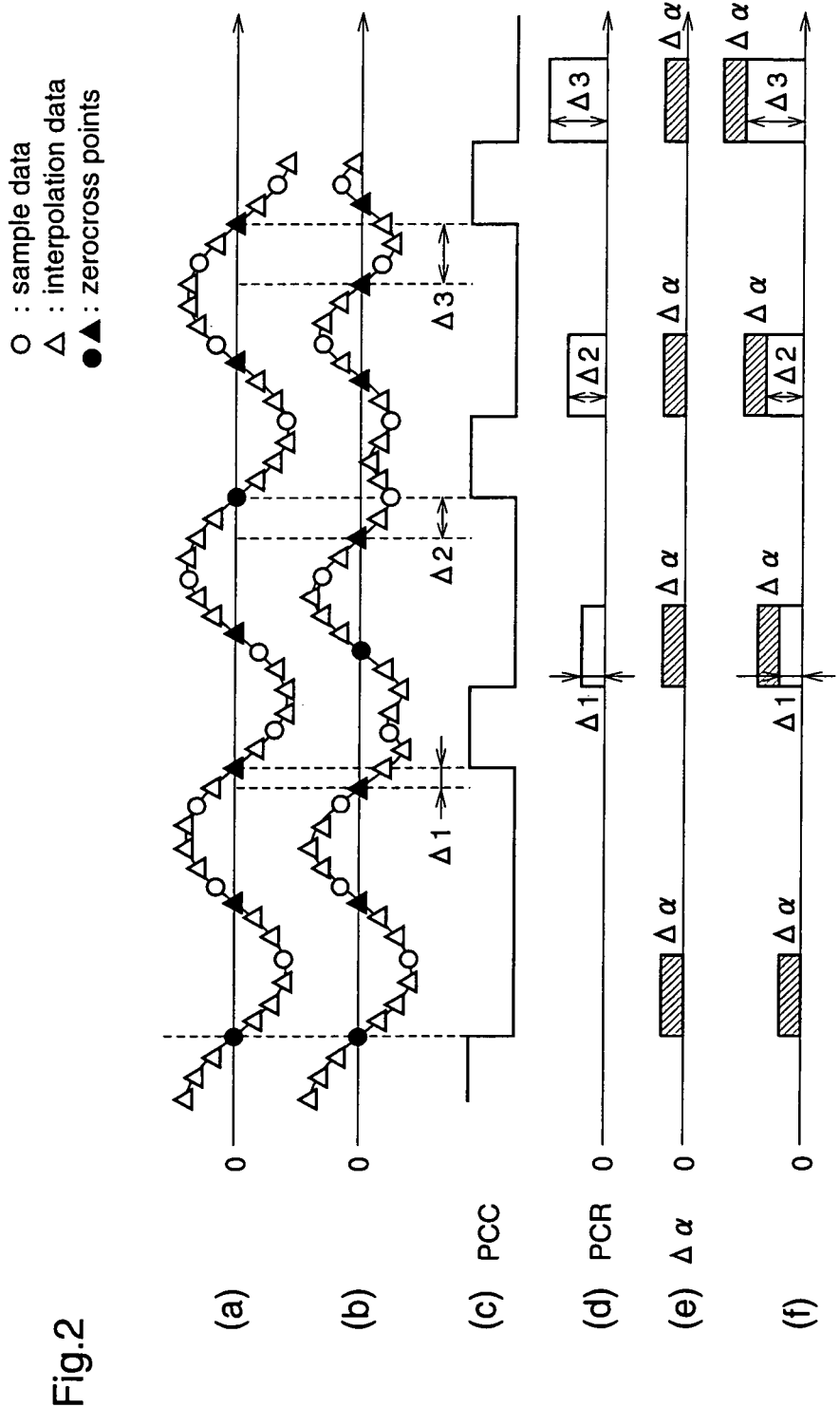
FIG. 2 is a diagram for explaining the operation of an offset control circuit 11 according to the first embodiment.

FIG. 2 is a diagram for explaining the operation of the offset control circuit 11 according to the first embodiment, and illustrates, from above, (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) a phase comparison output PCR outputted from the phase difference detection circuit 107, (e) an offset correction amount Δα outputted from the offset control circuit 11, and (f) an output of the adder 12.

The two sequences of signals outputted from the first and second zerocross point detection circuits 106a and 106b, which are phase comparison inputs A and B, are input to the phase difference calculation unit 111 and the pulse generation unit 112 of the phase difference detection circuit 107. In the phase difference calculation unit 111, phase differences Δ1, Δ2, and Δ3 are successively calculated on the basis of the zerocross data detected in the zerocross point detection circuits 106a and 106b. On the other hand, in the pulse generation unit 112, a pulse signal corresponding to one sampling clock is generated in a zerocross position in each of the respective data sequences used for phase comparison. Among the generated pulse signals corresponding to the respective data sequences, a pulse signal that appears later at a point where phase comparison is carried out is outputted as a phase comparison completion signal PCC (c).

Thereafter, the data switching unit 113 outputs the phase comparison result PCR outputted from the phase difference calculation unit 111, as a pulse corresponding to one sampling clock, on the basis of the phase comparison completion signal PCC outputted from the pulse generation unit 112 (d).

At this time, in the offset control circuit 11, an offset correction amount Δα is outputted on the basis of the phase comparison completion signal PCC outputted from the pulse generation circuit 112 (e).

Then, the output PCR of the data switching unit 113 and the output Δα of the offset control circuit 11 are added by the adder 12 (f), and the output of the adder 12 is subjected to band limitation by the LPF 108, thereby generating a tracking error signal TRE of a band required for tracking servo control.

As described above, in the phase error detection apparatus 1000 according to the first embodiment of the present invention, offset correction is performed only when phase comparison is performed on the basis of the phase comparison completion signal PCC, while offset correction is not performed in a position where no input signal exists and no phase comparison is performed, such as a defect position or an non-recorded position, thereby providing a phase error detection apparatus which can perform offset correction for a tracking error signal only when phase comparison is performed.

In this first embodiment, outputting of the offset correction value Δα from the offset control circuit 11 is performed in response to the output PCR of the data switching unit 113. However, outputting of the offset correction value from the offset control circuit 11 is not necessarily responded to the output from the data switching unit 113 so long as it is responded to the phase comparison completion signal PCC from the pulse generation unit 112. In either construction, the same effects as mentioned above can be achieved.

Further, in the construction shown in FIG. 2, phase comparison is performed at only sign-changing points from + to − among the zerocross points detected by the zerocross point detection circuits 106a and 106b. However, phase comparison may be performed at only zerocross points corresponding to sign-changing points from − to + to obtain a tracing error signal, or phase comparison may be performed at zerocross points corresponding to both the sign-changing points from + to − and the sign-changing points from − to + to obtain a tracking error signal. In either case, the same effects can be achieved.

Embodiment 2

Hereinafter, a phase error detection apparatus according to a second embodiment of the present invention will be described.

Figure 3:
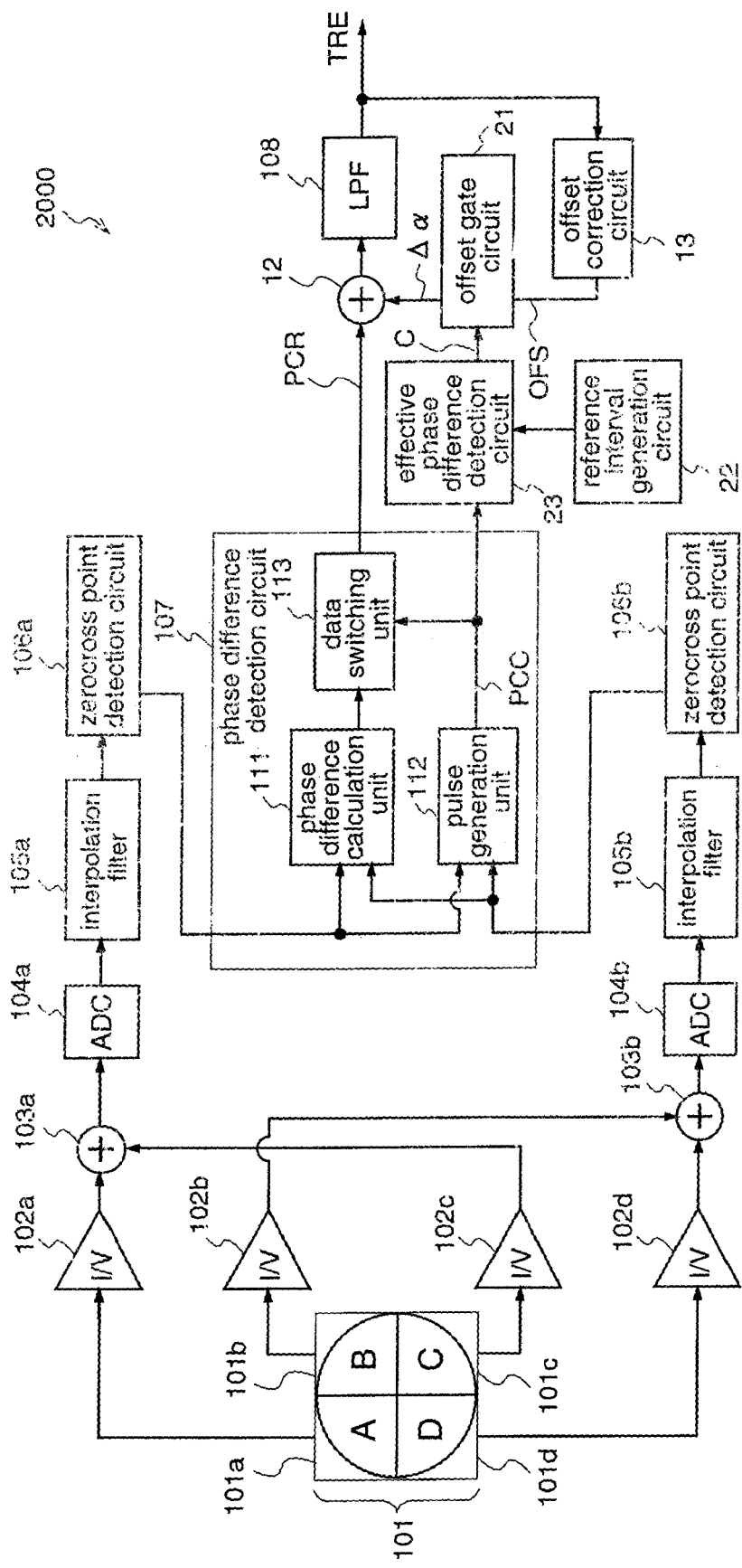
FIG. 3 is a block diagram illustrating the construction of a phase error detection apparatus 2000 according to a second embodiment of the present invention.

FIG. 3 is a block diagram illustrating the phase error detection apparatus 2000 according to the second embodiment.

In FIG. 3, the phase error detection apparatus 2000 according to the second embodiment is provided with a photodetector 101 which has light-receiving elements for receiving reflected light from a light spot, and outputs light currents according to the amounts of light received by the respective light-receiving elements, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, an offset control circuit 21, a reference interval generation circuit 22, and an effective phase difference detection circuit 23. The phase difference detection circuit 107 comprises a phase difference calculation unit 111, a pulse generation unit 112, and a data switching unit 113.

The constituents of the phase error detection apparatus 2000 according to the second embodiment other than the offset control circuit 21, the reference interval generation circuit 22, and the effective phase difference detection circuit 23 are identical to those of the phase error detection apparatus 1000 of the first embodiment shown in FIG. 1.

The reference interval generation circuit 22 successively outputs pulse signals at every predetermined interval to the effective phase difference detection unit 23.

The effective phase difference detection circuit 23 detects a phase comparison completion signal PCC outputted from the pulse generation unit 112 of the phase difference detection circuit 107 during an interval of the output pulse from the reference interval generation circuit 22, and updates the value of the control signal C for each pulse from the reference interval generation circuit 22 such that the control signal is "H" when the phase comparison completion signal PCC is detected while it is "L" when no phase comparison completion signal PCC is detected within the interval of the output pulse from the reference interval generation circuit 22, and outputs the control signal to the offset control circuit 21.

The offset control circuit 21 receives the control signal C from the effective phase difference detection circuit 23. When the control signal is "H", the offset control circuit 21 makes the offset correction circuit 13 output an offset correction amount Δα, and makes the adder 13 add the offset correction amount Δα to the output signal PCR from the data switching unit 113. When the control signal is "L", the offset control circuit 21 does not make the offset correction circuit 13 output the offset correction amount Δα to the adder 12, so that no offset correction is carried out.

Next, the operations of the offset control circuit 21, the reference interval generation circuit 22, and the effective phase difference detection circuit 23 according to the second embodiment will be described.

Figure 4:
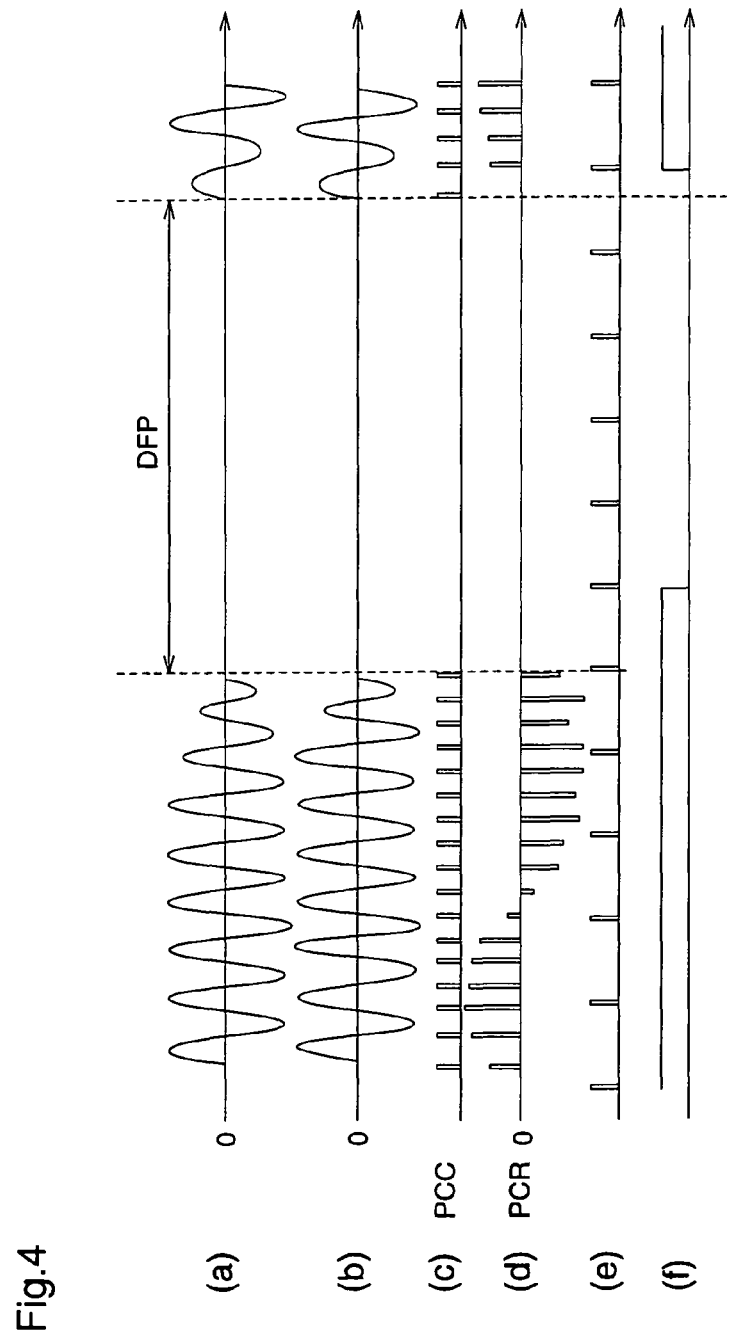
FIG. 4 is a diagram for explaining the operations of an offset control circuit 21, a reference interval generation circuit 22, and an effective phase difference detection circuit according to the second embodiment.

FIG. 4 is a diagram for explaining the operations of the offset control circuit 21, the reference interval generation circuit 22, and the effective phase difference detection circuit 23, and illustrates, from above, (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) a phase comparison output signal PCR outputted from the data switching unit 113, (e) an output signal from the reference interval generation circuit 22, and (f) a control signal from the effective phase difference detection circuit 23.

The reference interval generation circuit 22 outputs a pulse signal for each predetermined interval to the effective phase difference detection circuit 23 (e).

The effective phase difference detection circuit 23 updates the control signal C for each output pulse from the reference interval generation circuit 22 such that the control signal becomes "H" when the phase comparison completion signal PCC is outputted from the pulse generation unit 112 while it becomes "L" when no phase comparison completion signal PCC is outputted within the interval of the output pulse from the reference interval generation circuit 22, and outputs the control signal to the offset control circuit 21 (f).

The offset control circuit 21 outputs the offset correction amount Δα outputted from the offset correction circuit 13, to the adder 12 only when the control signal C from the effective phase difference detection circuit 22 is "H".

Then, the output PCR of the data switching unit 113 and the output Δα of the offset control circuit 21 are added by the adder 12, and finally, the output of the adder 12 is subjected to band limitation, thereby generating a tracking error signal TRE of a band required for tracking servo control.

As described above, according to the phase error detection apparatus 2000 of the second embodiment, the phase comparison completion signal PCC is monitored within a predetermined period of time, and offset correction is performed only when phase comparison is performed. Therefore, offset correction is not performed in a position where no input signal exists, no phase comparison is performed, and no phase comparison completion signal is outputted, such as a defect position DFP shown in FIG. 4 or a non-recorded position, thereby providing a phase error detection apparatus that can perform offset correction for the tracking error signal only when phase comparison is performed.

Further, according to the phase error detection apparatus 2000 of the second embodiment, since the offset correction amount $\Delta\alpha$ is continuously outputted from the offset control circuit 21 during the period when the control signal C from the effective phase difference detection circuit 23 is "H", even when performing CAV playback having different linear velocities at the inner and outer circumferences of the disc, the offset control amount after passing through the LPF does not vary between the inner and outer circumferences, whereby offset correction for the tracking error signal TRE can be carried out.

Embodiment 3

Hereinafter, a phase error detection apparatus according to a third embodiment of the present invention will be described.

Figure 5:
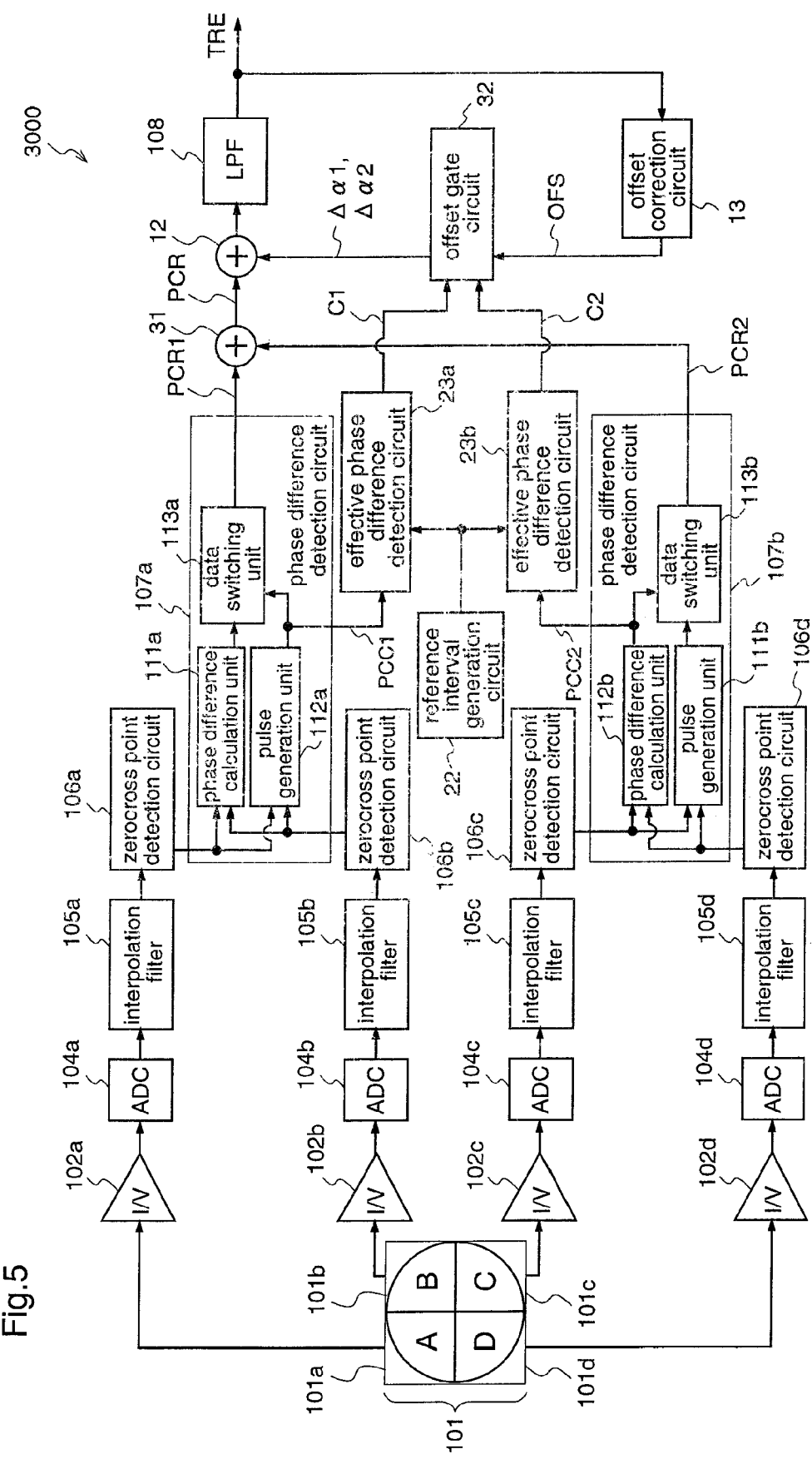
FIG. 5 is a block diagram illustrating the construction of a phase error detection apparatus 3000 according to a third embodiment of the present invention.

FIG. 5 is a block diagram illustrating the construction of the phase error detection apparatus 3000 according to the third embodiment.

In FIG. 5, the phase error detection apparatus 3000 according to the third embodiment is provided with a photodetector 101 which has light-receiving elements for receiving reflected light from a light spot, and outputs light currents according to the amounts of lights received by the respective light-receiving elements, first to fourth current-to-voltage converters 102a to 102d for converting the light current outputs from the photodetector 101 into voltage signals, first to fourth analog-to-digital converters (ADC) 104a to 104d for obtaining first to fourth digital signal sequences from the voltage signals obtained in the first to fourth current-to-voltage converters 102a to 102d, first to fourth interpolation filters 105a to 105d for subjecting the inputted digital signal sequences to interpolation, first to fourth zerocross point detection circuits 106a to 106d for detecting zerocross points of the first to fourth digital signal sequences that are interpolated by the first to fourth interpolation filters 105a to 105d, respectively, first and second phase difference detection circuits 107a and 107b for performing phase comparison using a distance between zerocross points of predetermined two sequences of digital signals among the four sequences of digital signals, and outputting phase comparison results PCR1 and PCR2 between the respective zerocross points and phase comparison completion signals PCC1 and PCC2, an adder 31 for adding a phase comparison result output signal PCR1 from the first phase difference detection circuit 107a and a phase comparison result output signal PCR2 from the second phase difference detection circuit 107b, a reference interval generation circuit 22 for outputting a signal for each predetermined interval, first and second effective phase difference detection circuits 23a and 23b for detecting the phase comparison completion signals PCC1 and PCC2 outputted from the first and second phase difference detection circuits 107a and 107b, and outputting the detection results as controls signals C1 and C2, respectively, an offset control circuit 32 for outputting an offset correction amount $\Delta\alpha$ according to the control signals C1 and C2 from the first and second effective phase difference detection circuits 23a and 23b, an adder 12 for adding the output PCR of the adder 31 and the output $\Delta\alpha$ of the offset control circuit 32, a low-pass filter (LPF) 108 for subjecting the output of the adder 12 to band limitation to obtain a tracking error signal TRE, and an offset correction circuit 13 for detecting an offset amount of the tracking signal from the output signal of the low-pass filter 108, and outputting an offset correction amount that is a correction value for the detected offset, to the offset control circuit 32.

In this third embodiment, the photodetector 101 has light-receiving elements 101a, 101b, 101c, and 101d which are separated along a tangent direction and a vertical direction of data tracks that are recorded as data pit lines on the recording medium.

The first phase difference detection circuit 107a detects a phase difference between the signal sequences outputted from the zerocross point detection circuits 106a and 106b among the zerocross points of the four sequences of digital signals, and it is composed of a phase difference calculation unit 111a, a pulse generation unit 112a, and a data switching unit 113a.

The second phase difference detection circuit 107b detects a phase difference between the signal sequences outputted from the zerocross point detection circuits 106c and 106d among the zerocross points of the four sequences of digital signals, and it is composed of a phase difference calculation unit 111b, a pulse generation unit 112b, and a data switching unit 113b.

The phase difference calculation units 111a and 111b, the pulse generation units 112a and 112b, the data switching units 113a and 113b, and the effective phase difference detection circuits 23a and 23b correspond to the phase difference calculation unit 111, the pulse generation unit 112, the data switching unit 113, and the effective phase difference detection circuit 23 which are described with reference to FIG. 3, and therefore, repeated description is not necessary.

It is assumed that the offset control circuit 32 receives the control signals from the effective phase difference detection circuits 23a and 23b, and outputs an offset correction amount $\Delta\alpha$ only when the control signals are both "H".

Figure 6:
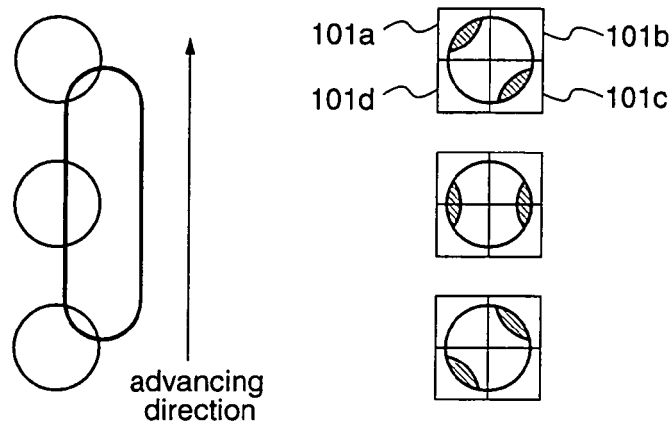
FIG. 6 is a diagram illustrating variation in an intensity distribution pattern of a reflected light amount when a light spot crosses over a pit.
Figure 7:
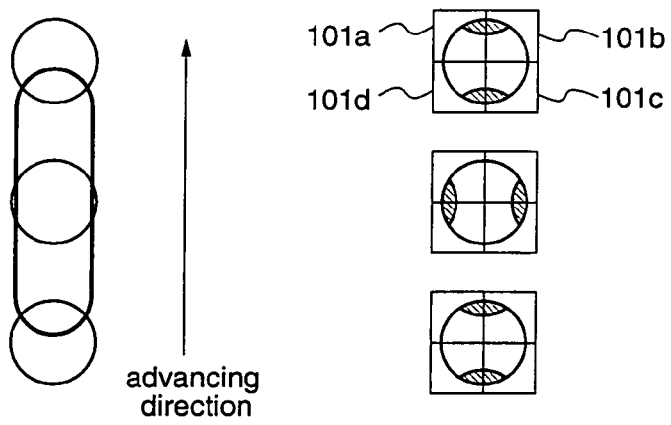
FIG. 7 is a diagram illustrating variation in an intensity distribution pattern of a reflected light amount when a light spot crosses over a pit.
Figure 8:
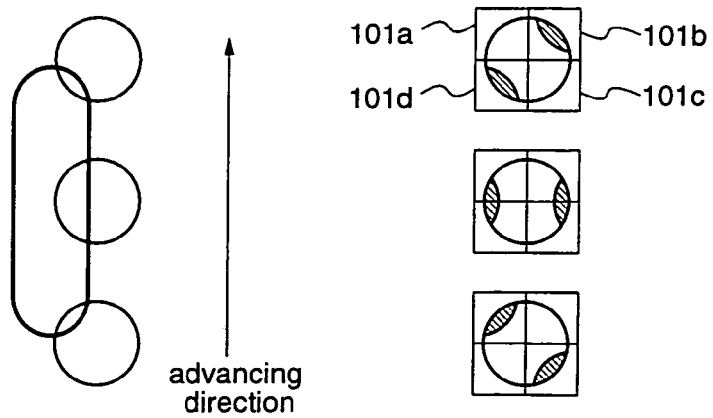
FIG. 8 is a diagram illustrating variation in an intensity distribution pattern of a reflected light amount when a light spot crosses over a pit.

FIGS. 6, 7, and 8 are diagrams illustrating variations in intensity distributions of reflected light amounts on the four-divided photodetectors 101a, 101b, 101c, and 101d when a light spot crosses over a pit. In each figure, (a) shows a positional relationship between the light spot and the data pit, wherein the light spot moves across the data pit in an arrow direction, while (b) shows an intensity distribution pattern of the reflected light amount on the photodetector 101.

As shown in FIGS. 6, 7, and 8, there is a correlation in the light intensity pattern of the reflected light amount that is obtained when the light spot passes across the data pit, between the photodetectors 101a and 101c, and the photodetectors 101b and 101d. Therefore, when phase difference detection is performed on a signal obtained from the data pit by one of the phase difference detection circuit 107a which detects a phase difference between the signal sequences obtained from the photodetectors 101a and 101b and the phase difference detection circuit 107b which detects a phase difference between the signal sequences obtained from the photodetectors 101c and 101d, phase difference detection is always performed by the other phase difference detection circuit. Therefore, when the respective effective phase difference detection circuits 23a and 23b detect the phase comparison completion signals PCC1 and PCC2, the control signals C1 and C2 become equal to each other. Conversely, when the control signals C1 and C2 from the two effective phase difference detection circuits 23a and 23b are not equal to each other, it is determined that the phase difference detection circuits 107a and 107b malfunction due to an adverse effect not from the data pit, such as noise.

As described above, the phase error detection apparatus 3000 according to the third embodiment is provided with the two types of phase difference detection circuits 107a and 107b which are correlated with each other and the two types of effective phase difference detection circuits 23a and 23b which are correlated with each other, and the offset control circuit 32 outputs an offset correction amount Δα only when the effective phase difference detection circuits 23a and 23b detect the phase comparison completion signals PCC1 and PCC2. Therefore, it is possible to reduce an output of the offset correction amount caused by malfunction in phase comparison by the phase comparator due to noise or the like, thereby providing a phase error detection apparatus which can obtain a stable tracking error signal TRE.

Embodiment 4

Hereinafter, a phase error detection apparatus according to a fourth embodiment of the present invention will be described.

Figure 9:
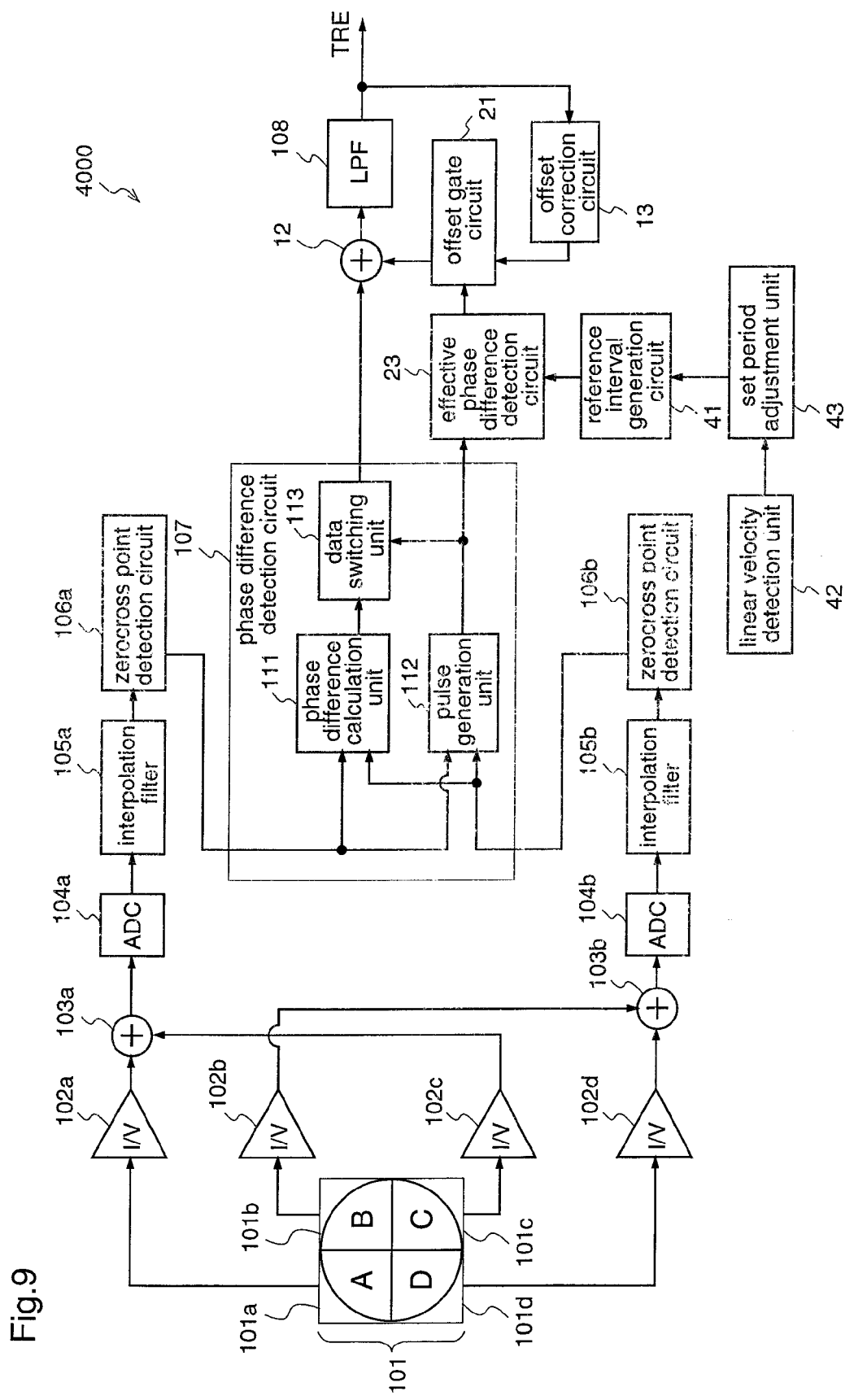
FIG. 9 is a block diagram illustrating the construction of a phase error detection apparatus 4000 according to a fourth embodiment of the present invention.

FIG. 9 is a block diagram illustrating the phase error detection apparatus 4000 according to the fourth embodiment.

In FIG. 9, the phase error detection apparatus 4000 according to the fourth embodiment is provided with a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, an offset control circuit 21, an effective phase difference detection circuit 23, a reference interval generation circuit 41, a linear velocity detection unit 42, and a set period adjustment unit 43.

The phase difference detection circuit 107 comprises a phase difference calculation unit 111, a pulse generation unit 112, and a data switching unit 113.

The constituents of the phase error detection apparatus 4000 other than the reference interval generation circuit 41, the linear velocity detection circuit 42, and the set period adjustment unit 43 are identical to those of the phase error detection apparatus 2000 of the second embodiment which has been explained with reference to FIG. 3.

The reference interval generation circuit 41 outputs a pulse signal for each period that is set by the set period adjustment unit 44, to the effective phase difference detection circuit 23.

The linear velocity detection unit 42 calculates a linear velocity from an rpm of an optical disc and a radial position, which is a general detection method, and informs the linear velocity to the set period adjustment unit 43.

The set period adjustment unit 43 adjusts the set value of the output signal interval of the reference interval generation circuit 41 according to the linear velocity detected by the linear velocity detection unit 42. This adjustment is performed as follows. Assuming that a linear velocity at a certain point is 1, when the linear velocity is varied in CAV playback or the like to be doubled, i.e., to become 2, the signal output interval generated by the reference interval generation circuit 41 when the linear velocity is 1 is adjusted to ½.

Next, the operations of the reference interval generation circuit 41, the linear velocity detection unit 42, and the set period adjustment unit 43 will be described.

Figure 10:
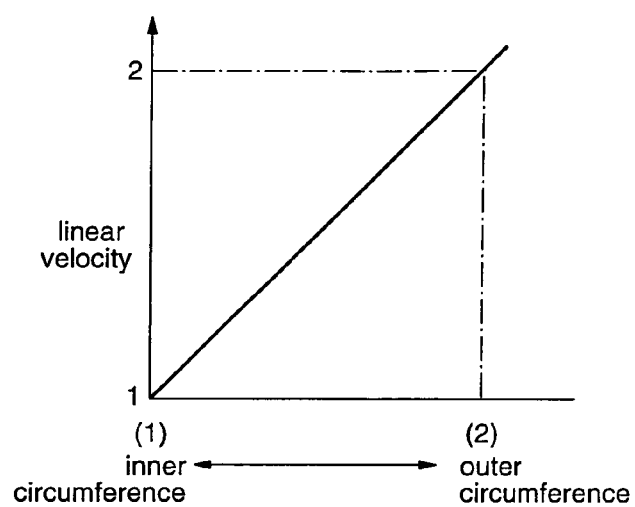
FIG. 10 is a diagram illustrating a change in a relative value of linear velocities at inner and outer circumferences of an optical disc when the disc is CAV played.
Figure 11:
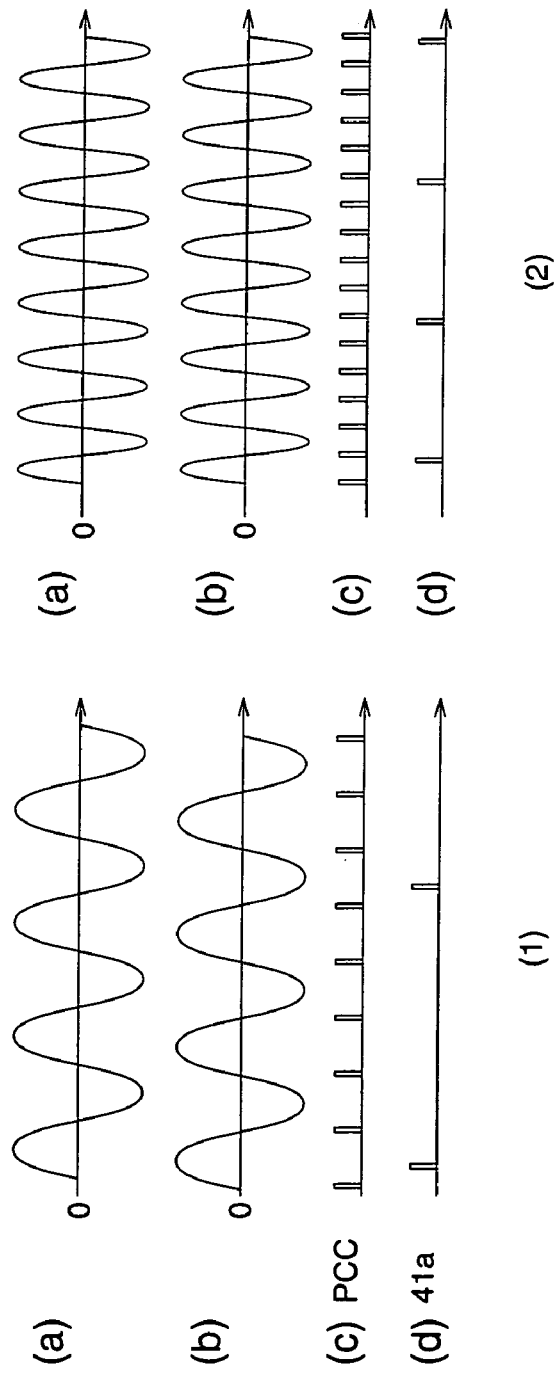
FIG. 11 is a diagram for explaining the operations of a reference interval generation circuit 41, a linear velocity detection unit 42, and a set period adjustment unit 43 according to the fourth embodiment.

FIGS. 10 and 11 are diagrams for explaining the operations of the reference interval generation circuit 41, the linear velocity detection unit 42, and the set period adjustment unit 43.

FIG. 10 shows relative values of linear velocities at the inner and outer circumferences of the disc (the linear velocity at the innermost circumference is 1). FIG. 11 shows (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, and (d) an output signal 41a from the reference interval generation circuit 41, in a position where the relative value of the linear velocity shown in FIG. 10 is 1 (1) and a position where the relative value of the linear velocity is 2 (2), respectively.

As shown in FIG. 11, when the linear velocity is doubled, the channel rate of the reproduced signal is also doubled, and thereby the number of the phase comparison completion signals PCC per unit time is also doubled. Therefore, when the interval of the output signal 41a of the reference interval generation circuit 41 is constant, the average number of phase comparisons within the interval of the output signal 41a of the reference interval generation circuit 41 varies, leading to a variation in the detection sensitivity of the effective phase difference detection circuit 23.

According to the fourth embodiment, however, since the interval of the output signal 41a of the reference interval generation circuit 41 is changed according to the linear velocity as shown in FIG. 11, the average number of phase comparisons within the interval of the output signal 41a of the reference interval generation circuit 41 never changes, whereby offset correction can be favorably carried out without changing detection sensitivity of the effective phase difference detection circuit 23.

The linear velocity detection unit 42 may be constituted by using a method of calculating a linear velocity by counting the number of output clocks from the PLL unit that are inputted within a predetermined period, on the basis of the proportional relationship between the linear velocity, and the frequency of the output clock from the PLL unit (not shown) that outputs a clock synchronized with the reproduction signal. Also in this case, the same effects as mentioned above can be achieved.

Embodiment 5

Hereinafter, a phase error detection apparatus according to a fifth embodiment of the present invention will be described.

Figure 12:
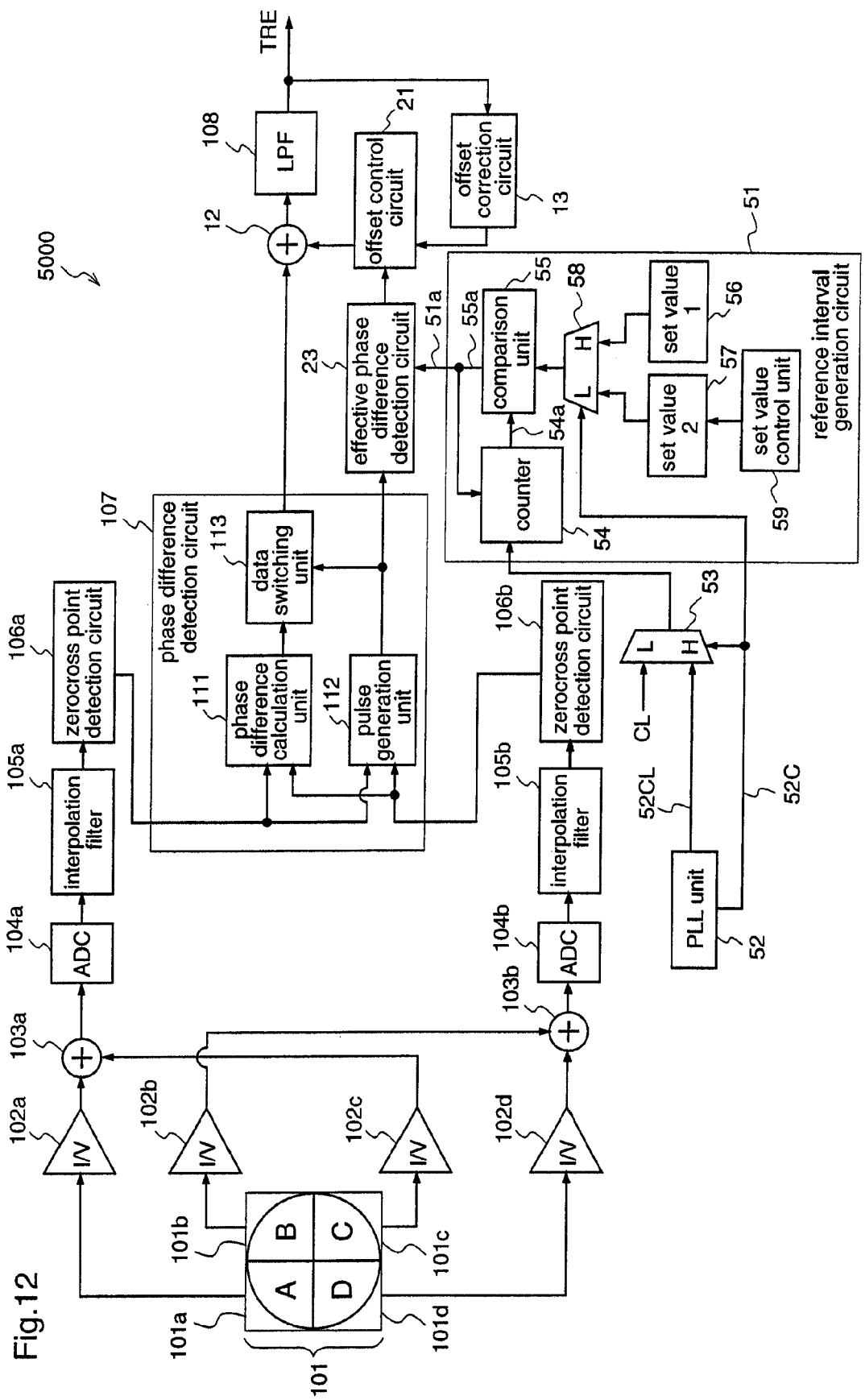
FIG. 12 is a block diagram illustrating the construction of a phase error detection apparatus 5000 according to a fifth embodiment of the present invention.

FIG. 12 is a block diagram illustrating the phase error detection apparatus 5000 according to the fifth embodiment.

In FIG. 12, the phase error detection apparatus 5000 according to the fifth embodiment is provided with a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, an offset control circuit 21, an effective phase difference detection circuit 23, a reference interval generation circuit 51, a PLL unit 52, and a selector 53.

The phase difference detection circuit 107 comprises a phase difference calculation unit 111, a pulse generation unit 112, and a data switching unit 113.

The reference interval generation circuit 51 comprises a counter 54, a comparator 55, a first set value 56, a second set value 57, a selector 58, and a set value control unit 59.

The constituents of the phase error detection apparatus 5000 other than the reference interval generation circuit 51, the PLL unit 52, and the selector 53 are identical to those of the phase error detection apparatus 2000 of the second embodiment shown in FIG. 3.

Hereinafter, the phase error detection apparatus 5000 according to the fifth embodiment will be described.

The PLL unit 52 is a PLL (Phase Locked Loop) circuit that outputs a clock (hereinafter referred to as a PLL clock) synchronized with a reproduction signal from an optical disc, and outputs the PLL clock to the selector 53. Further, the PLL unit 52 outputs a control signal 52C which indicates whether the PLL clock is synchronized with the reproduction signal or not. In this fifth embodiment, the PLL unit 52 outputs "H" when the PLL clock is in the synchronized state, and "L" when the PLL clock is not in the synchronized state, as a selection signal for the selectors 53 and 58.

The selector 53 selects either the PLL clock outputted from the PLL unit 52 or a fixed clock, according to the control signal 52C from the PLL unit 52, and outputs the PLL clock when the control signal is "H", while outputs the fixed clock when the control signal is "L", to the reference interval generation circuit 51.

In the reference interval generation circuit 51, the counter 54 is operated with the clock outputted from the selector 53. The selector 58 selects the first set value 56 when the control signal 52C from the PLL unit 52 is "H", and selects the second set value 57 when the control signal 52C is "L", and outputs the selected value to the comparator 55. The comparator 55 compares the output of the counter 54 with the output of the selector 58, and outputs a signal 55a when the output of the counter 54 is larger than the output of the selector 58, and this signal 55a is outputted as an output signal 51a from the reference interval generation circuit 51, and resets the counter 54.

The set value control unit 59 is operated when the control signal from the PLL unit 52 is "H", and adjusts the second set value 57 so that the interval of the output signal 51a from the reference interval generation circuit 51 when the counter 54 is operated with the PLL clock becomes equal to that when the counter 54 is operated with the fixed clock.

The operation of the reference interval generation circuit 51 according to the fifth embodiment will be described with reference to FIGS. 13 and 14.

Figure 13:
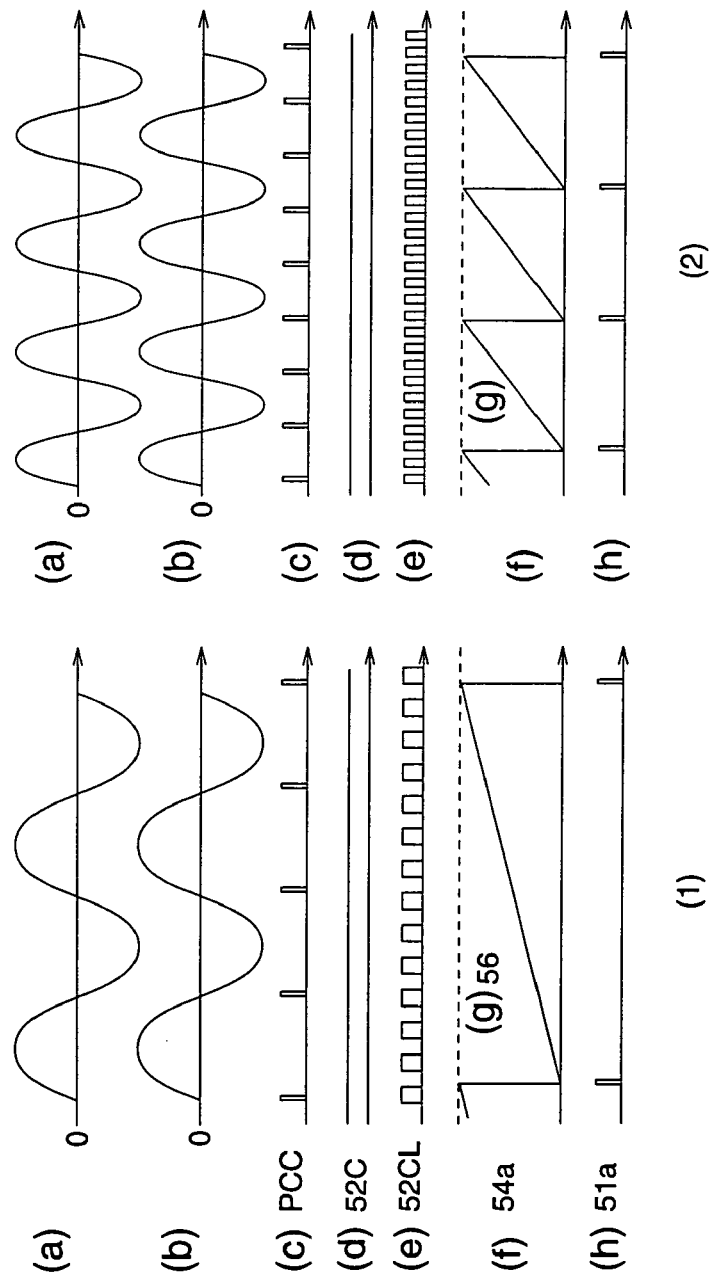
FIG. 13 is a diagram for explaining the operation of a reference interval generation circuit 51 according to the fifth embodiment.

FIG. 13 is a diagram for explaining the fundamental operation of the reference interval generation circuit 51 according to the fifth embodiment. FIG. 13 shows (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) a control signal 52C from the PLL unit 52, (e) a PLL clock 52CL, (f) a count value 54a of the counter 54, (g) a first reference value 56, and (h) an output signal 51a from the reference interval generation circuit 51, at the inner circumference of the disc (1) and at the outer circumference of the disc (2) when the optical disc is CAV played.

It is assumed that the linear velocity in the position at the outer circumference (2) is twice as high as that in the position at the inner circumference (1).

Comparing (1) and (2) in FIG. 13, when the linear velocity is doubled, the channel rate of the reproduction signal is also doubled, and therefore the frequency of the PLL clock 52CL (e) is also doubled. Thereby, the operation speed of the counter 58 is also doubled, and the time required until reaching the first reference value 56 (g) is reduced by half (½), and consequently, the interval of the output 51a from the reference interval generation circuit 51 shown in (2) becomes ½ of that shown in (1).

At this time, since the average frequency of the reproduction signal is also doubled, the average number of phase comparison completion signals PCC per unit time is also doubled. However, since the interval of the output signal 51a of the reference interval generation circuit 51 is reduced by half as described above, the average number of phase comparison completion signals PCC within the interval of the output signal 51a of the reference interval generation circuit 51 does not change.

Figure 14:
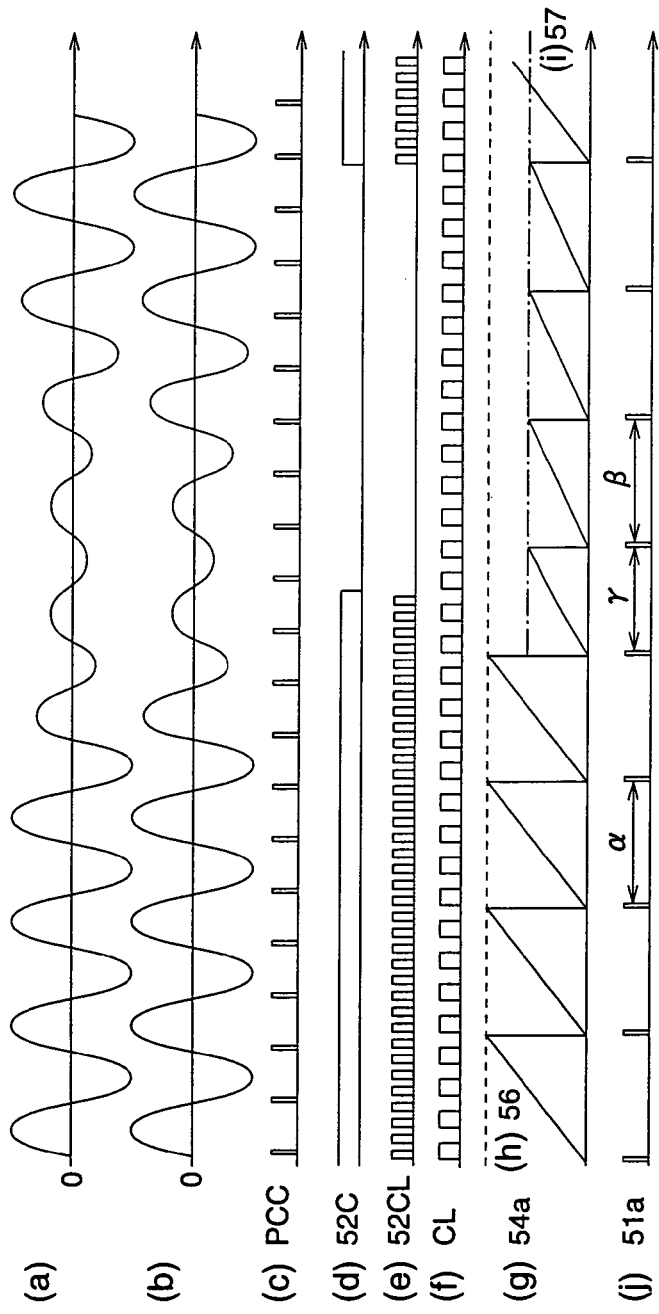
FIG. 14 is a diagram for explaining the operation of a reference interval generation circuit 51 according to the fifth embodiment, illustrating a state where a PLL unit 53 temporarily becomes out of synchronization with a reproduction signal due to an effect of disturbance during disc playback and thereby a control signal changes from "H" to "L".

FIG. 14 shows a case where the PLL unit 52 is temporarily out of synchronization with the reproduction signal due to disturbance during playback of the disc and thereby the control signal 52C changes from "H" to "L", and FIG. 14 illustrates (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) a control signal 52C from the PLL unit 52, (e) a PLL clock 52CL, (f) a fixed clock CL, (g) a count value 54a of the counter 54, (h) a first reference value 56, (i) a second reference value 57, and (j) an output signal 51a from the reference interval generation circuit 51.

When the control signal 52C (d) from the PLL unit 52 changes from "H" to "L", the operation clock of the counter 54 is changed from the PLL clock 52CL (e) to the fixed clock CL (f) by the selector 53. Further, the reference value is changed from the first reference value 56 (h) to the second reference value 57 (i) by the selector 58.

At this time, the interval of the first output 51a from the reference interval generation circuit 51 immediately after the change of the control signal 52C (d) varies in some measure depending on the timing of the change (γ period in FIG. 14). However, after the change of the control signal 52C (d), as for the interval of the second output from the reference interval generation circuit 51, the set value control unit 59 controls the second set value 58 so that the output signal interval of the reference interval generation circuit 51 becomes equal between when the counter 54 is operated with the PLL clock 52CL and when it is operated with the fixed clock CL, when the control signal 52C from the PLL unit 52 is "H", whereby the reference interval generation circuit 51 can output the signal 51a with the same output interval (β period in FIG. 14) as that obtained when the control signal 52C (i) is "H" (α period in FIG. 14).

As described above, according to the phase error detection apparatus 5000 of the fifth embodiment, when the PLL unit 52 generates a clock that is synchronized with the reproduction signal, the counter 54 of the reference interval generation circuit 51 is operated using this PLL clock. Therefore, even when the linear velocity changes during playback such as CAV playback, the average number of phase comparisons within the interval of the output signal of the reference interval generation circuit 51 does not change, and detection sensitivity of the effective phase difference detection circuit 23 does not vary, resulting in a phase error detection apparatus which can perform offset correction favorably.

Further, even when the PLL unit 52 temporarily becomes incapable to generate a clock synchronized with the reproduction signal due to a factor such as disturbance, the set value adjustment circuit 59 adjusts the second set value 57 so that the interval of the output signal from the reference interval generation circuit 51 becomes equal between when the counter 54 is operated with the PLL clock and when it is operated with the fixed clock, while the PLL unit 52 can generate a synchronized clock, whereby detection sensitivity of the effective phase difference detection circuit 23 does not vary, resulting in a phase error detection apparatus that can perform offset correction with stability.

Embodiment 6

Hereinafter, a phase error detection apparatus according to a sixth embodiment of the present invention will be described.

Figure 15:
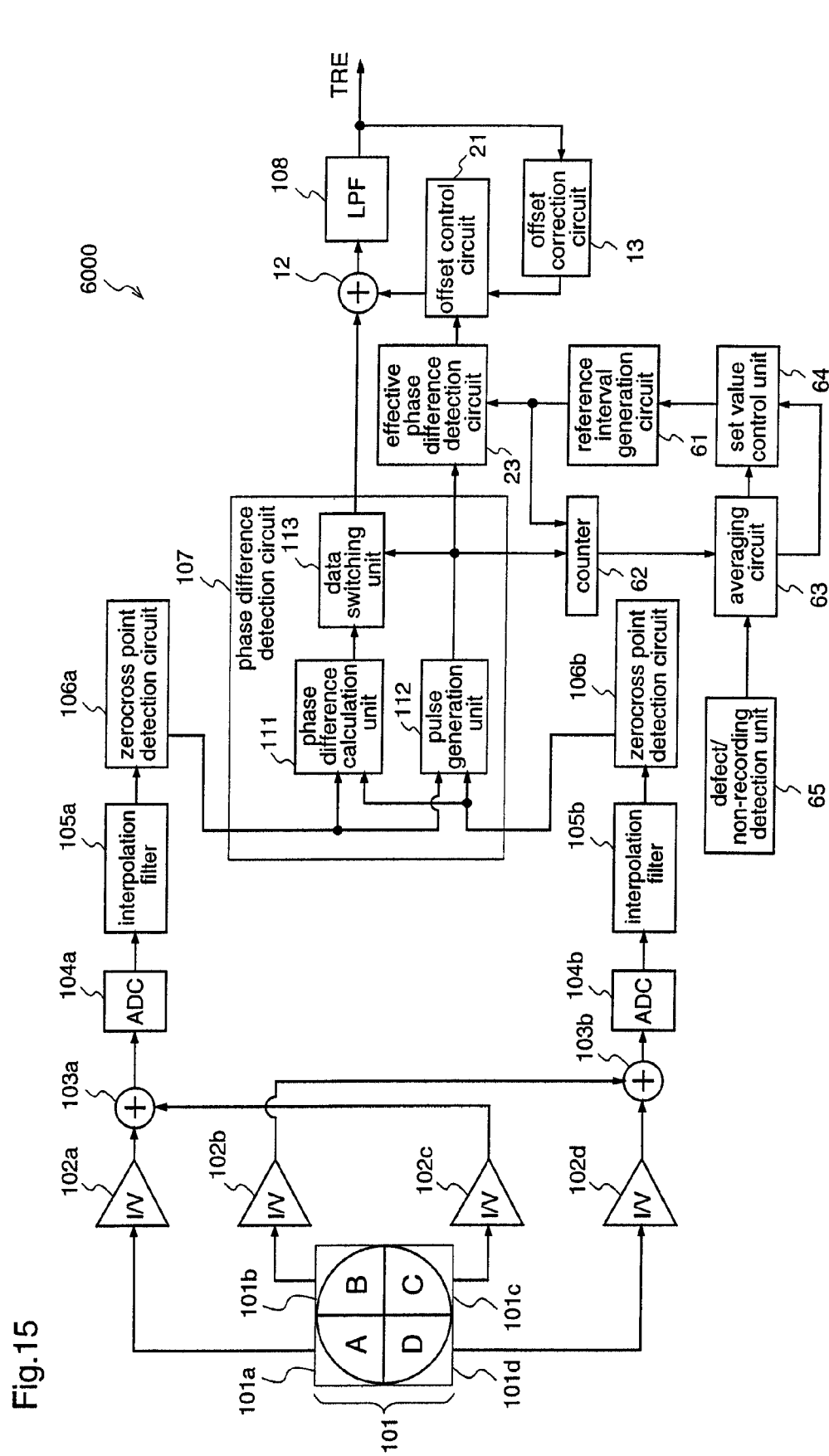
FIG. 15 is a block diagram illustrating the construction of a phase error detection apparatus 6000 according to a sixth embodiment of the present invention.

FIG. 15 is a block diagram illustrating the phase error detection apparatus 6000 according to the sixth embodiment.

In FIG. 15, the phase error detection apparatus 6000 according to the sixth embodiment is provided with a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, an offset control circuit 21, an effective phase difference detection circuit 23, a reference interval generation circuit 61, a counter 62, an averaging circuit 63, a set value control unit 64, and a defect/non-recording detection unit 65.

The phase difference detection circuit 107 comprises a phase difference calculation unit 111, a pulse generation unit 112, and a data switching unit 113.

The constituents of the phase error detection apparatus 6000 other than the reference interval generation circuit 61, the counter 62, the averaging circuit 63, the set value control unit 64, and the defect/non-recording detection unit 65 are identical to those of the phase error detection apparatus 2000 of the second embodiment shown in FIG. 3.

The counter 62 counts the number of phase comparison completion signals PCC outputted from the phase difference detection circuit 107 within the pulse output interval of the reference interval generation circuit 61, and outputs the count value 62a to the averaging circuit 63.

The averaging circuit 63 outputs a value obtained by averaging the output values 62a from the counter 62, to the set value control unit 64.

However, when a control signal from the defect/non-recording detection unit 65 is "H", the averaging circuit 63 stops averaging and holds the output value.

The set value control unit 64 adjusts the output pulse interval of the reference interval generation circuit 61 so as to narrow the same when the output value of the averaging circuit 63 is larger than a predetermined value, and conversely, it broadens the output pulse interval of the reference interval generation circuit 61 when the output value is smaller than the predetermined value.

The defect/non-recording detection unit 65 outputs, to the averaging circuit 63, a control signal of "H" during a period when it detects a defect such as scratch or stain on the optical disc or a non-recorded portion from such as the amplitude of the reproduction signal, and otherwise, outputs a control signal of "L".

The reference interval generation circuit 61 outputs a pulse for each interval that is set by the setting value control unit 64.

The phase error detection apparatus 6000 according to the sixth embodiment operates and functions as follows.

As already described for the fourth embodiment, when the linear velocity is doubled by such as CAV playback of the optical disc, the channel rate of the reproduction signal is also doubled, and thereby the number of phase comparison completion signals per unit time is also doubled. Therefore, when the output pulse interval of the reference interval generation circuit is made constant, the average number of phase comparisons within the output pulse interval of the reference interval generation circuit varies, and thereby detection sensitivity of the effective phase difference detection circuit varies.

In this case, the linear velocity is detected, and the output pulse interval of the reference interval generation circuit is adjusted according to the linear velocity in the fourth embodiment.

In contrast to the fourth embodiment, in the phase error detection apparatus 6000 of the sixth embodiment, the number of the phase comparison completion signals PCC outputted from the phase difference detection circuit 107 within the output pulse interval of the reference interval generation circuit 61 is counted and averaged by the averaging circuit 63, and then the pulse output interval of the reference interval generation circuit 61 is adjusted by the set value control unit 64 so that the output of the averaging circuit 63 becomes a predetermined number of times, whereby the average number of phase comparisons within the pulse output interval of the reference interval generation circuit 61 can be controlled to be a predetermined constant value, resulting in a phase error detection apparatus which can perform offset correction without changing detection sensitivity of the effective phase difference detection circuit 23.

Further, since the input/output signal of the averaging circuit 63 is held at a defect or non-recorded position by the defect/non-recording detection unit 65, it is possible to prevent that the output of the averaging circuit 63 is reduced at the defect or non-recorded position where no phase comparison is performed and thereby undesired broadening of the output signal interval of the reference interval generation circuit 61 occurs.

The averaging circuit 63 may be a low-pass filter that performs band limitation to the variation in the count value, with the same effects as mentioned above.

Embodiment 7

Hereinafter, a phase error detection apparatus according to a seventh embodiment of the present invention will be described.

Figure 16:
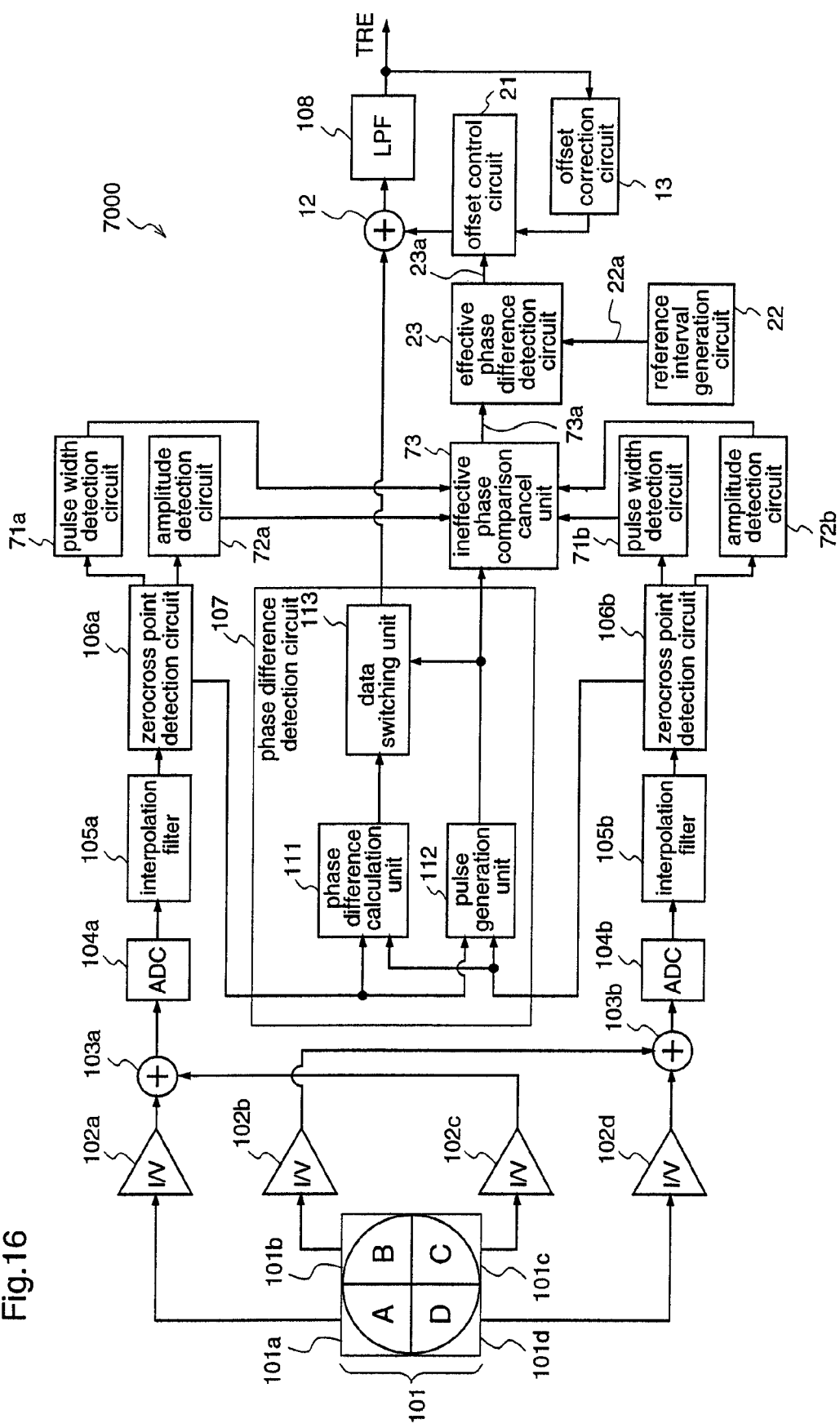
FIG. 16 is a block diagram illustrating the construction of a phase error detection apparatus 7000 according to a seventh embodiment of the present invention.

FIG. 16 is a block diagram illustrating the construction of the phase error detection apparatus 7000 according to the seventh embodiment.

In FIG. 16, the phase error detection apparatus 7000 of the seventh embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, first and second pulse width detection circuits 71a and 71b, first and second amplitude detection circuits 72a and 72b, an ineffective phase comparison cancel unit 73, a phase difference detection circuit 107, a low-pass filter (LPF) 108, a third adder 12, an offset correction circuit 13, an offset control circuit 21, a reference interval generation circuit 22, and an effective phase difference detection circuit 23.

The phase difference detection circuit 107 comprises a phase difference calculation unit 111, a pulse generation unit 112, and a data switching unit 113.

The constituents of the phase error detection apparatus 7000 other than the first and second pulse width detection circuits 71a and 71b, the first and second amplitude detection circuits 72a and 72b, and the ineffective phase comparison cancel unit 73 are identical to those of the phase error detection apparatus 2000 of the second embodiment shown in FIG. 3.

Each of the first and second pulse width detection circuits 71 and 71b detects, as a pulse width, the number of data within an interval of zerocross points detected by each of the first and second zerocross point detection circuits 106a and 106b, respectively.

Further, each of the first and second amplitude detection circuits 72a and 72b detects, as an amplitude value, a maximum value of an absolute value of data within an interval of zerocross points that is detected by each of the first and second zerocross point detection circuits 106a and 106b, respectively.

When the pulse widths and the amplitude values which are respectively detected by the first and second pulse width detection circuits 71a and 71b and the first and second amplitude detection circuits 72a and 72b are smaller than the respective predetermined values, the ineffective phase comparison cancel unit 73 nullifies the phase comparison completion signal PCC that is detected at the corresponding zerocross point and outputted from the pulse generation unit 112 so as not to output this signal PCC to the effective phase difference detection circuit 23.

Next, the operations of the first and second pulse width detection circuits 71a and 71b, the first and second amplitude detection circuits 72a and 72b, and the ineffective phase difference cancel unit 73 will be described.

Figure 17:
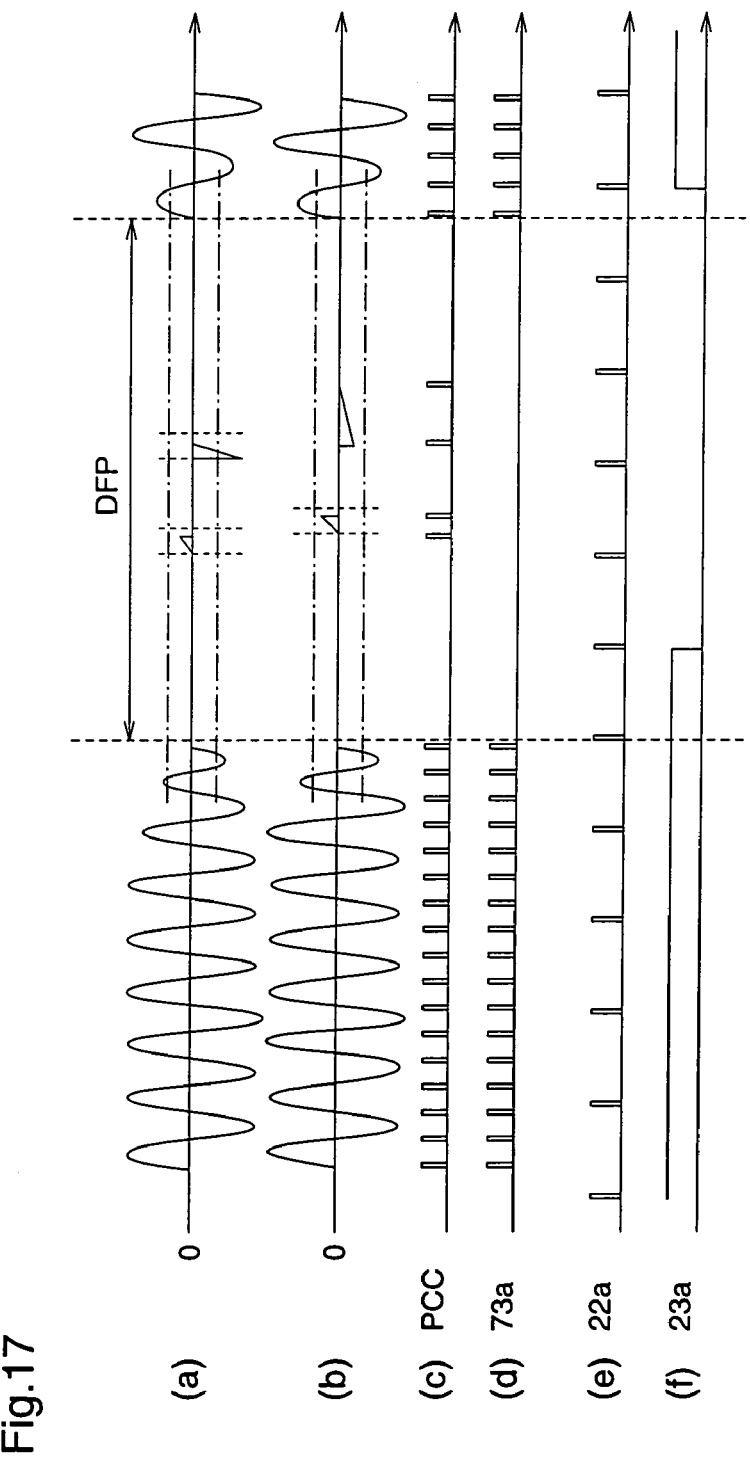
FIG. 17 is a diagram for explaining the operation of an ineffective phase comparison cancel unit 73 according to the seventh embodiment.

FIG. 17 is a diagram for explaining the operation of the ineffective phase comparison cancel unit 73 in the phase error difference detection apparatus 7000 of the seventh embodiment, and illustrates, (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) an output signal 73a of the ineffective phase difference cancel unit 73, (e) an output signal 22a of the reference interval generation circuit 22, and (f) an output signal 23a of the effective phase difference detection circuit 23.

Although it is supposed that no reproduction signal is inputted at a defect position or a non-recorded position and therefore no signal should not be inputted to the first and second ADCs 104a and 104b, there is a case where an uncorrelated signal of a low amplitude and a short pulse, such as noise, might be input (refer to a defect position DFP in FIG. 17). At this time, since the input signal such as noise is an uncorrelated signal, the effect of the phase comparison result detected by this uncorrelated signal can be reduced by passing it through an LPF. However, even when phase comparison is performed by noise or the like, if the phase comparison completion signal PCC is detected by the effective phase difference detection circuit 23, an unnecessary offset correction amount is outputted.

So, in the phase error detection apparatus 7000 of the seventh embodiment, as shown in FIG. 17, even when there is an input signal due to noise at a defect position or a non-recorded position, the pulse width and the amplitude value of the input signal is detected by the pulse width detection circuit 71a or 71b and the amplitude detection circuit 72a or 72b, and the signal is regarded as noise by the ineffective phase comparison cancel unit 73 when either the pulse width or the amplitude is smaller than the predetermined value, thereby restricting the phase comparison completion signal PCC to be input to the effective phase difference detection circuit 23. Therefore, it is possible to reduce unnecessary output of the offset correction amount OFC caused by malfunction of the phase difference detection circuit 23 due to noise or the like, thereby obtaining a stable tracking error detection signal TRE.

While in the second to seventh embodiments the adder 13 adds the offset correction amount to the phase comparison result outputted from the phase difference detection circuit 107 and the resultant is passed through the LPF 108 to obtain a tracking error detection signal, a tracking error detection signal may be obtained by passing the phase comparison result from the phase difference detection circuit 107 through the LPF 108, and thereafter, adding the offset correction amount to the phase comparison result PCR, with the same effects as described for the second to seventh embodiments.

Embodiment 8

Hereinafter, a phase error detection apparatus according to an eighth embodiment of the present invention will be described.

Figure 18:
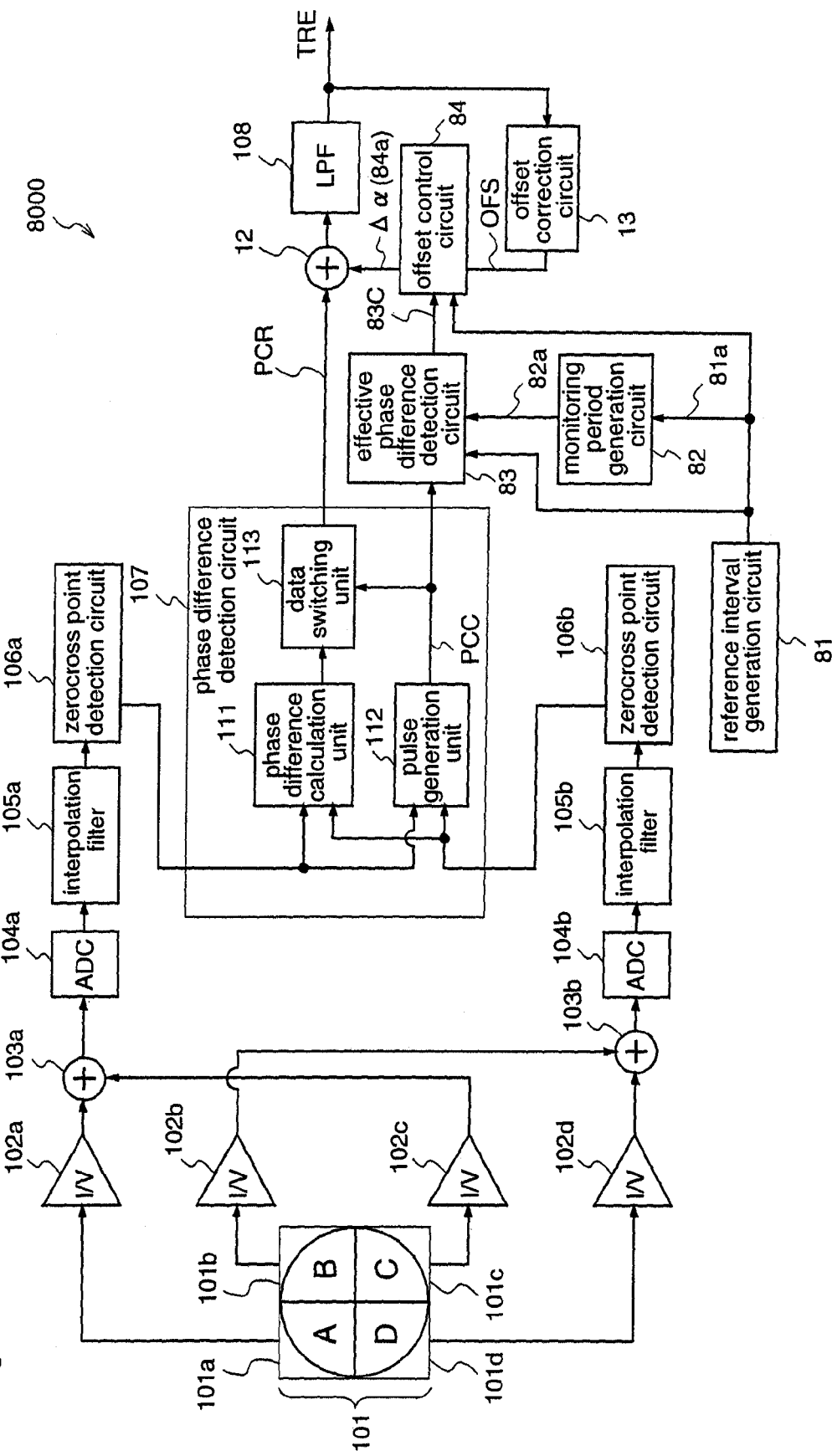
FIG. 18 is a block diagram illustrating the construction of a phase error detection apparatus 8000 according to an eighth embodiment of the present invention.

FIG. 18 is a block diagram illustrating the construction of the phase error detection apparatus 8000 according to the eighth embodiment.

In FIG. 18, the phase error detection apparatus 8000 of the eighth embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, a reference interval generation circuit 81, a monitoring period generation circuit 82, an effective phase difference detection circuit 83, and an offset control circuit 84.

The phase difference detection circuit 107 comprises a phase difference calculation unit 111, a pulse generation unit 112, and a data switching unit 113.

The constituents of the phase error detection apparatus 8000 other than the reference interval generation circuit 81, the monitoring period generation circuit 82, the effective phase difference detection circuit 83, and the offset control circuit 84 are identical to those of the phase error detection apparatus 1000 of the first embodiment shown in FIG. 1.

The reference interval generation circuit 81 outputs a pulse signal 81a for each predetermined interval to the monitoring period generation circuit 82, the effective phase difference detection circuit 83, and the offset control circuit 84. It is assumed that the pulse interval of the output signal 81a from the reference interval generation circuit 81 is sufficiently short relative to band limitation by the LPF 108.

The monitoring period generation circuit 82 outputs a "H" signal 82a during a predetermined period of time for each output signal 81a from the reference interval generation circuit 81 to the effective phase difference detection circuit 83.

The effective phase difference detection circuit 83 monitors the phase comparison completion signal PCC from the phase difference detection circuit 107 during the period when the output signal 82a from the monitoring period generation circuit 82 is "H". When the effective phase difference detection circuit 83 detects the phase comparison completion signal PCC, it outputs a control signal 83C which becomes "H" at detection of the signal PCC and is reset to "L" by the output signal 81a from the reference interval generation circuit 81, to the offset control circuit 84.

The offset control circuit 84 outputs an offset correction amount Δα (84a) from the offset correction circuit 13, as a pulse corresponding to one clock, only when the control signal 83C from the effective phase difference detection circuit 83 is "H" when it receives the output signal 81a from the reference interval generation circuit 81.

Next, the operations of the reference interval generation circuit 81, the monitoring period generation circuit 82, the effective phase difference detection circuit 83, and the offset control circuit 84 will be described.

Figure 19:
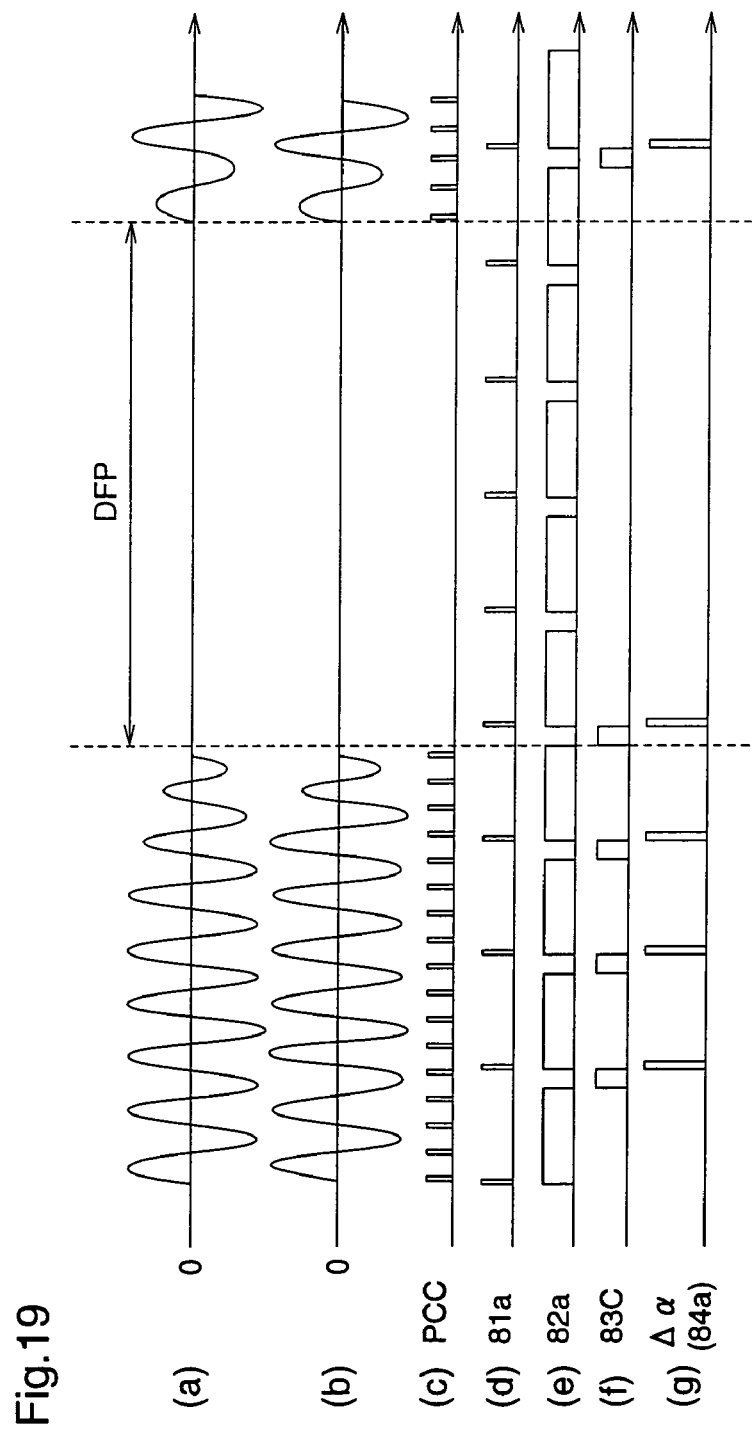
FIG. 19 is a diagram for explaining the operations of a reference interval generation circuit 81, a monitoring period generation circuit 82, an effective phase difference detection circuit 83, and an offset control circuit 84 according to the fifth embodiment.

FIG. 19 is are diagrams for explaining the operations of the reference interval generation circuit 81, the monitoring period generation circuit 82, the effective phase difference detection circuit 83, and the offset control circuit 84, and illustrates, from above, (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) an output signal 81a from the reference interval generation circuit 81, (e) an output signal 82a from the monitoring period generation circuit 82, (f) a control signal 83C from the effective phase difference detection circuit 83, and (g) an output signal Δα (84a) from the offset control circuit 84.

Next, the operation of the phase error detection apparatus 8000 of the eighth embodiment will be described.

The reference interval generation circuit 81 outputs a pulse 81a for each predetermined interval (d).

The monitoring period generation circuit 82 outputs a "H" signal during a predetermined period of time, for each output pulse 81a from the reference interval generation circuit 81 (e).

The effective phase difference detection circuit 83 outputs a control signal 83C which is "H" when the phase comparison completion signal PCC is outputted from the pulse generation unit 112 during a period when the output signal 82a from the monitor period generation circuit 82 is "H", and "L" when the signal PCC is not outputted.

The offset control circuit 84 outputs an offset correction value Δα (84a) that is outputted from the offset correction circuit 13 to the adder 12, for each output signal 81a of the reference interval generation circuit 81, only when the control signal 83C from the effective phase difference detection circuit 83 is "H" (g).

Then, the output PCR of the data switching unit 113 and the output Δα of the offset control circuit 84 are added by the adder 12, and finally, the resultant is subjected to band limitation by the LPF 108, thereby generating a tracking error signal TRE of a band required for tracking servo control. At this time, since the interval of the output signal 81a from the reference interval generation circuit 81 is sufficiently shorter than the band limitation by the LPF 108, the offset correction amount that is outputted from the offset control circuit 84 for each output signal 81a of the reference interval generation circuit 81 can be treated as a constant value after it passes through the LPF 108.

As described above, according to the phase error detection apparatus 8000 of the eighth embodiment, the phase comparison completion signal PCC within a predetermined period is monitored, and offset correction is carried out only when phase comparison is performed. Therefore, it is possible to obtain a phase error detection circuit that does not perform offset adjustment in a position where no input signal exists and no phase comparison is performed, such as a defect position and a non-recorded position, but performs offset adjustment of the tracking error signal TRE only when phase comparison is performed.

Further, in the phase error detection apparatus 8000 according to the eighth embodiment, the interval of the signal 81a outputted from the reference interval generation circuit 81 is constant during playback, and the offset correction amount that is outputted from the offset control circuit 84 for each output signal 81a from the reference interval generation circuit 81 can be treated as a constant value after it has passed through the LPF 108. Therefore, even when performing CAV playback having different linear velocities at the inner and outer circumferences of the disc, the offset adjustment amount after passing through the LPF does not vary between the inner and outer circumferences, thereby enabling offset correction of the tracking error signal.

The offset control circuit 84 outputs the offset correction amount from the offset correction circuit 13, as a pulse corresponding to one clock, for each output signal 81a from the reference interval generation circuit 81, only when the control signal 83C of the effective phase difference detection circuit 83 is "H". However, the signal to be outputted from the offset control circuit 84 is not necessarily a pulse output corresponding to one clock, it may be a pulse signal corresponding to two or more clocks so long as it is synchronized with the output signal 81a from the reference interval generation circuit 81, with the same effects as mentioned above.

Embodiment 9

Hereinafter, a phase error correction apparatus according to a ninth embodiment of the present invention will be described.

Figure 20:
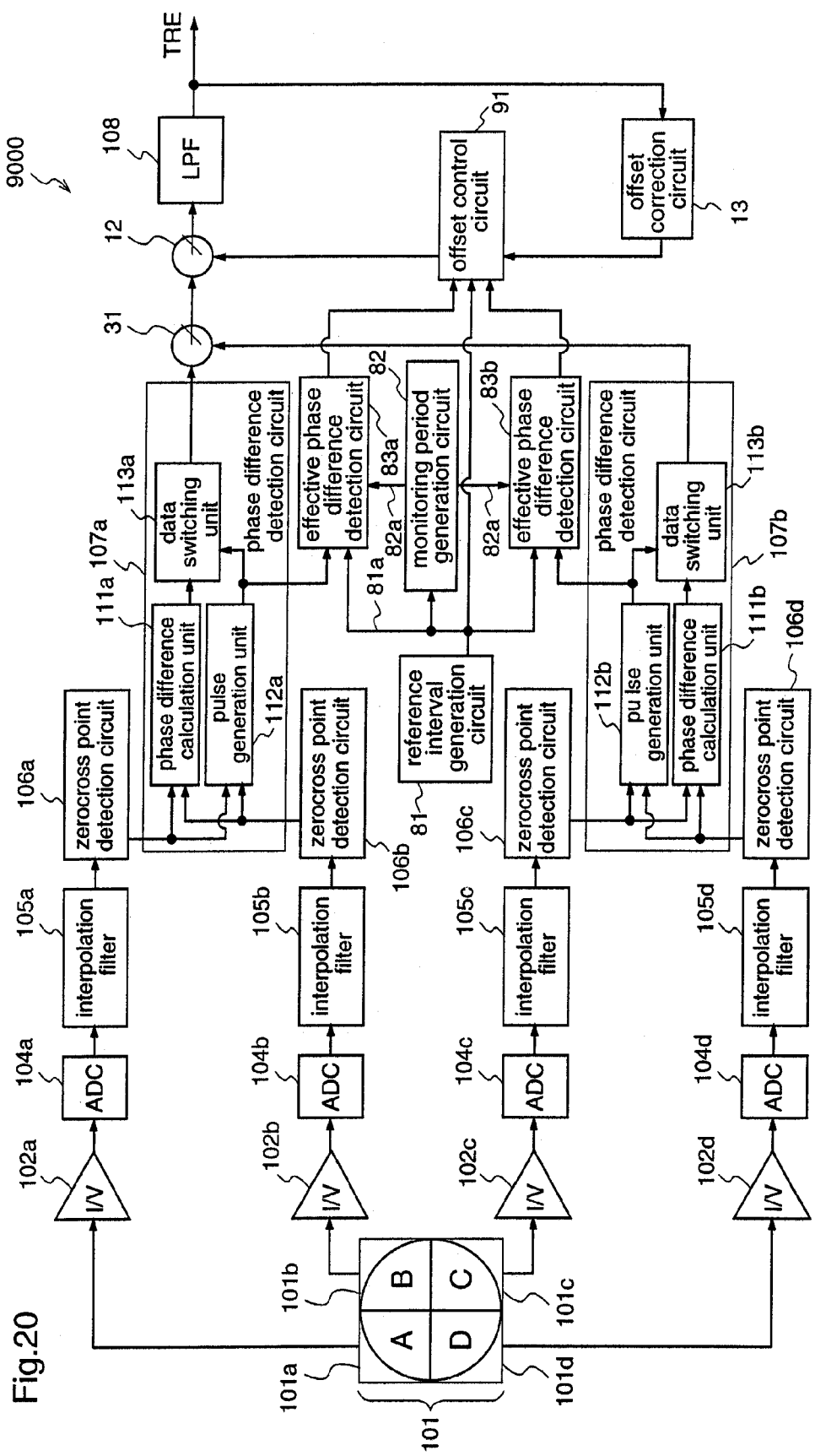
FIG. 20 is a block diagram illustrating the construction of a phase error detection apparatus 9000 according to a ninth embodiment of the present invention.

FIG. 20 is a block diagram illustrating the construction of the phase error detection apparatus 9000 according to the ninth embodiment.

In the phase error detection apparatus 9000 according to the ninth embodiment, the effective phase difference detection circuit 83 of the phase error detection apparatus 8000 of the eighth embodiment shown in FIG. 18 is replaced with two effective phase difference detection circuits 83a and 83b corresponding to two series of digital signal sequences obtained from the light-receiving elements 101a and 101b positioned forward in the signal direction of the information track of the photodetector, and two sequences of digital signal sequences obtained from the light-receiving elements 101c and 101d positioned backward in the information track signal direction, respectively, and the offset control circuit 91 outputs an offset correction amount only when control signals from the separately provided two effective phase difference detection circuits 83a and 83b are both "H".

As already described for the third embodiment, there is a correlation in an intensity distribution pattern of a reflected light amount that is obtained when light passes across a data pit, between the photodetectors 101a and 101c and the photodetectors 101b and 101d. Therefore, when a signal is normally read from the data pit, the control signals C1 and C2 outputted from the two effective phase difference detection circuits 83a and 83b are equal to each other. Conversely, when the control signals C1 and C2 from the two effective phase difference detection circuits 83a and 83b are not equal to each other, it is considered that the phase difference detection circuits 107a and 107b malfunction due to an adverse effect such as noise which is not from the data pit.

As described above, according to the phase error detection apparatus 9000 of the ninth embodiment, the two types of phase difference detection circuits 107a and 107b which are correlated with each other are respectively provided with the effective phase difference detection circuits 83a and 83b, and the offset control circuit 91 outputs an offset correction amount only when both of the effective phase difference detection circuits 83a and 83b detect phase comparison completion signals PCC, while the offset control circuit 91 does not output an offset correction amount when either or both of the effective phase difference detection circuits 83a and 83b do not detect phase comparison completion signals PCC. Therefore, it is possible to provide a phase error detection apparatus which reduces faulty output of an offset correction amount which is caused by malfunction in phase comparison by the phase comparator due to noise or the like, thereby to obtain a stable tracking error signal.

Embodiment 10

Hereinafter, a phase error detection apparatus according to a tenth embodiment of the present invention will be described.

Figure 21:
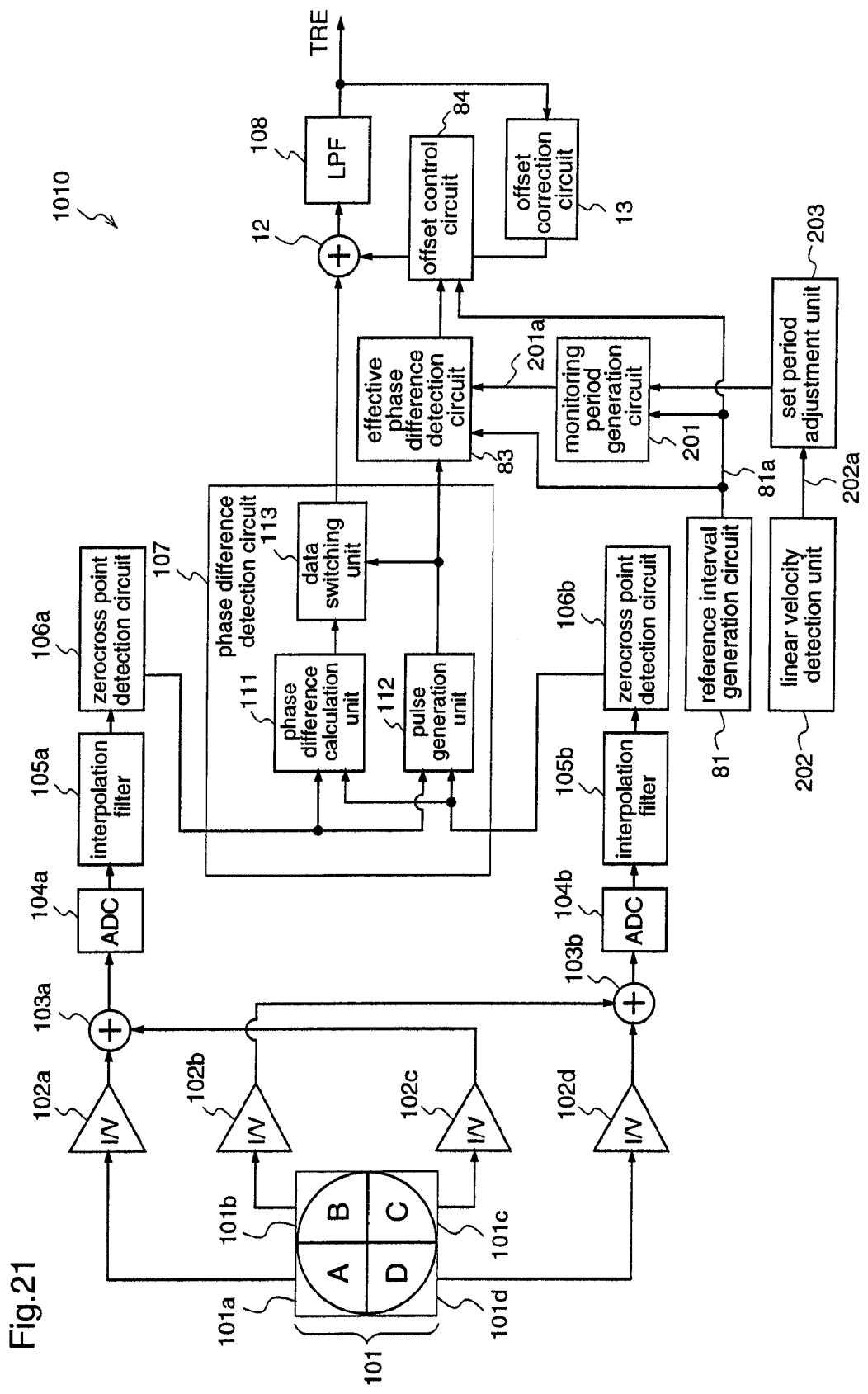
FIG. 21 is a block diagram illustrating the construction of a phase error detection apparatus 1010 according to a tenth embodiment of the present invention.

FIG. 21 is a block diagram illustrating the construction of the phase error detection apparatus 1010 according to the tenth embodiment.

In FIG. 21, the phase error detection apparatus 1010 of the tenth embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, a reference interval generation circuit 81, an effective phase difference detection circuit 83, an offset control circuit 84, a monitoring period generation circuit 201, a linear velocity detection unit 202, and a set period adjustment unit 203.

The phase difference detection circuit 107 comprises a phase difference calculation unit 111, a pulse generation unit 112, and a data switching unit 113.

The constituents of the phase error detection apparatus 1010 other than the monitoring period generation circuit 201, the linear velocity detection unit 202, and the set period adjustment unit 203 are identical to those of the phase error detection apparatus 8000 of the eighth embodiment shown in FIG. 18.

The monitoring period generation circuit 201 outputs an "H" signal 201a during a period that is set by the set period adjustment unit 203 for each output signal 81a from the reference interval generation circuit 81, to the effective phase difference detection circuit 83.

The linear velocity detection unit 202 calculates a linear velocity from a rpm of an optical disc and a radial position, which is a general detection method, and outputs a signal 202a indicating the linear velocity to the set period adjustment unit 203.

The set period adjustment unit 203 adjusts the period of the output signal 201a from the monitoring period generation circuit 201 according to the linear velocity detected by the linear velocity detection unit 202. The adjustment of the set value by the set period adjustment unit 203 is performed as follows. Assuming that a relative value of a linear velocity at a certain point is 1, when the linear velocity changes due to such as CAV playback and becomes 2, the period during which the monitoring period generation circuit 201 output "H" when the linear velocity is 1 is adjusted so that the period becomes ½.

Next, the operations of the monitoring period generation circuit 201, the linear velocity detection unit 202, and the set period adjustment unit 203 will be described.

Figure 22:
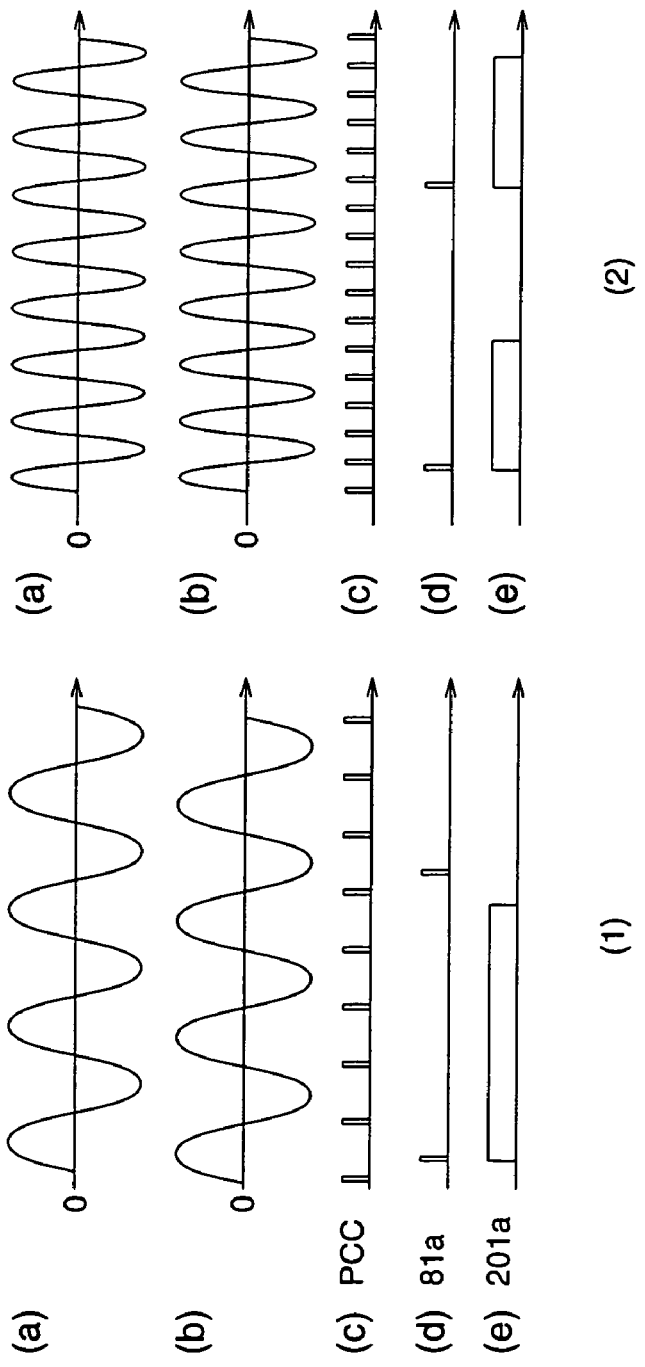
FIG. 22 is a diagram for explaining the operation of a monitoring period generation circuit 201 according to the tenth embodiment.

FIG. 22 is a diagram for explaining the operations of the monitoring period generation circuit 201, the linear velocity detection unit 202, and the set period adjustment unit 203, and illustrates, from above, (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) an output signal 81a from the reference interval generation circuit 81, and (e) an output signal 201a from the monitoring period generation circuit 201, in positions at the inner circumference of the disc (1) and at the outer circumference of the disc (2) when the optical disc is CAV played. It is assumed that the linear velocity in the position at the outer circumference (2) is twice as high as that in the position at the inner circumference (1).

When the linear velocity detected by the linear velocity detection unit 202 is doubled due to CAV playback or the like, the channel rate of the reproduction signal is also doubled, whereby the number of the phase comparison completion signals PCC per unit time is also doubled. Therefore, if the output signal interval of the monitoring period generation circuit 201 is set constant, the average number of phase comparisons during the output signal period of the monitoring period generation circuit 201 varies, leading to variation in the detection sensitivity of the effective phase difference detection circuit 83.

In this tenth embodiment, however, as shown in (1) and (2) in FIG. 22, since the output signal interval of the monitoring period generation circuit 201 is varied according to the linear velocity, the average number of phase comparisons during the output signal interval of the monitoring period generation circuit 201 does not vary, and accordingly, detection sensitivity of the effective phase difference detection circuit 83 does not vary.

The linear velocity detection unit 202 is able to calculate a linear velocity by counting the number of output clocks from the PLL unit which are inputted during a predetermined period of time, on the basis of a proportional relationship between an output clock frequency from a PLL unit (not shown) that outputs a clock synchronized with the reproduction signal, and the liner velocity.

As described above, the phase error detection apparatus 1010 according to the tenth embodiment is provided with the monitoring period generation circuit 201, the linear velocity detection unit 202, and the set period adjustment unit 203. The monitoring period generation circuit 201 outputs a signal of period "H" that is set by the set period adjustment unit 203 for each output signal from the reference interval generation circuit 81 to the effective phase difference detection circuit 83. The linear velocity detection unit 202 calculates a linear velocity from a rpm of the optical disc and a radial position by a general linear velocity detection method, and informs this linear velocity to the set period adjustment unit 203. The set period adjustment unit 203 adjusts the output signal period of the monitoring period generation circuit 201 according to the linear velocity detected by the linear velocity detection unit 202, and changes the output signal period of the monitoring period generation circuit 201 according to the linear velocity.

Therefore, it is possible to obtain a phase error detection apparatus in which the average number of phase comparisons during the output signal period of the monitoring period generation circuit 201 does not change even when the linear velocity changes, and detection sensitivity of the effective phase difference detection circuit 83 does not change.

Embodiment 11

Hereinafter, a phase error detection apparatus according to an eleventh embodiment of the present invention will be described.

Figure 23:
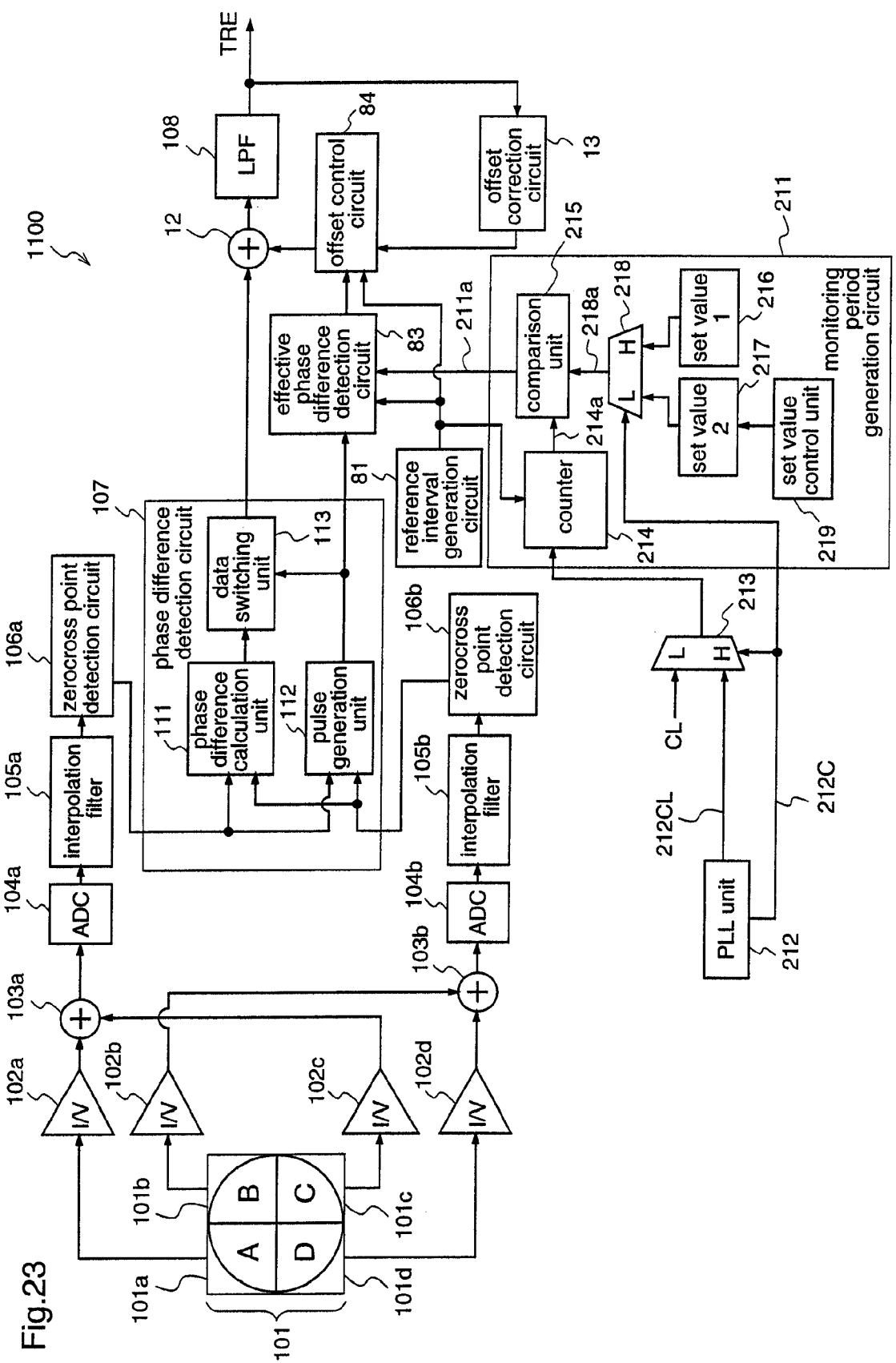
FIG. 23 is a block diagram illustrating the construction of a phase error detection apparatus 1100 according to an eleventh embodiment of the present invention.

FIG. 23 is a block diagram illustrating the construction of the phase error detection apparatus 1100 according to the eleventh embodiment.

In FIG. 23, the phase error detection apparatus 1100 of the eleventh embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, a reference interval generation circuit 81, an effective phase difference detection circuit 83, an offset control circuit 84, a monitoring period generation circuit 211, a PLL unit 212, and a selector 213.

The phase difference detection circuit 107 comprises a phase difference calculation unit 111, a pulse generation unit 112, and a data switching unit 113.

The monitoring period generation circuit 211 comprises a counter 214, a comparator 215, a first set value 216, a second set value 217, a selector 218, and a set value control unit 219.

The constituents of the phase error detection apparatus 1100 other than the monitoring period generation circuit 211, the PLL unit 212, and the selector 213 are identical to those of the phase error detection apparatus 8000 of the eighth embodiment shown in FIG. 18.

The PLL unit 212 is a PLL (Phase Locked Loop) circuit for outputting a clock (hereinafter referred to as a PLL clock) that is synchronized with a data reproduction signal from an optical disc, and outputs the PLL clock 212CL to the selector 213. The PLL unit 212 outputs a control signal 212C indicating whether the PLL clock 212CL is synchronized with the data reproduction signal or not. For example, the PLL unit 212 outputs "H" when the PLL clock 212CL is synchronized with the reproduction signal, and "L" when it is not synchronized with the reproduction signal, as a selection signal for the selectors 213 and 218.

The selector 213 selects either the PLL clock 212CL outputted from the PLL unit 212 or a fixed clock CL according to the control signal 212C from the PLL unit 212, and outputs the PLL clock 212CL when the control signal 212C is "H", while outputs the fixed clock CL when the control signal 212C is "L", to the monitoring period generation circuit 211.

In the monitoring period generation circuit 211, the counter 214 is operated with the clock outputted from the selector 213, and it is reset by an output signal 81a from the reference interval generation circuit 81. Further, the selector 218 selects a first set value 216 when the control signal 212C from the PLL unit 212 is "H" while selects a second set value 217 when the control signal 212C is "L", and outputs the selected value to the comparison unit 215.

The comparison unit 215 compares an output 214a of the counter 214 with an output 218a of the selector 218, and outputs a "H" signal when the output 214a of the counter 214 is lower than the output 218a of the selector 218, and this signal is outputted as an output signal 211a of the monitoring period generation circuit 211.

The set value control unit 219 operates only when the control signal 212C from the PLL unit 212 is "H", and adjusts the second set value 217 so that the period during which "H" is outputted as the output signal 211a from the monitoring period generation circuit 211 becomes equal between when the counter 214 is operated with the PLL clock 212CL and when it is operated with the fixed clock CL.

Hereinafter, the operation of the monitoring period generation circuit 211 according to the eleventh embodiment will be described with reference to FIGS. 24 and 25.

Figure 24:
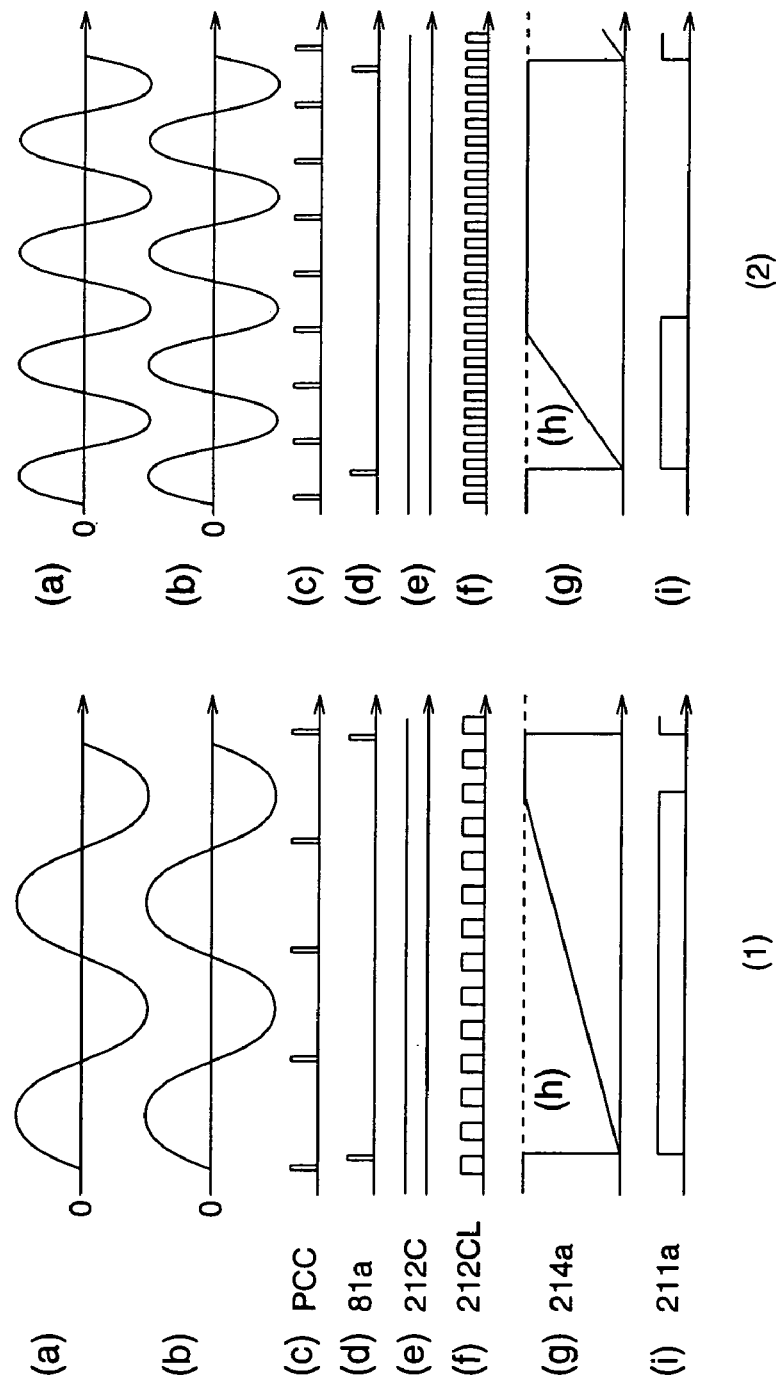
FIG. 24 is a diagram for explaining the normal operation of a monitoring period generation circuit 211 according to the eleventh embodiment.

FIG. 24 is a diagram for explaining the fundamental operation of the monitoring period generation circuit 211 according to the eleventh embodiment.

FIG. 24 illustrates (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) an output signal 81a of the reference interval generation circuit 81, (e) a control signal 212C from the PLL unit 212, (f) a PLL clock 212CL, (g) a count value 214a of the counter 214, (h) a first reference value 216, and (i) an output signal 211a from the reference interval generation circuit 211, at the inner circumference of the disc (1) and at the outer circumference of the disc (2) when the optical disc is CAV played.

It is assumed that the linear velocity in the position at the outer circumference (2) is twice as high as that in the position at the inner circumference (1).

During the normal operation of this eleventh embodiment, when (1) and (2) in FIG. 24 are compared, if the linear velocity is doubled, the channel rate of the reproduction signal is also doubled, and thereby the frequency of the PLL clock (e) is also doubled. Thereby, the operation clock of the counter 214 is doubled, the time required until reaching the first reference value 216 (h) becomes ½, and consequently, the period during which "H" is outputted as the output signal 211a from the monitoring period generation circuit 211 also becomes ½ in (2).

At this time, since the average frequency of the reproduction signal is also doubled, the number of the phase comparison completion signals PCC per unit time is also doubled. However, as described above, since the period during which "H" is outputted as the output signal 211a from the monitoring period generation circuit 211 becomes ½, the average number of the phase comparison completion signals PCC during the period when "H" is outputted as the output signal 211a from the monitoring period generation circuit 211 does not vary.

Figure 25:
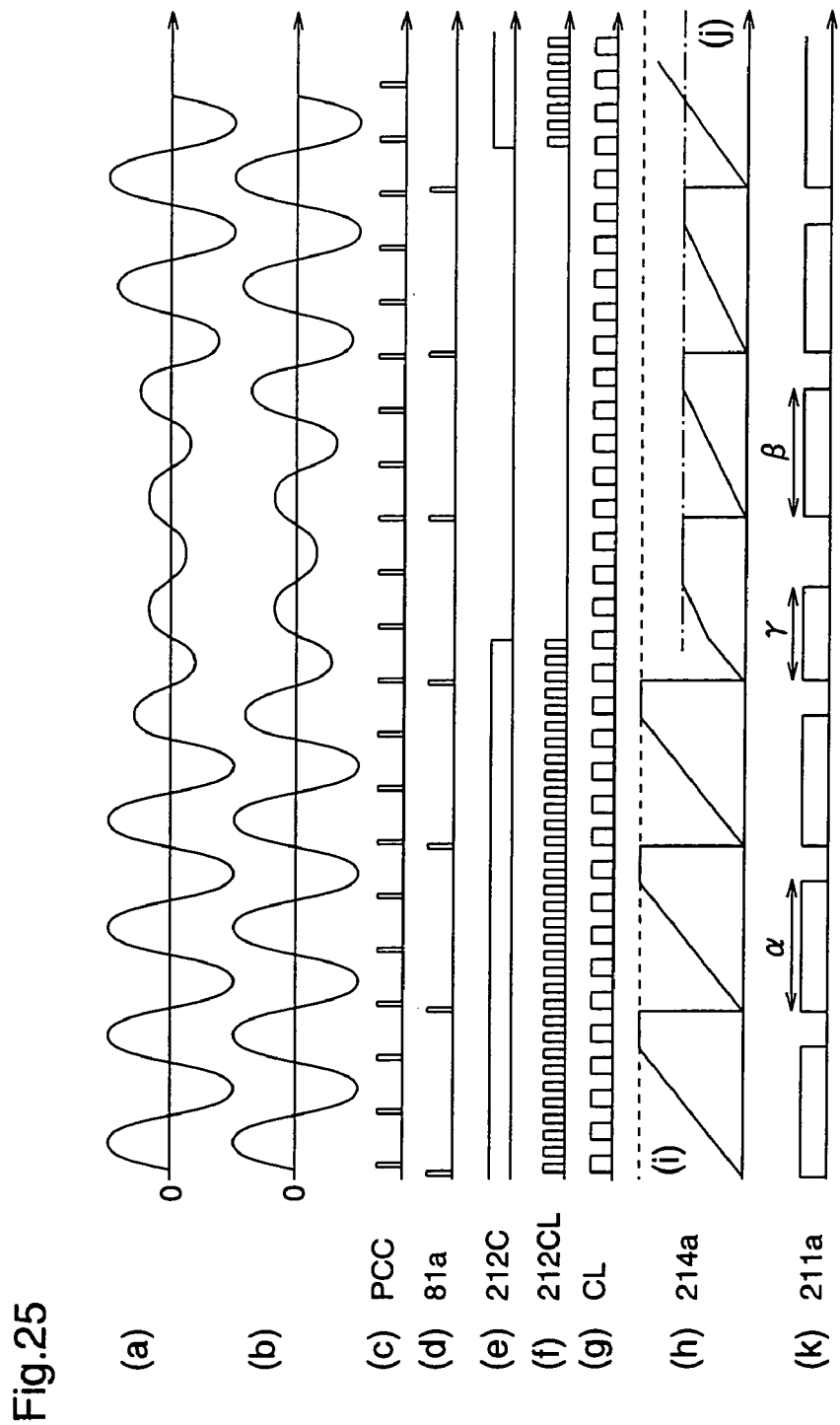
FIG. 25 is a diagram for explaining the operation of the monitoring period generation circuit 211 according to the eleventh embodiment, illustrating a state where a PLL unit 212 temporarily becomes out of synchronization with a reproduction signal due to an effect of disturbance during disc playback and thereby a control signal changes from "H" to "L".

FIG. 25 shows the operation of the monitoring period generation circuit 211 when the PLL unit 212 is temporarily out of synchronization with the reproduction signal due to disturbances during disc playback and thereby the control signal 212C from the PLL unit 212 changes from "H" to "L". FIG. 25 illustrates (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) an output signal 81a from the reference interval generation circuit 81, (e) a control signal 212C of the PLL unit 212, (f) a PLL clock 212CL, (g) a fixed clock CL, (h) a count value 214a of the counter 214, (i) a first reference value 216, (j) a second reference value 217, and (k) an output signal 211a of the monitoring period generation circuit 211.

When the control signal 212C (e) from the PLL unit 212 changes from "H" to "L", the operation clock of the counter 214 is changed from the PLL clock 212CL (f) to the fixed clock CL (g) by the selector 213. Further, the reference value is changed from the first reference value 216 (i) to the second reference value 217 (j) by the selector 218.

At this time, the output interval of the first "H" signal that is outputted from the monitoring period generation circuit 211 immediately after the change of the control signal 212C (e) slightly varies according to the timing of the change (γ period in FIG. 25). However, as for the output interval of the second "H" signal from the monitoring period generation circuit 211, since the set value control unit 219 controls the second set value so that the output interval of the "H" signal from the monitoring period generation circuit 211 becomes equal between when the counter 214 is operated with the PLL clock 212CL and when it is operated with the fixed clock CL when the control signal 214 from the PLL unit 214 is "H", whereby the monitoring period generation circuit 211 can output the "H" signal 211a with the same output interval (β period in FIG. 25) as the time when the control signal 212C (e) is "H" (α period in FIG. 25).

In this way, according to the phase error detection apparatus 1100 of the eleventh embodiment, when the PLL unit 212 outputs a clock synchronized with the reproduction signal, the counter 214 of the monitoring period generation circuit 211 is operated using this PLL clock, whereby the average number of phase comparisons during the output interval of the "H" signal from the monitoring period generation circuit 211 does not vary even when the linear velocity varies during playback such as CAV playback, and therefore, detection sensitivity of the effective phase difference detection circuit 83 does not vary, resulting in a phase error detection apparatus that can perform offset correction preferably.

Further, even when the PLL unit 212 temporarily becomes incapable of generating a clock synchronized with the reproduction signal, since the set value adjustment circuit 219 adjusts the second reference value 217 while the PLL unit 212 can generate a synchronized clock so that the period during which the "H" signal is outputted from the monitoring period generation circuit 211 becomes equal between when the counter 214 is operated with the PLL clock and when it is operated with the fixed clock, detection sensitivity of the effective phase difference detection circuit 83 does not vary, resulting in a phase error detection apparatus that can perform stable offset correction.

Embodiment 12

Hereinafter, a phase error detection apparatus according to a twelfth embodiment of the present invention will be described.

Figure 26:
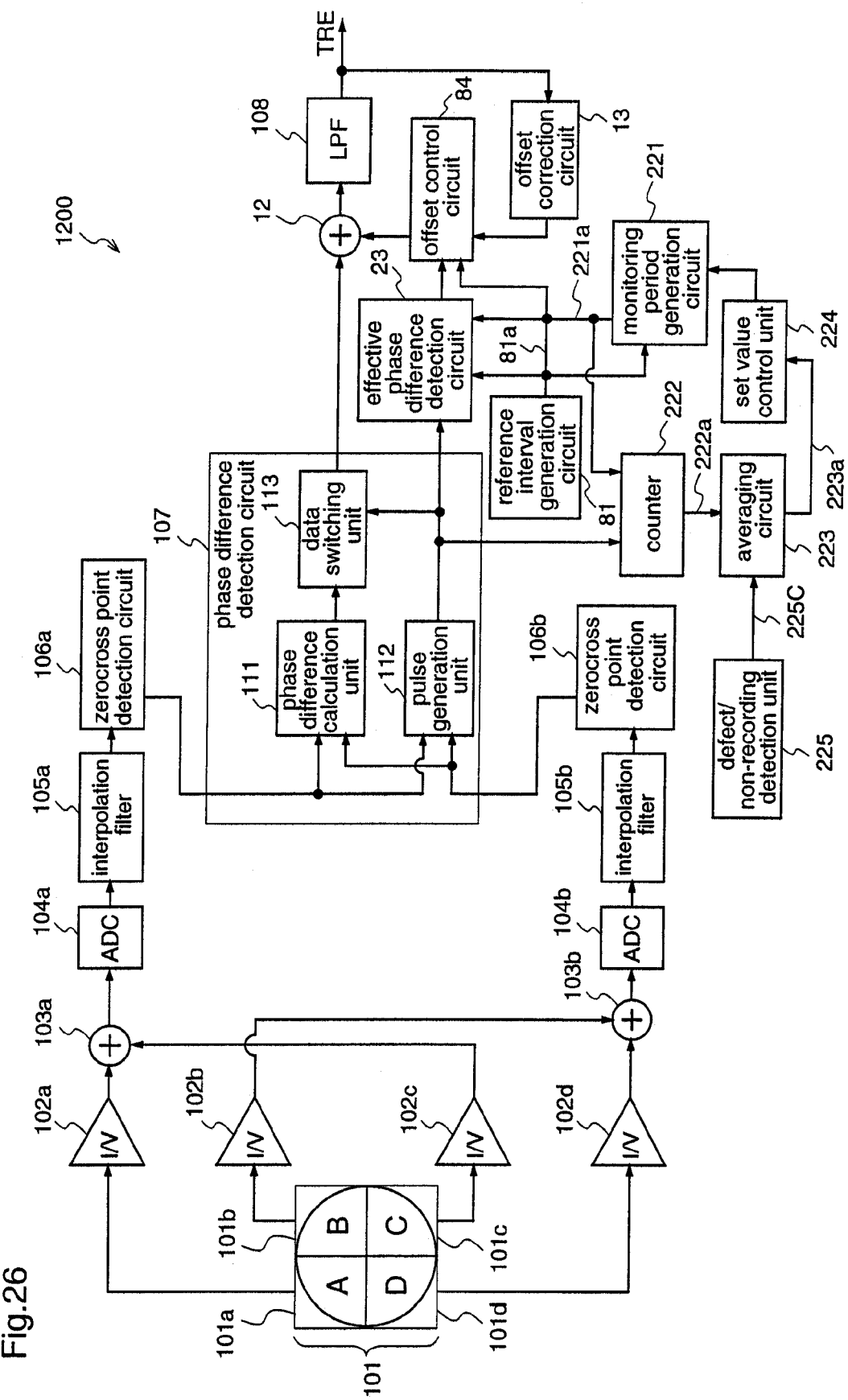
FIG. 26 is a block diagram illustrating the construction of a phase error detection apparatus 1200 according to a twelfth embodiment of the present invention.

FIG. 26 is a block diagram illustrating the construction of the phase error detection apparatus 1200 according to the twelfth embodiment.

In FIG. 26, the phase error detection apparatus 1200 of the twelfth embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, a reference interval generation circuit 81, an effective phase difference detection circuit 83, an offset control circuit 84, a monitoring period generation circuit 221, a counter 222, an averaging circuit 223, a set value control unit 224, and a defect/non-recording detection unit 225.

The phase difference detection circuit 107 comprises a phase difference calculation unit 111, a pulse generation unit 112, and a data switching unit 113.

The constituents of the phase error detection apparatus 1200 other than the monitoring period generation circuit 221, the counter 222, the averaging circuit 223, the set value control unit 224, and the defect/non-recording detection unit 225 are identical to those of the phase error detection apparatus 8000 of the eighth embodiment shown in FIG. 18.

The counter 222 counts the number of phase comparison completion signals PCC that are outputted from the phase difference detection circuit 107 during a period when the monitoring period generation circuit 221 outputs "H" as an output signal 221a, and outputs a count value 222a to the averaging circuit 223.

The averaging circuit 223 outputs a value 223a that is obtained by averaging the output values 222a from the counter 222 to the set value control unit 224. However, when a control signal 225C from the defect/non-recording detection unit 225 is "H", the above-mentioned averaging is stopped, and the former output values are held.

The set value control unit 224 performs control so as to shorten the period during which the monitoring period generation circuit 221 outputs "H", when the output value 223a of the averaging circuit 223 is larger than a predetermined value, and conversely, it performs control so as to lengthen the period during which the monitoring period generation circuit 221 outputs "H", when the output value 223a is smaller than the predetermined value, thereby performing control so as to make the output value 223a of the averaging circuit 223 equal to a predetermined value.

The defect/non-recording detection unit 225 outputs a control signal 225C of "H" while it detects a defect such as scratch or stain on the optical disc or a non-recorded portion, from the amplitude of the reproduction signal or the like, and otherwise, it outputs a control signal 225C of "L", to the averaging circuit 223.

The monitoring period generation circuit 221 outputs a signal 221a which is "H" during a period that is set by the set value control unit 224, for each output 81a of the reference interval generation circuit 81, to the effective phase difference detection unit 83.

Hereinafter, the operation and function of the phase error detection apparatus 1200 according to the eleventh embodiment will be described.

As already described for the tenth embodiment, when the linear velocity is doubled by such as CAV playback of the optical disc, the channel rate of the reproduction signal is also doubled, and thereby the number of phase comparison completion signals per unit time is also doubled. Therefore, if the period during which the monitoring period generation circuit 221 outputs "H" is made constant regardless of the linear velocity, the average number of phase comparisons within the output pulse interval of the reference interval generation circuit 81 is varied, leading to variation in detection sensitivity of the effective phase difference detection circuit 83.

In order to solve this problem, in the tenth embodiment, the linear velocity is detected, and the period during which the monitoring period generation circuit 221 outputs "H" is adjusted according to the linear velocity.

In the phase error detection apparatus 1200 of the twelfth embodiment, the counter 222 counts the number of phase comparison completion signals PCC outputted from the phase difference detection circuit 107 within the period during which the monitoring period generation circuit 221 outputs the signal 221a of "H", and the averaging circuit 223 averages the count values 222a, and then the set value control unit 224 adjusts the period during which the monitoring period generation circuit 221 outputs the signal 221a of "H" so that the output 223a of the averaging circuit 223 becomes equal to a predetermined value. Therefore, the average number of phase comparisons during the period when the monitoring period generation circuit 221 outputs "H" is made constant, whereby detection sensitivity of the effective phase difference detection circuit 83 does not vary, resulting in a phase error detection apparatus that can preferably perform offset correction for the tracking error signal.

Further, since the defect/non-recording detection unit 225 detects a defect/non-recorded position on the optical disc, and holds the output of the averaging circuit 223 at the defect/non-recorded position. Therefore, it is also possible to avoid that the output period of the unnecessary "H" signal from the monitoring period generation circuit 221 increases at the defect/non-recorded position with a reduction in the output of the averaging circuit 223 at the defect/non-recorded position where no phase comparison is performed.

The averaging circuit 63 may be a low-pass filter that performs band limitation on the change in the count value. In this case, the output of the low-pass filter may be held while the defect/non-recording detection unit 225 outputs "H", with the same effects as mentioned above.

Embodiment 13

Hereinafter, a phase error detection apparatus according to a thirteenth embodiment of the present invention will be described.

Figure 27:
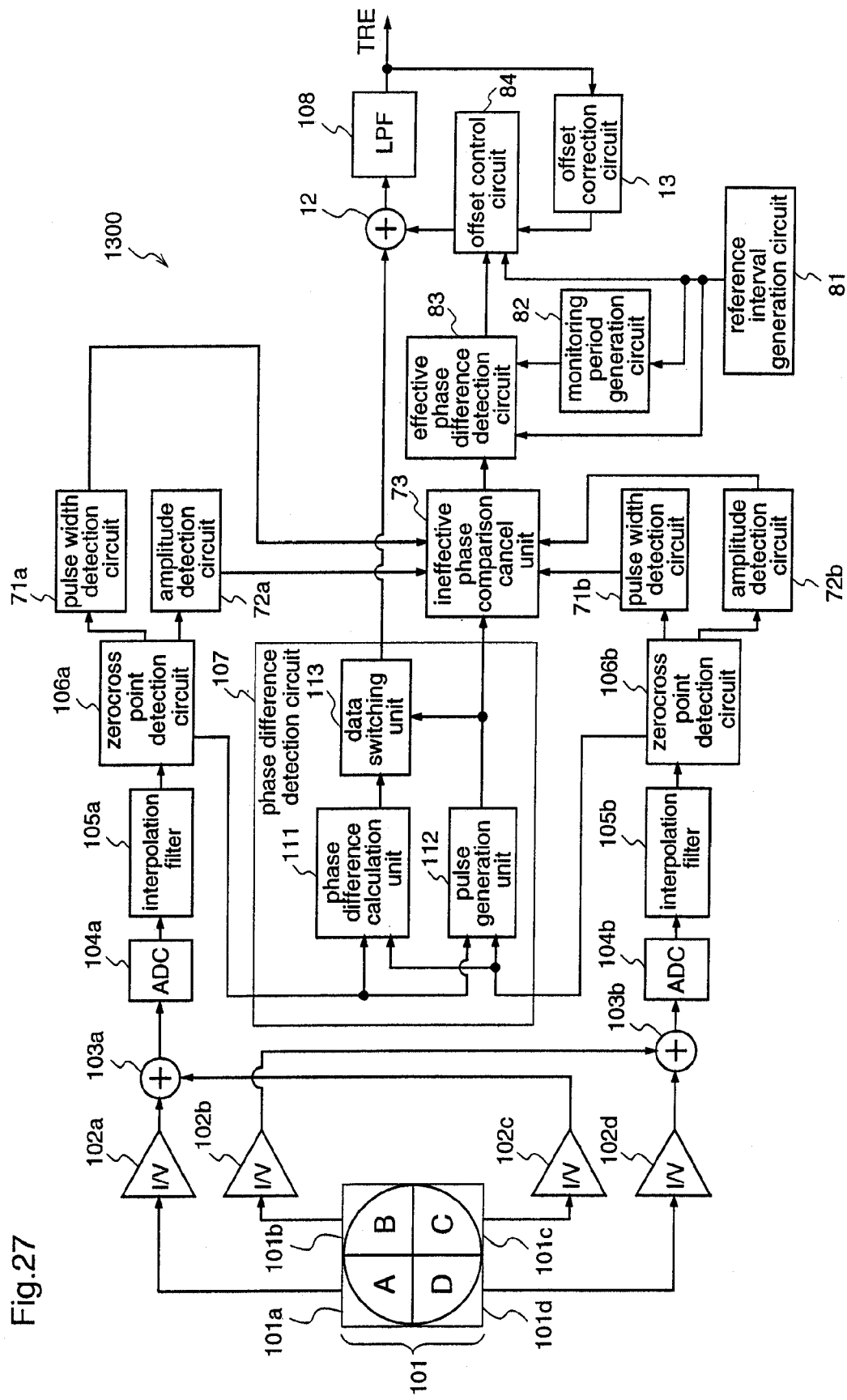
FIG. 27 is a block diagram illustrating the construction of a phase error detection apparatus 1300 according to a thirteenth embodiment of the present invention.

FIG. 27 is a block diagram illustrating the construction of the phase error detection apparatus 1300 according to the thirteenth embodiment.

In the phase error detection apparatus 1300 according to the thirteenth embodiment shown in FIG. 27, the constructions of the first and second pulse width detection circuits 71a and 71b, the first and second amplitude detection circuits 72a and 72b, and the ineffective phase comparison cancel unit 73 which are included in the phase error detection apparatus 7000 according to the seventh embodiment shown in FIG. 15 are applied to the tracking error detection apparatus 8000 according to the eighth embodiment shown in FIG. 18.

In the phase error detection apparatus 1300 according to the thirteenth embodiment constituted as described above, even when there is an input signal due to noise at a defect/non-recorded position, the pulse width and the amplitude value of the input signal is detected by the first and second pulse width detection circuits 71a and 71b and the first and second amplitude detection circuits 72a and 72b, respectively, and when either the pulse width or the amplitude value is lower than the respective predetermined values, the ineffective phase comparison cancel unit 73 regards this signal as noise, and restricts the phase comparison completion signal PCC to be input to the effective phase difference detection circuit 83. Thereby, it is possible to obtain a phase error detection apparatus which can reduce an output of an unnecessary offset correction amount due which is caused by malfunction of the phase difference detection circuit due to noise or the like.

Embodiment 14

Hereinafter, a phase error detection apparatus according to a fourteenth embodiment of the present invention will be described.

Figure 28:
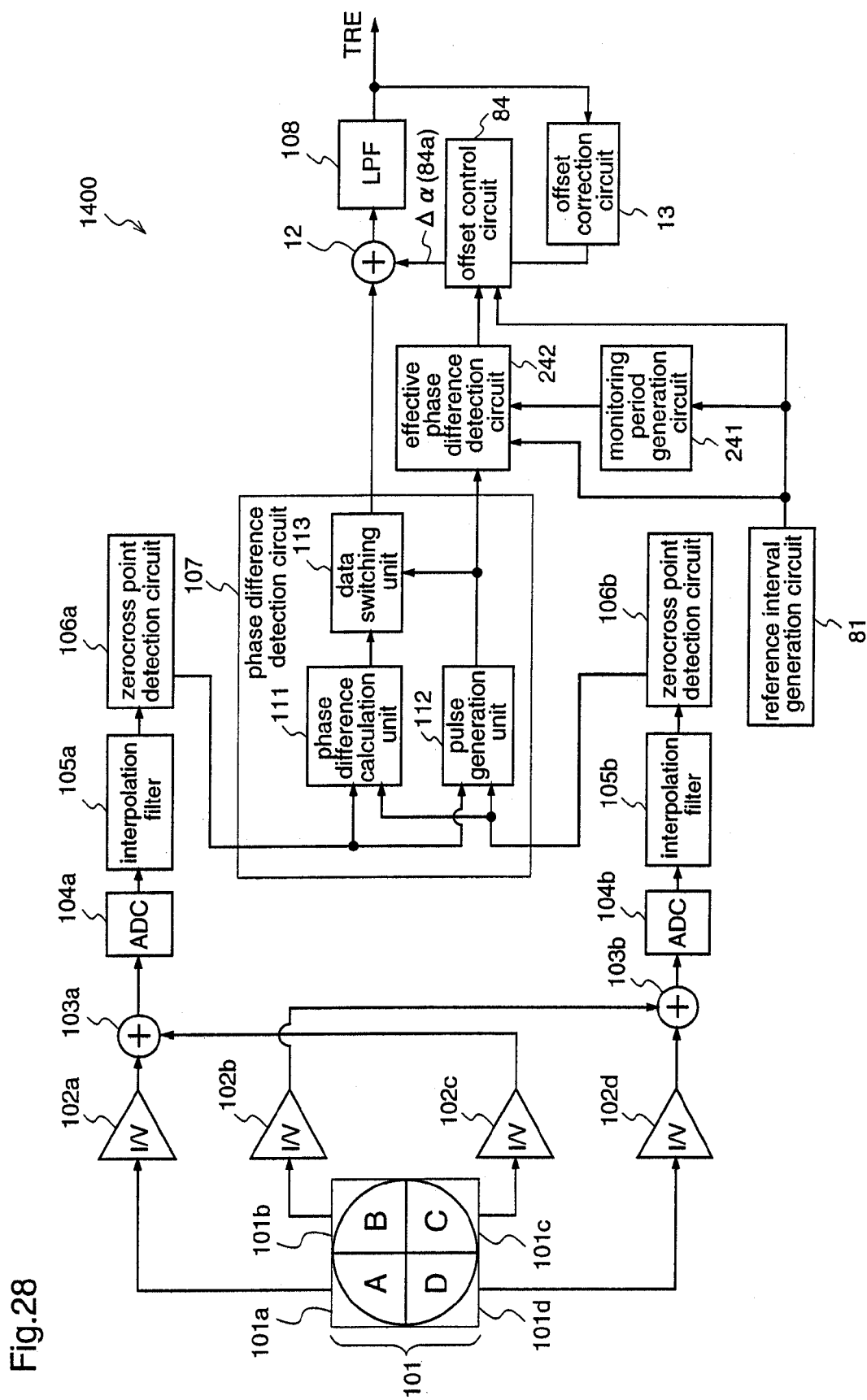
FIG. 28 is a block diagram illustrating the construction of a phase error detection apparatus 1400 according to a fourteenth embodiment of the present invention.

FIG. 28 is a block diagram illustrating the construction of the phase error detection apparatus 1400 according to the fourteenth embodiment.

In FIG. 28, the phase error detection apparatus 1400 of the fourteenth embodiment comprises a photodetector 101, first to fourth current-to-voltage converters 102a to 102d, first and second adders 103a and 103b as signal generators for generating two signal sequences, first and second analog-to-digital converters (ADC) 104a and 104b, first and second interpolation filters 105a and 105b, first and second zerocross point detection circuits 106a and 106b, a phase difference detection circuit 107, a low-pass filter (LPF) 108, a third adder 12, an offset correction circuit 13, a reference interval generation circuit 81, an offset control circuit 84, a monitoring period generation circuit 241, and an effective phase difference detection circuit 242.

The phase difference detection circuit 107 comprises a phase difference calculation unit 111, a pulse generation unit 112, and a data switching unit 113.

The constituents of the phase error detection apparatus 1400 other than the monitoring period generation circuit 241 and the effective phase difference detection circuit 242 are identical to those of the phase error detection apparatus 8000 of the eighth embodiment shown in FIG. 18.

The monitoring period generation circuit 241 repeats an operation of outputting a signal of "H" during a predetermined period of time, and thereafter, outputting "L" for one clock.

The effective phase difference detection circuit 242 outputs a control signal 242C which becomes "H" when the number of periods during which the output signal 241a from the monitoring period generation circuit 241 is "H" and the phase comparison completion signal PCC from the phase difference detection circuit 107 can be detected is equal to or larger than the number of periods during which no phase comparison completion signal PCC can be detected, and becomes "L" in other cases, within the interval of the output signal 82a from the reference interval generation circuit 81.

Figure 29:
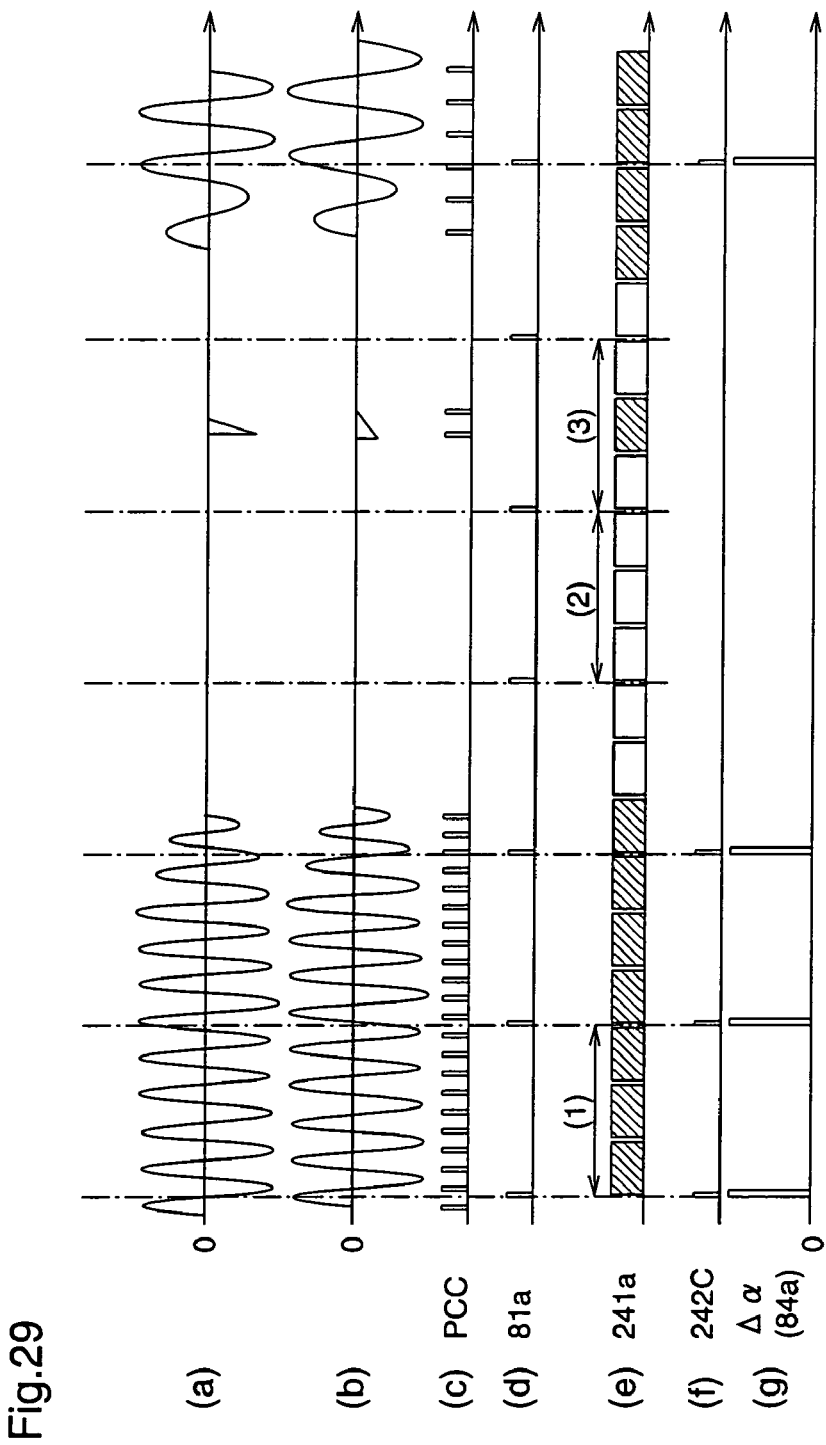
FIG. 29 is a diagram for explaining the operations of the monitoring period generation circuit 211 and the effective phase difference detection circuit 83 according to the eleventh embodiment.

FIG. 29 is a diagram for explaining the operations of the monitoring period generation circuit 241 and the effective phase difference detection circuit 242, and illustrates, from above, (a) a first signal sequence outputted from the first zerocross point detection circuit 106a, (b) a second signal sequence outputted from the second zerocross point detection circuit 106b, (c) a phase comparison completion signal PCC outputted from the pulse generation unit 112, (d) an output signal 81a from the reference interval generation circuit 81, (e) an output 241a from the monitoring period generation circuit 82, (f) a control signal 242C from the effective phase difference detection circuit 242, and (g) an output of an offset correction amount Δα (84a) outputted from the offset control circuit 84.

In FIG. 29, when the signal is normally inputted as shown by a range (1), the phase comparison completion signal PCC is detected from the pulse generation unit 112 during the period where the output 241a of the monitoring period generation circuit 241 becomes "H" (refer to hatched portions in FIG. 29), and the control signal 242C from the effective phase difference detection circuit 242 becomes "H", and thereby an offset correction amount Δα from the offset control circuit 84 is outputted.

However, in the state where there is no input signal due to a defect or a non-recorded position as shown by a range (2), no phase comparison completion signal PCC is detected during the period when the output 241a from the monitoring period generation circuit 241 is "H", and the control signal 242C outputted from the effective phase difference detection circuit 242 becomes "L", and therefore, the offset correction amount is not outputted from the offset control circuit 84.

Further, there is a case where, even when there is no reproduction signal in such as a defect/non-recorded position, a signal is inputted due to an effect of noise or the like, and thereby the phase difference detection circuit 107 operates to output the phase comparison completion signal PCC. However, when the number of periods during which the phase comparison completion signal PCC from the phase difference detection circuit 107 can be detected from the pulse generation unit 112 during the interval of the output signal 81*a* from the reference interval generation circuit 81 is "H" is not larger than the number of periods during which no phase comparison completion signal PCC can be detected, the effective phase difference detection circuit 242 outputs no control signal 242C, and no offset addition is performed by the offset control circuit 84.

As described above, in the phase error detection apparatus 1400 according to the fourteenth embodiment, it is possible to reduce an output of an offset correction amount due to malfunction of the phase difference detection circuit 107 which is caused by inputting of noise or the like in the state where there is no reproduction signal, such as a defect or non-recorded position.

While in the first to fourteenth embodiments the interpolation data for the respective data sequences are generated by the interpolation filters 105*a* and 105*b* (in the third and ninth embodiments, also 105*c* and 105*c*), the interpolation filters 105*a* and 105*b* (in the third and ninth embodiments also 105*c* and 105*d*) are not always necessary when the sample clocks of the ADC 104*a* and 104*b* (in the third and ninth embodiment, also 104*c* and 104*d*) are sufficiently short.

APPLICABILITY IN INDUSTRY

Since a tracking error detection apparatus of the present invention can obtain a tracking error signal that is accurately offset-corrected, even when there is scratch or the like on a disc or when the disc is CAV played, it is effective as a technique for performing accurate tracking control.

The invention claimed is:

1. A phase error detection apparatus comprising:
   a signal generation circuit for sampling two signal sequences whose phases mutually change, thereby generating digital signals;
   a zerocross point detection circuit for detecting a zerocross point where the digital signal of each sequence crosses a center level of the digital signal, from an output signal of the signal generation circuit;
   a phase difference detection circuit for performing phase comparison between the two sequences of digital signals by using a distance between the zerocross points of the two digital signals, and outputting a phase comparison result obtained between the respective zerocross points, as a pulse corresponding to one sampling clock, and further, outputting a phase comparison completion signal indicating that the phase comparison has completed;
   a reference interval generation circuit for outputting a reference signal for each predetermined interval;
   an effective phase difference detection circuit for outputting a control signal indicating whether a phase comparison completion signal from the phase difference detection circuit is detected or not within the interval of the reference signal from the reference interval generation circuit;
   an offset control circuit for outputting an offset correction amount when a phase comparison completion signal is detected, and outputting 0 when no phase comparison completion signal is detected, according to the control signal from the effective phase difference detection circuit;
   a low-pass filter for performing band limitation on a phase comparison result output signal from the phase difference detection circuit;
   an addition circuit for adding an output of the offset control circuit to an output of the low-pass filter to obtain a phase error signal; and
   an offset correction circuit for detecting an offset amount of the phase error signal from the output of the low-pass filter, adjusting the offset correction amount on the basis of the detected offset amount, and outputting the offset correction amount to the offset control circuit.

2. A phase error detection apparatus comprising:
   a signal generation circuit for sampling two signal sequences whose phases mutually change, thereby generating digital signals;
   a zerocross point detection circuit for detecting a zerocross point where the digital signal of each sequence crosses a center level of the digital signal, from an output signal of the signal generation circuit;
   a phase difference detection circuit for performing phase comparison between the two sequences of digital signals by using a distance between the zerocross points of the two digital signals, and outputting a phase comparison result obtained between the respective zerocross points, as a pulse corresponding to one sampling clock, and further, outputting a phase comparison completion signal indicating that the phase comparison has completed;
   a reference interval generation circuit for outputting a reference signal for each predetermined interval;
   an effective phase difference detection circuit for outputting a control signal indicating whether a phase comparison completion signal from the phase difference detection circuit is detected or not within the interval of the reference signal from the reference interval generation circuit;
   an offset control circuit for outputting an offset correction amount when a phase comparison completion signal has been detected, and outputting 0 when no phase comparison completion signal is detected, according to the control signal from the effective phase difference detection circuit;
   an addition circuit for adding the output of the offset control circuit to a phase comparison result output signal from the phase difference detection circuit;
   a low-pass filter for performing band limitation on a signal outputted from the addition circuit to obtain a phase error signal; and
   an offset correction circuit for detecting an offset amount of the phase error signal from the output of the low-pass filter, adjusting the offset correction amount on the basis of the detected offset amount, and outputting the offset correction amount to the offset control circuit.

3. A phase error detection apparatus as defined in claim 2 further including:
   a photodetector which receives reflected light from a light spot that is obtained by irradiating an optical disc with light, and outputs a signal according to an amount of the received light;
   wherein said signal generation circuit generates two sequences of digital signals whose phases mutually change according to a tracking error of the light spot, from an output signal of the photodetector, and
   said phase error signal is a tracking error signal.

4. A phase error detection apparatus as defined in claim 3 further including:
a linear velocity detection unit for detecting a linear velocity of the optical disc; and
a set period adjustment unit for changing the output signal interval of the reference interval generation circuit according to an output of the linear velocity detection unit.

5. A phase error detection apparatus as defined in claim 4 wherein said linear velocity detection unit including:
a PLL unit for outputting a clock that is synchronized with a reproduction signal of the optical disc; and
a counter for counting the number of inputs of clocks outputted from the PLL unit within a predetermined period to measure a linear velocity.

6. A phase error detection apparatus as defined in claim 3 further including:
a PLL unit for outputting a clock that is synchronized with a reproduction signal from the optical disc; and
said reference interval generation circuit having a counter that operates with the output clock from the PLL unit, and outputting the reference signal every time the counter counts a predetermined value.

7. A phase error detection apparatus as defined in claim 6 wherein
said PLL unit further outputs a control signal indicating whether the output clock is synchronized with the reproduction signal or not; and
said counter receives the control signal from the PLL unit, and operates with the output clock from the PLL unit only when the output clock from the PLL unit is synchronized with the reproduction signal, while it operates with a fixed clock in other cases.

8. A phase error detection apparatus as defined in claim 7 wherein
said reference interval generation circuit has a first set value that determines a count value for outputting a reference signal when the counter operates with the output clock from the PLL unit, and a second set value that determines a count value for outputting a reference signal when the counter operates with the fixed clock; and
said phase error detection apparatus further including a set value control unit which receives the control signal from the PLL unit, and controls, when the PLL unit is synchronized with the reproduction signal, the second count set value so that the output interval of the reference signal from the reference interval generation circuit becomes equal between when the counter operates with the output clock from the PLL unit and when it operates with the fixed clock.

9. A phase error detection apparatus as defined in claim 3 further including:
a count circuit for counting the number of the phase comparison completion signals outputted from the phase difference detection circuit within the interval of the reference signal from the reference interval generation circuit;
an averaging circuit for averaging the outputs from the count circuit; and
a set value control unit for adjusting the interval for outputting the reference signal from the reference interval generation circuit so that the output value of the averaging circuit becomes a predetermined value.

10. A phase error detection apparatus as defined in claim 9 further including:
a defect/non-recording detection unit for detecting a defect such as scratch or stain on the optical disc or a non-recorded state, from the output signal of the photodetector, and holding the input/output signals of the averaging circuit during a period when a defect or a non-recorded state is detected.

11. A phase error detection apparatus as defined in claim 3 further including:
pulse width detection circuits provided for the respective signal sequences, each circuit measuring a distance between the zerocross points of the respective signal sequences, from the output of the zerocross point detection circuit; and
an ineffective phase comparison cancel unit for, when the zerocross interval detected by the pulse width detection circuit is smaller than a predetermined value, nullifying the phase comparison completion signal at the corresponding zerocross point, and stopping the output to the effective phase difference detection circuit.

12. A phase error detection apparatus as defined in claim 11 further including:
amplitude detection circuits provided for the respective signal sequences, each circuit detecting an absolute value of a difference from a center level of sample data between the zerocross points, as a signal amplitude value, from the output of the zerocross point detection circuit;
wherein, when the signal amplitude value detected by the amplitude detection circuit is smaller than a predetermined value, said ineffective phase difference cancel unit nullifies the phase comparison completion signal at the corresponding zerocross point, and stops the output to the effective phase difference detection circuit.

13. A phase error detection apparatus as defined in claim 3 further including:
a defect/non-recording detection unit for detecting a defect such as scratch or stain on the optical disc or a non-recorded state, from the output signal of the photodetector, and performing control so that the output of the offset control circuit becomes 0 during a period when a defect or a non-recorded state is detected.

\* \* \* \* \*